(12) United States Patent  
Hotelling et al.

(10) Patent No.: US 8,612,856 B2  
(45) Date of Patent: Dec. 17, 2013

(54) PROXIMITY DETECTOR IN HANDHELD DEVICE

(71) Applicant: Apple Inc., Cupertino, CA (US)

(72) Inventors: Steve P. Hotelling, Los Gatos, CA (US); Brian Q. Huppi, San Francisco, CA (US); Joshua A. Strickon, Miami, FL (US); Duncan Robert Kerr, San Francisco, CA (US); Imran Chaudhri, San Francisco, CA (US); Greg Christie, San Jose, CA (US); Jonathan P. Ive, San Francisco, CA (US); Peter J. Kennedy, Weston, FL (US); Anthony M. Faddell, Portola Valley, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/766,570

(22) Filed: Feb. 13, 2013

(65) Prior Publication Data

US 2013/0154982 A1     Jun. 20, 2013

Related U.S. Application Data

(63) Continuation of application No. 11/240,788, filed on Sep. 30, 2005, now Pat. No. 8,381,135, which is a continuation-in-part of application No. 10/903,964, filed on Jul. 30, 2004, now Pat. No. 8,479,122, and a continuation-in-part of application No. 11/038,590, filed on Jan. 18, 2005, now Pat. No. 8,239,784, and a continuation-in-part of application No. 10/927,925, filed on Aug. 26, 2004, now Pat. No. 7,760,187, and a continuation-in-part of application No. 11/165,958, filed on Jun. 23, 2005, now Pat. No. 7,599,044.

(51) Int. Cl.  
*G06F 3/01* (2006.01)

(52) U.S. Cl.  
USPC ............................................. 715/702; 715/863

(58) Field of Classification Search  
USPC .................................... 715/702, 863, 864  
See application file for complete search history.

(56) References Cited

U.S. PATENT DOCUMENTS

| | | | |
|---|---|---|---|
| 3,333,160 | A | 7/1967 | Gorski |
| 3,541,541 | A | 11/1970 | Englebart |
| 3,609,695 | A | 9/1971 | Pirkle |
| 3,662,105 | A | 5/1972 | Hurst et al. |

(Continued)

FOREIGN PATENT DOCUMENTS

| | | |
|---|---|---|
| CA | 1243096 | 10/1988 |
| DE | 100 42 300 A1 | 3/2002 |

(Continued)

OTHER PUBLICATIONS

Final Office Action mailed Jul. 9, 2013, for U.S. Appl. No. 11/048,264, filed Jan. 31, 2005, 10 pages.

(Continued)

*Primary Examiner* — Omar Abdul-Ali  
(74) *Attorney, Agent, or Firm* — Morrison & Foerster LLP

(57) ABSTRACT

Proximity based systems and methods that are implemented on an electronic device are disclosed. The method includes sensing an object spaced away and in close proximity to the electronic device. The method also includes performing an action in the electronic device when an object is sensed.

20 Claims, 24 Drawing Sheets

(56) References Cited

U.S. PATENT DOCUMENTS

| | | |
|---|---|---|
| 3,748,751 A | 7/1973 | Breglia et al. |
| 3,757,322 A | 9/1973 | Barkan et al. |
| 3,798,370 A | 3/1974 | Hurst |
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,146,924 A | 3/1979 | Birk et al. |
| 4,202,041 A | 5/1980 | Kaplow et al. |
| 4,219,847 A | 8/1980 | Pinkney et al. |
| 4,246,452 A | 1/1981 | Chandler |
| 4,303,856 A | 12/1981 | Serras-Paulet |
| 4,305,071 A | 12/1981 | Bell et al. |
| 4,305,131 A | 12/1981 | Best |
| 4,346,376 A | 8/1982 | Mallos |
| 4,375,674 A | 3/1983 | Thornton |
| 4,396,945 A | 8/1983 | DiMatteo et al. |
| 4,435,835 A | 3/1984 | Sakow et al. |
| 4,475,122 A | 10/1984 | Green |
| 4,484,179 A | 11/1984 | Kasday |
| 4,542,375 A | 9/1985 | Alles et al. |
| 4,550,221 A | 10/1985 | Mabusth |
| 4,561,017 A | 12/1985 | Greene |
| 4,613,942 A | 9/1986 | Chen |
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |
| 4,654,872 A | 3/1987 | Hisano et al. |
| 4,672,364 A | 6/1987 | Lucas |
| 4,672,558 A | 6/1987 | Beckes et al. |
| 4,686,374 A | 8/1987 | Liptay-Wagner et al. |
| 4,692,809 A | 9/1987 | Beining et al. |
| 4,695,827 A | 9/1987 | Beining et al. |
| 4,703,306 A | 10/1987 | Barritt |
| 4,710,760 A | 12/1987 | Kasday |
| 4,733,222 A | 3/1988 | Evans |
| 4,734,685 A | 3/1988 | Watanabe |
| 4,746,770 A | 5/1988 | McAvinney |
| 4,763,356 A | 8/1988 | Day, Jr. et al. |
| 4,771,276 A | 9/1988 | Parks |
| 4,772,028 A | 9/1988 | Rockhold et al. |
| 4,787,040 A | 11/1988 | Ames et al. |
| 4,788,384 A | 11/1988 | Bruere-Dawson et al. |
| 4,806,846 A | 2/1989 | Kerber |
| 4,814,759 A | 3/1989 | Gombrich et al. |
| 4,853,888 A | 8/1989 | Lata et al. |
| 4,898,555 A | 2/1990 | Sampson |
| 4,914,624 A | 4/1990 | Dunthorn |
| 4,948,371 A | 8/1990 | Hall |
| 4,968,877 A | 11/1990 | McAvinney et al. |
| 4,988,981 A | 1/1991 | Zimmerman et al. |
| 4,993,806 A | 2/1991 | Clausen et al. |
| 5,003,519 A | 3/1991 | Noirjean |
| 5,017,030 A | 5/1991 | Crews |
| 5,038,401 A | 8/1991 | Inotsume |
| 5,045,843 A | 9/1991 | Hansen |
| 5,045,846 A | 9/1991 | Gay et al. |
| 5,072,294 A | 12/1991 | Engle |
| 5,119,079 A | 6/1992 | Hube et al. |
| 5,153,829 A | 10/1992 | Furuya et al. |
| 5,168,531 A | 12/1992 | Sigel |
| 5,178,477 A | 1/1993 | Gambaro |
| 5,189,403 A | 2/1993 | Franz et al. |
| 5,194,862 A | 3/1993 | Edwards |
| 5,212,555 A | 5/1993 | Stoltz |
| 5,224,861 A | 7/1993 | Glass et al. |
| 5,227,985 A | 7/1993 | DeMenthon |
| 5,241,308 A | 8/1993 | Young |
| 5,252,951 A | 10/1993 | Tannenbaum et al. |
| 5,281,966 A | 1/1994 | Walsh |
| 5,297,041 A | 3/1994 | Kushler et al. |
| 5,305,017 A | 4/1994 | Gerpheide |
| 5,319,386 A | 6/1994 | Gunn et al. |
| 5,328,190 A | 7/1994 | Dart et al. |
| 5,345,543 A | 9/1994 | Capps et al. |
| 5,347,295 A | 9/1994 | Agulnick et al. |
| 5,347,629 A | 9/1994 | Barrett et al. |
| 5,363,051 A * | 11/1994 | Jenstrom et al. ............... 324/661 |
| 5,367,453 A | 11/1994 | Capps et al. |
| 5,376,948 A | 12/1994 | Roberts |
| 5,379,057 A | 1/1995 | Clough et al. |
| 5,398,310 A | 3/1995 | Tchao et al. |
| 5,412,189 A | 5/1995 | Cragun |
| 5,418,760 A | 5/1995 | Kawashima et al. |
| 5,422,656 A | 6/1995 | Allard et al. |
| 5,442,742 A | 8/1995 | Greyson et al. |
| 5,459,793 A | 10/1995 | Naoi et al. |
| 5,463,388 A | 10/1995 | Boie et al. |
| 5,463,696 A | 10/1995 | Beernink et al. |
| 5,463,725 A | 10/1995 | Henckel et al. |
| 5,471,578 A | 11/1995 | Moran et al. |
| 5,479,528 A | 12/1995 | Speeter |
| 5,483,261 A | 1/1996 | Yasutake |
| 5,488,204 A | 1/1996 | Mead et al. |
| 5,495,077 A | 2/1996 | Miller et al. |
| 5,495,269 A | 2/1996 | Elrod et al. |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,513,309 A | 4/1996 | Meier et al. |
| 5,515,079 A | 5/1996 | Hauck |
| 5,523,775 A | 6/1996 | Capps |
| 5,530,455 A | 6/1996 | Gillick et al. |
| 5,530,456 A | 6/1996 | Kokubo |
| 5,543,590 A | 8/1996 | Gillespie et al. |
| 5,543,591 A | 8/1996 | Gillespie et al. |
| 5,548,667 A | 8/1996 | Tu |
| 5,559,301 A | 9/1996 | Bryan, Jr. et al. |
| 5,563,632 A | 10/1996 | Roberts |
| 5,563,996 A | 10/1996 | Tchao |
| 5,565,658 A | 10/1996 | Gerpheide et al. |
| 5,568,604 A | 10/1996 | Hansen |
| 5,572,239 A | 11/1996 | Jaeger |
| 5,572,647 A | 11/1996 | Blades |
| 5,579,036 A | 11/1996 | Yates, IV |
| 5,581,243 A | 12/1996 | Ouellette et al. |
| 5,581,681 A | 12/1996 | Tchao et al. |
| 5,583,946 A | 12/1996 | Gourdol |
| 5,589,856 A | 12/1996 | Stein et al. |
| 5,590,219 A | 12/1996 | Gourdol |
| 5,592,566 A | 1/1997 | Pagallo et al. |
| 5,594,469 A | 1/1997 | Freeman et al. |
| 5,594,810 A | 1/1997 | Gourdol |
| 5,596,694 A | 1/1997 | Capps |
| 5,612,719 A | 3/1997 | Beernink et al. |
| 5,613,913 A | 3/1997 | Ikematsu et al. |
| 5,625,715 A | 4/1997 | Trew et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| 5,649,706 A | 7/1997 | Treat, Jr. et al. |
| 5,666,113 A | 9/1997 | Logan |
| 5,666,502 A | 9/1997 | Capps |
| 5,666,552 A | 9/1997 | Greyson et al. |
| 5,675,361 A | 10/1997 | Santilli |
| 5,675,362 A | 10/1997 | Clough et al. |
| 5,677,710 A | 10/1997 | Thompson-Rohrlich |
| 5,689,253 A | 11/1997 | Hargreaves et al. |
| 5,689,667 A | 11/1997 | Kurtenbach |
| 5,709,219 A | 1/1998 | Chen et al. |
| 5,710,844 A | 1/1998 | Capps et al. |
| 5,711,624 A | 1/1998 | Klauber |
| 5,712,661 A | 1/1998 | Jaeger |
| 5,726,685 A | 3/1998 | Kuth et al. |
| 5,729,249 A | 3/1998 | Yasutake |
| 5,729,250 A | 3/1998 | Bishop et al. |
| 5,730,165 A | 3/1998 | Philipp |
| 5,736,974 A | 4/1998 | Selker |

(56) References Cited

U.S. PATENT DOCUMENTS

| | | |
|---|---|---|
| 5,736,975 A | 4/1998 | Lunetta |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,745,719 A | 4/1998 | Falcon |
| 5,746,818 A | 5/1998 | Yatake |
| 5,748,184 A | 5/1998 | Shieh |
| 5,748,269 A | 5/1998 | Harris et al. |
| 5,748,512 A | 5/1998 | Vargas |
| 5,764,222 A | 6/1998 | Shieh |
| 5,764,818 A | 6/1998 | Capps et al. |
| 5,767,457 A | 6/1998 | Gerpheide et al. |
| 5,767,842 A | 6/1998 | Korth |
| 5,777,603 A | 7/1998 | Jaeger |
| 5,790,104 A | 8/1998 | Shieh |
| 5,790,107 A | 8/1998 | Kasser et al. |
| 5,798,760 A | 8/1998 | Vayda et al. |
| 5,801,941 A | 9/1998 | Bertram |
| 5,802,516 A | 9/1998 | Shwarts et al. |
| 5,805,145 A | 9/1998 | Jaeger |
| 5,805,146 A | 9/1998 | Jaeger et al. |
| 5,805,167 A | 9/1998 | Van Cruyningen |
| 5,808,567 A | 9/1998 | McCloud |
| 5,808,605 A | 9/1998 | Shieh |
| 5,809,267 A | 9/1998 | Moran et al. |
| 5,818,451 A | 10/1998 | Bertram et al. |
| 5,821,690 A | 10/1998 | Martens et al. |
| 5,821,930 A | 10/1998 | Hansen |
| 5,823,782 A | 10/1998 | Marcus et al. |
| 5,825,232 A | 10/1998 | Kimura |
| 5,825,308 A | 10/1998 | Rosenberg |
| 5,825,351 A | 10/1998 | Tam |
| 5,825,352 A | 10/1998 | Bisset et al. |
| 5,831,601 A | 11/1998 | Vogeley et al. |
| 5,835,079 A | 11/1998 | Shieh |
| 5,841,428 A | 11/1998 | Jaeger et al. |
| 5,844,506 A | 12/1998 | Binstead |
| 5,844,547 A | 12/1998 | Minakuchi et al. |
| 5,850,218 A | 12/1998 | LaJoie et al. |
| 5,854,625 A | 12/1998 | Frisch et al. |
| 5,859,631 A | 1/1999 | Bergman et al. |
| 5,867,149 A | 2/1999 | Jaeger |
| 5,870,091 A | 2/1999 | Lazarony et al. |
| 5,871,251 A | 2/1999 | Welling et al. |
| 5,874,948 A | 2/1999 | Shieh |
| 5,877,751 A | 3/1999 | Kanemitsu et al. |
| 5,880,411 A | 3/1999 | Gillespie et al. |
| 5,883,619 A | 3/1999 | Ho et al. |
| 5,886,697 A | 3/1999 | Naughton et al. |
| 5,898,434 A | 4/1999 | Small et al. |
| 5,900,876 A | 5/1999 | Yagita et al. |
| 5,910,800 A | 6/1999 | Shields et al. |
| 5,920,309 A | 7/1999 | Bisset et al. |
| 5,923,319 A | 7/1999 | Bishop et al. |
| 5,933,134 A | 8/1999 | Shieh |
| 5,933,141 A | 8/1999 | Smith |
| 5,936,613 A | 8/1999 | Jaeger et al. |
| 5,943,043 A | 8/1999 | Furuhata et al. |
| 5,943,044 A | 8/1999 | Martinelli et al. |
| 5,943,052 A | 8/1999 | Allen et al. |
| 5,943,053 A | 8/1999 | Ludolph et al. |
| 5,949,345 A | 9/1999 | Beckert et al. |
| 5,956,291 A | 9/1999 | Nehemiah et al. |
| 5,956,822 A | 9/1999 | Brieden et al. |
| 5,963,671 A | 10/1999 | Comerford et al. |
| 5,974,541 A | 10/1999 | Hall et al. |
| 5,977,867 A | 11/1999 | Blouin |
| 5,982,302 A | 11/1999 | Ure |
| 5,982,352 A | 11/1999 | Pryor |
| 5,982,353 A | 11/1999 | Gallery et al. |
| 5,982,355 A | 11/1999 | Jaeger et al. |
| 5,995,101 A | 11/1999 | Clark et al. |
| 5,995,104 A | 11/1999 | Kataoka et al. |
| 5,995,106 A | 11/1999 | Naughton et al. |
| 5,999,895 A | 12/1999 | Forest |
| 6,002,389 A | 12/1999 | Kasser |
| 6,002,808 A | 12/1999 | Freeman |
| 6,005,549 A | 12/1999 | Forest |
| 6,005,555 A | 12/1999 | Katsurahira et al. |
| 6,008,800 A | 12/1999 | Pryor |
| 6,013,956 A | 1/2000 | Anderson, Jr. |
| 6,020,881 A | 2/2000 | Naughton et al. |
| 6,028,271 A | 2/2000 | Gillespie et al. |
| 6,031,524 A | 2/2000 | Kunert |
| 6,034,685 A | 3/2000 | Kuriyama et al. |
| 6,037,882 A | 3/2000 | Levy |
| 6,040,824 A | 3/2000 | Maekawa et al. |
| 6,049,326 A | 4/2000 | Beyda et al. |
| 6,049,328 A | 4/2000 | Vanderheiden |
| 6,050,825 A | 4/2000 | Nichol et al. |
| 6,052,339 A | 4/2000 | Frenkel et al. |
| 6,054,984 A | 4/2000 | Alexander |
| 6,054,990 A | 4/2000 | Tran |
| 6,057,540 A | 5/2000 | Gordon et al. |
| 6,057,845 A | 5/2000 | Dupouy |
| 6,061,177 A | 5/2000 | Fujimoto |
| 6,066,075 A | 5/2000 | Poulton |
| 6,072,494 A | 6/2000 | Nguyen |
| 6,073,036 A | 6/2000 | Heikkinen et al. |
| 6,075,531 A | 6/2000 | DeStefano |
| 6,084,576 A | 7/2000 | Leu et al. |
| 6,088,023 A | 7/2000 | Louis et al. |
| 6,094,197 A | 7/2000 | Buxton et al. |
| 6,104,384 A | 8/2000 | Moon et al. |
| 6,105,419 A | 8/2000 | Michels et al. |
| 6,107,997 A | 8/2000 | Ure |
| 6,128,003 A | 10/2000 | Smith et al. |
| 6,130,665 A | 10/2000 | Ericsson |
| 6,131,299 A | 10/2000 | Raab et al. |
| 6,135,958 A | 10/2000 | Mikula-Curtis et al. |
| 6,144,380 A | 11/2000 | Shwarts et al. |
| 6,151,596 A | 11/2000 | Hosomi |
| 6,154,194 A | 11/2000 | Singh |
| 6,154,201 A | 11/2000 | Levin et al. |
| 6,154,209 A | 11/2000 | Naughton et al. |
| 6,160,551 A | 12/2000 | Naughton et al. |
| 6,169,538 B1 | 1/2001 | Nowlan et al. |
| 6,175,610 B1 | 1/2001 | Peter |
| 6,188,391 B1 | 2/2001 | Seely et al. |
| 6,198,515 B1 | 3/2001 | Cole |
| 6,208,329 B1 | 3/2001 | Ballare |
| 6,219,035 B1 | 4/2001 | Skog |
| 6,222,465 B1 | 4/2001 | Kumar et al. |
| 6,222,531 B1 | 4/2001 | Smith |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,255,604 B1 | 7/2001 | Tokioka et al. |
| 6,256,020 B1 | 7/2001 | Pabon et al. |
| 6,259,436 B1 | 7/2001 | Moon et al. |
| 6,271,835 B1 | 8/2001 | Hoeksma |
| 6,278,441 B1 | 8/2001 | Gouzman et al. |
| 6,278,443 B1 | 8/2001 | Amro et al. |
| 6,288,707 B1 | 9/2001 | Philipp |
| 6,289,326 B1 | 9/2001 | LaFleur |
| 6,292,178 B1 | 9/2001 | Bernstein et al. |
| 6,292,179 B1 | 9/2001 | Lee |
| 6,295,049 B1 | 9/2001 | Minner |
| 6,295,052 B1 | 9/2001 | Kato et al. |
| 6,308,144 B1 | 10/2001 | Bronfield et al. |
| 6,310,610 B1 | 10/2001 | Beaton et al. |
| 6,313,853 B1 | 11/2001 | Lamontagne et al. |
| 6,323,846 B1 | 11/2001 | Westerman et al. |
| 6,323,849 B1 | 11/2001 | Westerman et al. |
| 6,326,956 B1 | 12/2001 | Jaeger et al. |
| 6,333,753 B1 | 12/2001 | Hinckley |
| 6,337,678 B1 | 1/2002 | Fish |
| 6,339,748 B1 | 1/2002 | Hiramatsu |
| 6,344,861 B1 | 2/2002 | Naughton et al. |
| 6,347,290 B1 | 2/2002 | Bartlett |
| 6,359,572 B1 | 3/2002 | Vale |
| 6,359,632 B1 | 3/2002 | Eastty et al. |

(56) References Cited

U.S. PATENT DOCUMENTS

| | | |
|---|---|---|
| 6,377,009 B1 | 4/2002 | Philipp |
| 6,380,931 B1 | 4/2002 | Gillespie et al. |
| 6,400,379 B1 | 6/2002 | Johnson et al. |
| 6,411,287 B1 | 6/2002 | Scharff et al. |
| 6,414,671 B1 | 7/2002 | Gillespie et al. |
| 6,414,672 B2 | 7/2002 | Rekimoto et al. |
| 6,414,674 B1 | 7/2002 | Kamper et al. |
| 6,421,042 B1 | 7/2002 | Omura et al. |
| 6,421,046 B1 | 7/2002 | Edgren |
| 6,421,234 B1 | 7/2002 | Ricks et al. |
| 6,424,338 B1 | 7/2002 | Anderson |
| 6,429,846 B2 | 8/2002 | Rosenberg et al. |
| 6,433,801 B1 | 8/2002 | Moon et al. |
| 6,441,806 B1 | 8/2002 | Jaeger |
| 6,441,807 B1 | 8/2002 | Yamaguchi |
| 6,442,440 B1 | 8/2002 | Miller |
| 6,452,514 B1 | 9/2002 | Philipp |
| 6,456,952 B1 | 9/2002 | Nathan |
| 6,457,355 B1 | 10/2002 | Philipp |
| 6,457,834 B1 | 10/2002 | Cotton et al. |
| 6,466,036 B1 | 10/2002 | Philipp |
| 6,469,722 B1 | 10/2002 | Kinoe et al. |
| 6,473,069 B1 | 10/2002 | Gerpheide |
| 6,473,102 B1 | 10/2002 | Rodden et al. |
| 6,478,432 B1 | 11/2002 | Dyner |
| 6,480,188 B1 | 11/2002 | Horsley |
| 6,481,851 B1 | 11/2002 | McNelley et al. |
| 6,489,978 B1 | 12/2002 | Gong et al. |
| 6,501,464 B1 | 12/2002 | Cobbley et al. |
| 6,501,515 B1 | 12/2002 | Iwamura |
| 6,515,669 B1 | 2/2003 | Mohri |
| 6,525,711 B1 | 2/2003 | Shaw et al. |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,545,670 B1 | 4/2003 | Pryor |
| 6,563,492 B1 | 5/2003 | Furuya |
| 6,570,557 B1 | 5/2003 | Westerman et al. |
| 6,570,584 B1 | 5/2003 | Cok et al. |
| 6,573,844 B1 | 6/2003 | Venolia et al. |
| 6,583,676 B2 | 6/2003 | Krah et al. |
| 6,593,916 B1 | 7/2003 | Aroyan |
| 6,597,345 B2 | 7/2003 | Hirshberg |
| 6,610,936 B2 | 8/2003 | Gillespie et al. |
| 6,611,252 B1 | 8/2003 | DuFaux |
| 6,624,833 B1 | 9/2003 | Kumar et al. |
| 6,639,577 B2 | 10/2003 | Eberhard |
| 6,639,584 B1 | 10/2003 | Li |
| 6,650,319 B1 | 11/2003 | Hurst et al. |
| 6,654,733 B1 | 11/2003 | Goodman et al. |
| 6,658,994 B1 | 12/2003 | McMillan |
| 6,661,920 B1 | 12/2003 | Skinner |
| 6,664,989 B1 | 12/2003 | Snyder et al. |
| 6,670,894 B2 | 12/2003 | Mehring |
| 6,677,932 B1 | 1/2004 | Westerman |
| 6,677,933 B1 | 1/2004 | Yogaratnam |
| 6,677,934 B1 | 1/2004 | Blanchard |
| 6,680,677 B1 | 1/2004 | Tiphane |
| 6,690,275 B2 * | 2/2004 | Long et al. .................. 340/525 |
| 6,690,387 B2 | 2/2004 | Zimmerman et al. |
| 6,697,721 B2 | 2/2004 | Arlinsky |
| 6,703,999 B1 | 3/2004 | Iwanami et al. |
| 6,710,771 B1 | 3/2004 | Yamaguchi et al. |
| 6,721,784 B1 | 4/2004 | Leonard et al. |
| 6,724,366 B2 | 4/2004 | Crawford |
| 6,757,002 B1 | 6/2004 | Oross et al. |
| 6,760,020 B1 | 7/2004 | Uchiyama et al. |
| 6,791,467 B1 | 9/2004 | Ben-Ze'ev |
| 6,795,059 B2 | 9/2004 | Endo |
| 6,798,768 B1 | 9/2004 | Gallick et al. |
| 6,803,905 B1 | 10/2004 | Capps et al. |
| 6,803,906 B1 | 10/2004 | Morrison et al. |
| 6,806,869 B2 | 10/2004 | Yamakado |
| 6,819,312 B2 | 11/2004 | Fish |
| 6,842,672 B1 | 1/2005 | Straub et al. |
| 6,856,259 B1 | 2/2005 | Sharp |
| 6,857,800 B2 | 2/2005 | Zhang et al. |
| 6,874,129 B2 | 3/2005 | Smith |
| 6,882,641 B1 | 4/2005 | Gallick et al. |
| 6,888,536 B2 | 5/2005 | Westerman et al. |
| 6,896,375 B2 | 5/2005 | Peterson et al. |
| 6,900,795 B1 | 5/2005 | Knight, III et al. |
| 6,903,730 B2 | 6/2005 | Mathews et al. |
| 6,920,619 B1 | 7/2005 | Milekic |
| 6,926,609 B2 | 8/2005 | Martin |
| 6,927,761 B2 | 8/2005 | Badaye et al. |
| 6,930,661 B2 | 8/2005 | Uchida et al. |
| 6,942,571 B1 | 9/2005 | McAllister et al. |
| 6,944,591 B1 | 9/2005 | Raghunandan |
| 6,952,203 B2 | 10/2005 | Banerjee et al. |
| 6,954,583 B2 | 10/2005 | Nagasaka et al. |
| 6,958,749 B1 | 10/2005 | Matsushita et al. |
| 6,961,912 B2 | 11/2005 | Aoki et al. |
| 6,965,375 B1 | 11/2005 | Gettemy et al. |
| 6,970,749 B1 | 11/2005 | Chinn et al. |
| 6,972,401 B2 | 12/2005 | Akitt et al. |
| 6,972,749 B2 | 12/2005 | Hinckley et al. |
| 6,975,304 B1 | 12/2005 | Hawkins et al. |
| 6,977,666 B2 | 12/2005 | Hedrick |
| 6,985,801 B1 | 1/2006 | Straub et al. |
| 6,992,659 B2 | 1/2006 | Gettemy |
| 7,002,749 B2 | 2/2006 | Kremen |
| 7,015,894 B2 | 3/2006 | Morohoshi |
| 7,022,075 B2 | 4/2006 | Grunwald et al. |
| 7,030,863 B2 | 4/2006 | Longe et al. |
| 7,031,228 B2 | 4/2006 | Born et al. |
| 7,038,659 B2 | 5/2006 | Rajkowski |
| 7,057,607 B2 | 6/2006 | Mayoraz et al. |
| 7,058,902 B2 | 6/2006 | Iwema et al. |
| 7,075,512 B1 | 7/2006 | Fabre et al. |
| 7,079,114 B1 | 7/2006 | Smith et al. |
| 7,084,859 B1 | 8/2006 | Pryor |
| 7,091,410 B2 | 8/2006 | Ito et al. |
| 7,098,891 B1 | 8/2006 | Pryor |
| 7,098,896 B2 | 8/2006 | Kushler et al. |
| 7,100,105 B1 | 8/2006 | Nishimura et al. |
| 7,129,416 B1 | 10/2006 | Steinfeld et al. |
| 7,143,355 B2 | 11/2006 | Yamaguchi et al. |
| 7,149,981 B1 | 12/2006 | Lundy et al. |
| 7,151,528 B2 * | 12/2006 | Taylor et al. .................. 345/168 |
| 7,158,123 B2 | 1/2007 | Myers et al. |
| 7,180,502 B2 | 2/2007 | Marvit et al. |
| 7,184,064 B2 | 2/2007 | Zimmerman et al. |
| 7,194,699 B2 | 3/2007 | Thomson et al. |
| 7,233,316 B2 | 6/2007 | Smith et al. |
| 7,233,319 B2 | 6/2007 | Johnson et al. |
| 7,240,289 B2 | 7/2007 | Naughton et al. |
| 7,242,311 B2 | 7/2007 | Hoff et al. |
| 7,260,422 B2 | 8/2007 | Knoedgen |
| 7,310,781 B2 | 12/2007 | Chen et al. |
| 7,319,454 B2 | 1/2008 | Thacker et al. |
| 7,320,112 B2 | 1/2008 | Yamaguchi et al. |
| RE40,153 E | 3/2008 | Westerman et al. |
| 7,339,580 B2 | 3/2008 | Westerman et al. |
| 7,340,077 B2 | 3/2008 | Gokturk et al. |
| 7,340,685 B2 | 3/2008 | Chen et al. |
| 7,346,853 B2 | 3/2008 | Chen et al. |
| 7,417,681 B2 | 8/2008 | Lieberman et al. |
| 7,443,316 B2 | 10/2008 | Lim |
| 7,466,843 B2 | 12/2008 | Pryor |
| 7,474,772 B2 | 1/2009 | Russo et al. |
| 7,475,390 B2 | 1/2009 | Berstis et al. |
| 7,477,240 B2 | 1/2009 | Yanagisawa |
| 7,478,336 B2 | 1/2009 | Chen et al. |
| 7,489,303 B1 | 2/2009 | Pryor |
| 7,509,113 B2 | 3/2009 | Knoedgen |
| 7,515,810 B2 | 4/2009 | Nagasaka et al. |
| 7,519,223 B2 | 4/2009 | Dehlin et al. |
| 7,526,738 B2 | 4/2009 | Ording et al. |
| RE40,867 E * | 8/2009 | Binstead ..................... 341/33 |
| 7,593,552 B2 * | 9/2009 | Higaki et al. ................ 382/118 |
| 7,614,008 B2 | 11/2009 | Ording |
| 7,663,607 B2 | 2/2010 | Hotelling et al. |

(56) References Cited

U.S. PATENT DOCUMENTS

| | | |
|---|---|---|
| 7,664,748 B2 | 2/2010 | Harrity |
| 7,694,231 B2 | 4/2010 | Kocienda et al. |
| 7,706,616 B2 | 4/2010 | Kristensson et al. |
| 7,714,849 B2 | 5/2010 | Pryor |
| 7,746,325 B2 | 6/2010 | Roberts |
| 7,831,932 B2 | 11/2010 | Josephsoon et al. |
| 7,856,472 B2 | 12/2010 | Arav |
| 7,861,188 B2 | 12/2010 | Josephsoon et al. |
| 7,877,705 B2 | 1/2011 | Chambers et al. |
| 7,898,529 B2 | 3/2011 | Fitzmaurice et al. |
| 8,228,305 B2 | 7/2012 | Pryor |
| 8,239,784 B2 | 8/2012 | Hotelling et al. |
| 8,314,775 B2 | 11/2012 | Westerman et al. |
| 8,330,727 B2 | 12/2012 | Westerman et al. |
| 8,334,846 B2 | 12/2012 | Westerman et al. |
| 8,381,135 B2 | 2/2013 | Hotelling et al. |
| 8,384,675 B2 | 2/2013 | Westerman et al. |
| 8,427,449 B2 | 4/2013 | Pryor |
| 8,441,453 B2 | 5/2013 | Westerman et al. |
| 8,466,880 B2 | 6/2013 | Westerman et al. |
| 8,466,881 B2 | 6/2013 | Westerman et al. |
| 8,479,122 B2 | 7/2013 | Hotelling et al. |
| 8,482,533 B2 | 7/2013 | Westerman et al. |
| 8,482,535 B2 | 7/2013 | Pryor |
| 2001/0012001 A1 | 8/2001 | Rekimoto et al. |
| 2001/0012022 A1 | 8/2001 | Smith |
| 2001/0012769 A1 | 8/2001 | Sirola et al. |
| 2001/0015718 A1 | 8/2001 | Hinckley et al. |
| 2001/0026678 A1 | 10/2001 | Nagasaka et al. |
| 2001/0040554 A1 | 11/2001 | Nakagawa |
| 2001/0055038 A1 | 12/2001 | Kim |
| 2002/0015024 A1 | 2/2002 | Westerman et al. |
| 2002/0044132 A1 | 4/2002 | Fish |
| 2002/0044161 A1 | 4/2002 | Sugai |
| 2002/0051018 A1 | 5/2002 | Yeh |
| 2002/0054175 A1 | 5/2002 | Miettinen et al. |
| 2002/0075317 A1 | 6/2002 | Dardick |
| 2002/0080123 A1 | 6/2002 | Kennedy et al. |
| 2002/0085037 A1 | 7/2002 | Leavitt et al. |
| 2002/0113778 A1 | 8/2002 | Rekimoto et al. |
| 2002/0118848 A1 | 8/2002 | Karpenstein |
| 2002/0120543 A1 | 8/2002 | Brittingham et al. |
| 2002/0130839 A1 | 9/2002 | Wallace et al. |
| 2002/0133522 A1 | 9/2002 | Greetham et al. |
| 2002/0135615 A1 | 9/2002 | Lang |
| 2002/0140633 A1 | 10/2002 | Rafii et al. |
| 2002/0140668 A1 | 10/2002 | Crawford |
| 2002/0140679 A1 | 10/2002 | Wen |
| 2002/0140680 A1 | 10/2002 | Lu |
| 2002/0167545 A1 | 11/2002 | Kang et al. |
| 2002/0180763 A1 | 12/2002 | Kung et al. |
| 2002/0191029 A1 | 12/2002 | Gillespie et al. |
| 2002/0196227 A1 | 12/2002 | Surloff et al. |
| 2002/0196238 A1 | 12/2002 | Tsukada et al. |
| 2002/0196274 A1 | 12/2002 | Comfort et al. |
| 2003/0001899 A1 | 1/2003 | Partanen et al. |
| 2003/0005454 A1 | 1/2003 | Rodriguez et al. |
| 2003/0006974 A1 | 1/2003 | Clough et al. |
| 2003/0016253 A1 | 1/2003 | Aoki et al. |
| 2003/0030664 A1 | 2/2003 | Parry |
| 2003/0063073 A1 | 4/2003 | Geaghan et al. |
| 2003/0071850 A1 | 4/2003 | Geidl |
| 2003/0071858 A1 | 4/2003 | Morohoshi |
| 2003/0072077 A1 | 4/2003 | Peterson et al. |
| 2003/0073461 A1 | 4/2003 | Sinclair |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0076363 A1 | 4/2003 | Murphy |
| 2003/0095095 A1 | 5/2003 | Pihlaja |
| 2003/0095096 A1 | 5/2003 | Robbin et al. |
| 2003/0095135 A1 | 5/2003 | Kaasila et al. |
| 2003/0098858 A1 | 5/2003 | Perski et al. |
| 2003/0128188 A1 | 7/2003 | Wilbrink et al. |
| 2003/0128195 A1 | 7/2003 | Banerjee et al. |
| 2003/0132922 A1* | 7/2003 | Philipp .................. 345/173 |
| 2003/0132950 A1 | 7/2003 | Sucuru et al. |
| 2003/0152241 A1 | 8/2003 | Eastty et al. |
| 2003/0160808 A1 | 8/2003 | Foote et al. |
| 2003/0164820 A1 | 9/2003 | Kent |
| 2003/0169303 A1 | 9/2003 | Islam et al. |
| 2003/0179201 A1 | 9/2003 | Thacker |
| 2003/0193481 A1 | 10/2003 | Sokolsky |
| 2003/0197736 A1 | 10/2003 | Murphy |
| 2003/0201972 A1 | 10/2003 | Usuda |
| 2003/0206202 A1 | 11/2003 | Moriya |
| 2003/0210260 A1 | 11/2003 | Palmer et al. |
| 2003/0210286 A1 | 11/2003 | Gerpheide et al. |
| 2003/0214534 A1 | 11/2003 | Uemura et al. |
| 2003/0222977 A1 | 12/2003 | Yoshino |
| 2003/0234768 A1 | 12/2003 | Rekimoto et al. |
| 2003/0237043 A1 | 12/2003 | Novak et al. |
| 2004/0001048 A1 | 1/2004 | Kraus et al. |
| 2004/0009788 A1 | 1/2004 | Mantyjarvi et al. |
| 2004/0017499 A1 | 1/2004 | Ambiru |
| 2004/0019505 A1 | 1/2004 | Bowman et al. |
| 2004/0021643 A1 | 2/2004 | Hoshino et al. |
| 2004/0021644 A1 | 2/2004 | Enomoto |
| 2004/0021696 A1 | 2/2004 | Molgaard |
| 2004/0036622 A1 | 2/2004 | Dukach et al. |
| 2004/0046887 A1 | 3/2004 | Ikehata et al. |
| 2004/0053661 A1 | 3/2004 | Jones et al. |
| 2004/0056837 A1 | 3/2004 | Koga et al. |
| 2004/0056839 A1 | 3/2004 | Yoshihara |
| 2004/0056849 A1 | 3/2004 | Lohbihler et al. |
| 2004/0064473 A1 | 4/2004 | Thomas et al. |
| 2004/0080529 A1 | 4/2004 | Wojcik |
| 2004/0100479 A1 | 5/2004 | Nakano et al. |
| 2004/0119750 A1 | 6/2004 | Harrison |
| 2004/0125081 A1 | 7/2004 | Hayakawa |
| 2004/0134238 A1 | 7/2004 | Buckroyd et al. |
| 2004/0135774 A1 | 7/2004 | La Monica |
| 2004/0135818 A1 | 7/2004 | Thomson et al. |
| 2004/0136564 A1 | 7/2004 | Roeber et al. |
| 2004/0140956 A1 | 7/2004 | Kushler et al. |
| 2004/0141157 A1 | 7/2004 | Ramachandran et al. |
| 2004/0145601 A1 | 7/2004 | Brielmann et al. |
| 2004/0146688 A1 | 7/2004 | Treat |
| 2004/0150668 A1 | 8/2004 | Myers et al. |
| 2004/0150669 A1 | 8/2004 | Sabiers et al. |
| 2004/0155888 A1 | 8/2004 | Padgitt et al. |
| 2004/0160419 A1 | 8/2004 | Padgitt |
| 2004/0165924 A1 | 8/2004 | Griffin |
| 2004/0178994 A1 | 9/2004 | Kairls, Jr. |
| 2004/0181749 A1 | 9/2004 | Chellapilla et al. |
| 2004/0183833 A1 | 9/2004 | Chua |
| 2004/0189720 A1 | 9/2004 | Wilson et al. |
| 2004/0198463 A1 | 10/2004 | Knoedgen |
| 2004/0218963 A1 | 11/2004 | Van Diepen et al. |
| 2004/0227739 A1 | 11/2004 | Tani et al. |
| 2004/0227830 A1 | 11/2004 | Kobayashi et al. |
| 2004/0230912 A1 | 11/2004 | Clow et al. |
| 2004/0237052 A1 | 11/2004 | Allport |
| 2004/0245352 A1 | 12/2004 | Smith |
| 2004/0262387 A1 | 12/2004 | Hart |
| 2004/0263484 A1 | 12/2004 | Mantysalo et al. |
| 2005/0005241 A1 | 1/2005 | Hunleth et al. |
| 2005/0012723 A1 | 1/2005 | Pallakoff |
| 2005/0015731 A1 | 1/2005 | Mak et al. |
| 2005/0016366 A1 | 1/2005 | Ito et al. |
| 2005/0024341 A1 | 2/2005 | Gillespie et al. |
| 2005/0052425 A1 | 3/2005 | Zadesky et al. |
| 2005/0052427 A1 | 3/2005 | Wu et al. |
| 2005/0057524 A1 | 3/2005 | Hill et al. |
| 2005/0064936 A1 | 3/2005 | Pryor |
| 2005/0066270 A1 | 3/2005 | Ali et al. |
| 2005/0071771 A1 | 3/2005 | Nagasawa et al. |
| 2005/0078087 A1 | 4/2005 | Gates et al. |
| 2005/0091577 A1 | 4/2005 | Torres et al. |
| 2005/0104867 A1 | 5/2005 | Westerman et al. |
| 2005/0110768 A1 | 5/2005 | Marriott et al. |
| 2005/0116941 A1 | 6/2005 | Wallington |
| 2005/0120312 A1 | 6/2005 | Nguyen |
| 2005/0132072 A1 | 6/2005 | Pennell et al. |

(56) References Cited

U.S. PATENT DOCUMENTS

| | | |
|---|---|---|
| 2005/0134578 A1 | 6/2005 | Chambers et al. |
| 2005/0162402 A1 | 7/2005 | Watanachote |
| 2005/0169527 A1 | 8/2005 | Longe et al. |
| 2005/0171783 A1 | 8/2005 | Suominen |
| 2005/0174975 A1 | 8/2005 | Mgrdechian et al. |
| 2005/0190970 A1 | 9/2005 | Griffin |
| 2005/0204008 A1 | 9/2005 | Shinbrood |
| 2005/0204889 A1 | 9/2005 | Swingle et al. |
| 2005/0211766 A1 | 9/2005 | Robertson et al. |
| 2005/0223308 A1 | 10/2005 | Gunn et al. |
| 2005/0253816 A1 | 11/2005 | Himberg et al. |
| 2005/0253818 A1 | 11/2005 | Nettamo |
| 2005/0259087 A1 | 11/2005 | Hoshino et al. |
| 2006/0001650 A1 | 1/2006 | Robbins et al. |
| 2006/0007174 A1 | 1/2006 | Shen |
| 2006/0010374 A1 | 1/2006 | Corrington et al. |
| 2006/0010400 A1 | 1/2006 | Dehlin et al. |
| 2006/0012577 A1* | 1/2006 | Kyrola ............... 345/173 |
| 2006/0022955 A1 | 2/2006 | Kennedy |
| 2006/0022956 A1 | 2/2006 | Lengeling et al. |
| 2006/0026335 A1 | 2/2006 | Hotelling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031752 A1 | 2/2006 | Surloff et al. |
| 2006/0032680 A1 | 2/2006 | Elias et al. |
| 2006/0033724 A1 | 2/2006 | Chaudhri et al. |
| 2006/0035681 A1 | 2/2006 | Oh |
| 2006/0044259 A1 | 3/2006 | Hotelling et al. |
| 2006/0052885 A1 | 3/2006 | Kong |
| 2006/0053387 A1 | 3/2006 | Ording |
| 2006/0066582 A1 | 3/2006 | Lyon et al. |
| 2006/0066590 A1 | 3/2006 | Ozawa et al. |
| 2006/0071915 A1 | 4/2006 | Rehm |
| 2006/0085757 A1 | 4/2006 | Andre et al. |
| 2006/0085767 A1 | 4/2006 | Hinckley et al. |
| 2006/0150120 A1 | 7/2006 | Dresti et al. |
| 2006/0161846 A1 | 7/2006 | Van Leeuwen |
| 2006/0161870 A1 | 7/2006 | Hotelling et al. |
| 2006/0161871 A1 | 7/2006 | Hotelling et al. |
| 2006/0167993 A1 | 7/2006 | Aaron et al. |
| 2006/0181517 A1 | 8/2006 | Zadesky et al. |
| 2006/0181519 A1 | 8/2006 | Vernier et al. |
| 2006/0197750 A1 | 9/2006 | Hotelling et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0242587 A1 | 10/2006 | Eagle et al. |
| 2006/0242607 A1 | 10/2006 | Hudson |
| 2006/0244735 A1* | 11/2006 | Wilson ............... 345/173 |
| 2006/0253793 A1 | 11/2006 | Zhai et al. |
| 2006/0265668 A1 | 11/2006 | Rainisto |
| 2006/0274051 A1 | 12/2006 | Longe et al. |
| 2006/0290921 A1 | 12/2006 | Hotelling et al. |
| 2007/0011603 A1 | 1/2007 | Makela |
| 2007/0033269 A1 | 2/2007 | Atkinson et al. |
| 2007/0061754 A1 | 3/2007 | Ardhanari et al. |
| 2007/0070050 A1 | 3/2007 | Westerman et al. |
| 2007/0070051 A1 | 3/2007 | Westerman et al. |
| 2007/0070052 A1 | 3/2007 | Westerman et al. |
| 2007/0078919 A1 | 4/2007 | Westerman et al. |
| 2007/0081726 A1 | 4/2007 | Westerman et al. |
| 2007/0083823 A1 | 4/2007 | Jaeger |
| 2007/0087766 A1 | 4/2007 | Hardy et al. |
| 2007/0088787 A1 | 4/2007 | Hardy et al. |
| 2007/0139395 A1 | 6/2007 | Westerman et al. |
| 2007/0159453 A1 | 7/2007 | Inoue |
| 2007/0171210 A1 | 7/2007 | Chaudhri et al. |
| 2007/0177803 A1 | 8/2007 | Elias et al. |
| 2007/0177804 A1 | 8/2007 | Elias et al. |
| 2007/0180360 A1 | 8/2007 | Neil |
| 2007/0222768 A1 | 9/2007 | Geurts et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2007/0276875 A1 | 11/2007 | Brunswig et al. |
| 2008/0016468 A1 | 1/2008 | Chambers et al. |
| 2008/0024463 A1 | 1/2008 | Pryor |
| 2008/0036743 A1 | 2/2008 | Westerman et al. |
| 2008/0041639 A1 | 2/2008 | Westerman et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0088587 A1 | 4/2008 | Pryor |
| 2008/0128182 A1 | 6/2008 | Westerman et al. |
| 2008/0129707 A1 | 6/2008 | Pryor |
| 2008/0139297 A1 | 6/2008 | Beaulieu et al. |
| 2008/0174553 A1 | 7/2008 | Trust |
| 2008/0189622 A1 | 8/2008 | Sanchez et al. |
| 2008/0211775 A1 | 9/2008 | Hotelling et al. |
| 2008/0211779 A1 | 9/2008 | Pryor |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0229236 A1 | 9/2008 | Carrer et al. |
| 2008/0231610 A1 | 9/2008 | Hotelling et al. |
| 2008/0297476 A1 | 12/2008 | Hotelling et al. |
| 2008/0316183 A1 | 12/2008 | Westerman et al. |
| 2009/0021489 A1 | 1/2009 | Westerman et al. |
| 2009/0064006 A1 | 3/2009 | Naick et al. |
| 2009/0160816 A1 | 6/2009 | Westerman et al. |
| 2009/0244031 A1 | 10/2009 | Westerman et al. |
| 2009/0244032 A1 | 10/2009 | Westerman et al. |
| 2009/0244033 A1 | 10/2009 | Westerman et al. |
| 2009/0249236 A1 | 10/2009 | Westerman et al. |
| 2009/0251435 A1 | 10/2009 | Westerman et al. |
| 2009/0251438 A1 | 10/2009 | Westerman et al. |
| 2009/0251439 A1 | 10/2009 | Westerman et al. |
| 2009/0267921 A1 | 10/2009 | Pryor |
| 2009/0273563 A1 | 11/2009 | Pryor |
| 2009/0273574 A1 | 11/2009 | Pryor |
| 2009/0273575 A1 | 11/2009 | Pryor |
| 2009/0300531 A1 | 12/2009 | Pryor |
| 2009/0322499 A1 | 12/2009 | Pryor |
| 2010/0149092 A1 | 6/2010 | Westerman et al. |
| 2010/0149134 A1 | 6/2010 | Westerman et al. |
| 2010/0231506 A1 | 9/2010 | Pryor |
| 2011/0037725 A1 | 2/2011 | Pryor |
| 2012/0293440 A1 | 11/2012 | Hotelling et al. |
| 2012/0293442 A1 | 11/2012 | Westerman et al. |
| 2013/0009900 A1 | 1/2013 | Pryor |
| 2013/0147761 A1 | 6/2013 | Westerman et al. |

FOREIGN PATENT DOCUMENTS

| | | |
|---|---|---|
| DE | 100 59 906 A1 | 6/2002 |
| DE | 101 40 874 A1 | 3/2003 |
| DE | 102 51 296 A1 | 5/2004 |
| EP | 0 394 614 A2 | 10/1990 |
| EP | 0 422 577 A2 | 4/1991 |
| EP | 0 422 577 A3 | 4/1991 |
| EP | 0 462 759 A2 | 12/1991 |
| EP | 0 462 759 A3 | 12/1991 |
| EP | 0 462 759 B1 | 12/1991 |
| EP | 0 464 908 | 1/1992 |
| EP | 0 288 692 | 7/1993 |
| EP | 0 588 210 A1 | 3/1994 |
| EP | 0 588 210 B1 | 3/1994 |
| EP | 0 622 722 A2 | 11/1994 |
| EP | 0 622 722 A3 | 11/1994 |
| EP | 0 622 722 B1 | 11/1994 |
| EP | 0 664 504 | 7/1995 |
| EP | 0 817 000 A1 | 1/1998 |
| EP | 0 817 000 B1 | 1/1998 |

(56) References Cited

FOREIGN PATENT DOCUMENTS

| | | |
|---|---|---|
| EP | 0 880 090 A2 | 11/1998 |
| EP | 0 880 090 A3 | 11/1998 |
| EP | 0 926 588 A2 | 6/1999 |
| EP | 1 014 295 | 1/2002 |
| EP | 1 233 330 A2 | 8/2002 |
| EP | 1 271 295 A2 | 1/2003 |
| EP | 1 271 295 A3 | 1/2003 |
| EP | 1 517 228 A2 | 3/2005 |
| EP | 1 569 079 A1 | 8/2005 |
| EP | 1 505 484 A1 | 9/2005 |
| EP | 1 674 976 A2 | 6/2006 |
| EP | 1 674 976 A3 | 6/2006 |
| GB | 2330670 A | 4/1999 |
| GB | 2 332 293 A | 6/1999 |
| GB | 2 337 349 A1 | 11/1999 |
| GB | 2344894 A | 6/2000 |
| GB | 2 351 639 A | 1/2001 |
| GB | 2 380 583 A | 4/2003 |
| JP | 60-198586 A | 10/1985 |
| JP | 63-167923 A | 7/1988 |
| JP | 04-048318 A | 2/1992 |
| JP | 04-054523 A | 2/1992 |
| JP | 04-198795 A | 7/1992 |
| JP | 05-297979 A | 11/1993 |
| JP | 06-161661 A | 6/1994 |
| JP | 7-129312 A | 5/1995 |
| JP | 7-230352 A | 8/1995 |
| JP | 09-033278 A | 2/1997 |
| JP | 9-330175 A | 12/1997 |
| JP | 10-039748 A | 2/1998 |
| JP | 10-171600 A | 6/1998 |
| JP | 11-053093 A | 2/1999 |
| JP | 11-073271 A | 3/1999 |
| JP | 11-085380 A | 3/1999 |
| JP | 11-119911 A | 4/1999 |
| JP | 11-133816 A | 5/1999 |
| JP | 11-175258 A | 7/1999 |
| JP | 11-194863 A | 7/1999 |
| JP | 2000-010705 A | 1/2000 |
| JP | 2000-163031 A | 6/2000 |
| JP | 2000-163193 A | 6/2000 |
| JP | 2000-163444 A | 6/2000 |
| JP | 2000-231670 A | 8/2000 |
| JP | 2001-134382 A | 5/2001 |
| JP | 2001-147918 A | 5/2001 |
| JP | 2001-230992 A | 8/2001 |
| JP | 2001-356870 A | 12/2001 |
| JP | 2002-034023 A | 1/2002 |
| JP | 2002-501271 A | 1/2002 |
| JP | 2002-342033 A | 11/2002 |
| JP | 2003-173237 A | 6/2003 |
| JP | 2004-110388 A | 4/2004 |
| KR | 10-2001-0040410 A | 5/2001 |
| KR | 4057131 A | 7/2004 |
| WO | WO-92/02000 A | 2/1992 |
| WO | WO-94/29788 A1 | 12/1994 |
| WO | WO-97/18547 | 5/1997 |
| WO | WO-97/23738 | 7/1997 |
| WO | WO-97/36225 A1 | 10/1997 |
| WO | WO-97/40744 A1 | 11/1997 |
| WO | WO-98/14863 | 4/1998 |
| WO | WO-98/33111 A1 | 7/1998 |
| WO | WO-99/28813 A1 | 6/1999 |
| WO | WO-99/38149 A1 | 7/1999 |
| WO | WO-99/54807 A1 | 10/1999 |
| WO | WO-00/38042 A1 | 6/2000 |
| WO | WO-01/02949 A1 | 1/2001 |
| WO | WO-02/01482 A1 | 1/2002 |
| WO | WO-02/39245 A2 | 5/2002 |
| WO | WO-02/39245 A3 | 5/2002 |
| WO | WO-02/39245 C2 | 5/2002 |
| WO | WO-03/027822 A2 | 4/2003 |
| WO | WO-03/027822 A3 | 4/2003 |
| WO | WO-03/036457 A2 | 5/2003 |
| WO | WO-03/036457 A3 | 5/2003 |
| WO | WO-03/062978 A2 | 7/2003 |
| WO | WO-03/062978 A3 | 7/2003 |
| WO | WO-03/088176 | 10/2003 |
| WO | WO-03/098417 A2 | 11/2003 |
| WO | WO-03/098417 A3 | 11/2003 |
| WO | WO-03/098421 A1 | 11/2003 |
| WO | WO-2004/029789 A2 | 4/2004 |
| WO | WO-2004/029789 A3 | 4/2004 |
| WO | WO-2004/047069 A1 | 6/2004 |
| WO | WO-2004/051392 A2 | 6/2004 |
| WO | WO-2004/051392 A3 | 6/2004 |
| WO | WO-2004/091956 A2 | 10/2004 |
| WO | WO-2004/091956 A3 | 10/2004 |
| WO | WO-2005/064442 A1 | 7/2005 |
| WO | WO-2005/114369 A2 | 12/2005 |
| WO | WO-2006/003590 A2 | 1/2006 |
| WO | WO-2006/003590 A3 | 1/2006 |
| WO | WO-2006/020304 A2 | 2/2006 |
| WO | WO-2006/020304 A3 | 2/2006 |
| WO | WO-2006/020305 A2 | 2/2006 |
| WO | WO-2006/020305 A3 | 2/2006 |
| WO | WO-2006/023569 | 3/2006 |
| WO | WO-2006/026012 A2 | 3/2006 |
| WO | WO-2007/037808 A1 | 4/2007 |
| WO | WO-2007/037809 A1 | 4/2007 |
| WO | WO-2004/089766 A2 | 8/2007 |
| WO | WO-2007/089766 A3 | 8/2007 |
| WO | WO-2008/094791 A2 | 7/2008 |
| WO | WO-2008/094791 A3 | 7/2008 |
| WO | WO-2010/135478 A2 | 11/2010 |

OTHER PUBLICATIONS

Final Office Action mailed Jul. 11, 2013, for U.S. Appl. No. 13/757,726, filed Feb. 1, 2013, nine pages.
Non-Final Office Action mailed Jun. 21, 2013, for U.S. Appl. No. 11/830,774, filed Jul. 30, 2007, 18 pages.
Non-Final Office Action mailed Jul. 18, 2013, for U.S. Appl. No. 11/830,766, filed Jul. 30, 2007, 15 pages.
Notice of Allowance mailed May 31, 2013, for U.S. Appl. No. 11/878,024, filed Jul. 20, 2007, nine pages.
Notice of Allowance mailed Jul. 8, 2013, for U.S. Appl. No. 12/500,984, filed Jul. 10, 2009, 6 pages.
Annex to Form PCT/ISA/206 Communication Relating to the Results of the Partial International Search Received in Corresponding PCT Application No. PCT/US2005/025641 dated Feb. 19, 2007.
Anonymous. "Touch Technologies Overview" 2001, 3M Touch Systems, Massachusetts.
Anonymous. (2005). "Gesture Recognition," located at <http://www.fingerworks.com/gesture_recognition.html>, last visited Aug. 30, 2005.
Anonymous. (2005). "iGesture Products for Everyone (Learn in Minutes)," *Finger Works*, downloaded Aug. 30, 2005.
Anonymous. (2005). "Touch Technologies: Touch is Everywhere," located at http://www.3m.com/3MTouchSystems/downloads/PDFs/TouchTechOV.pdf., last visited Aug. 30, 2005.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCAL_COPIES/COHEN/gesture_ overview. Html, generated Apr. 20, 2004.
Anonymous. "Ai Squared Products—XoomText Magnifier," http://www/aisquared.com/Products/zoomtexturemag/index.cfm, downloaded Oct. 26, 2005.
Anonymous. "Ai Squared Products," http://www.aisquared.com/Products/index.cfm, downloaded Oct. 25, 2005.
Anonymous. "Capacitive Position Sensing" obtained from http://www.synaptics.com/technology/cps.cfm generated Aug. 5, 2005.
Anonymous. "Capacitive Touchscreens" obtained from http://www.touchscreens.com/intro-touchtypes-capacitive.html generated Aug. 5, 2005.

(56) References Cited

OTHER PUBLICATIONS

Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip.html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "Gesture Recognition" http://www.fingerworks.com/gesture_recognition.html>, Jul. 2, 2006.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the Multi Finger USB Touch Pad with Whole-Hand Gestures,"obtained from http://www.fingerworks.com/igesture.html, generated Aug. 27, 2004, 2-pgs.
Anonymous. "iGesture Products for Everyone (learn in minutes) Product Overview"FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Lunar Screen Magnifier and Lunar Plus Enhanced Screen Magnifier," www.dolphincomputeraccess.com/products/lunar.htm, downloaded Oct. 25, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Touchscreen Technology Choices," http://www.elotouch.com/products/detech2.asp, downloaded Aug. 5, 2005.
Anonymous. "Visual Disabilities," http://depts.stcc.edu/ods/ACCESS/bpvisual.htm, downloaded Oct. 25, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Anonymous. (2011). "Jog Dial" located at http://www.ask.com/wiki/Jog_dial, last visited Feb. 27, 2011, two pages.
Anonymous. (Apr. 1, 1994). "Jog Shuttle Graphical," *IBM Technical Disclosure Bulletin*, 37(4A):47-48.
Anonymous. (2011). "(graphical or virtual) (jog dial) or (jog wheel) or (scroll wheel)," Ask Search located at http://www.ask.com/web?q=%28graphical+or+virtual%29++%28jog+job+dial%29+or+%28jo . . . , last visited Feb. 27, 2011, two pages.
Anonymous. (2011). "What Is a Jog Wheel?" Ask Search located at http://www.ask.com/web?q=what+is+a+jog+wheel&search=&qsrc=0&o=0&1=dirlast visited on Feb. 27, 2011, two pages.
Anonymous. (2012). "Emulating Mouse Scroll Wheel?" Ask Search located at http://www.ask.com/web?q=emulate+scroll+wheel&qsrc=1&o=0&1=dir&qid=A23E49EA, last visited Mar. 23, 2012, one page.
Anonymous. (2012). "Virtual Scroll Wheel," Ask Search located at http://www.ask.com/web?q=virtual+scroll+wheel&qsrc=0&o=0&1=dir&oo=0, last visited Mar. 23, 2012, two pages.
Bales, J. W. et al. (Apr. 1981). "Marking Parts to Aid Robot Vision," NASA Technical Paper 1819, 37 pages.
Bier et al., "Toolglass and Magic Lenses: The see-through interface" in James Kijiya, editor, Computer Graphics (SIGGRAPH '93 Proceedings), vol. 27, pp. 73-80, Aug. 1993.
Buxton, W. et al. (Jul. 22, 1985). "Issues and Techniques in Touch-Sensitive Tablet Input," *Proceedings ACM Siggraph*, pp. 215-224.
Chang, C-C. et al. (Aug. 1, 1993). "A Hashing-Oriented Nearest Neighbor Searching Scheme," *Pattern Recognition Letters*, 14(8):625-630.
Chen et al. "Flowfield and Beyond: Applying Pressure-Sensitive Multi-Point Touchpad Interaction," *Multimedia and Expo, 2003, ICME '03, Proceedings*, Jul. 9, 2003, pp. 1-49, 152.
Crowley, J.L. (Mar. 1, 1997). "Vision for Man-Machine Interaction," *Robotics and Autonomous Systems*, 19(3-4):347-358.
Davis, J. et al. (May 2, 1994). "Recognizing Hand Gestures," *European Conference on Computer Vision*, Berlin, DE, 1:331-340.
Davis, J. et al. (Oct. 31, 1994). "Determining 3-D Hand Motion," *Signals, Systems and Computers, 1994 Conference Record of the 28th Asilomar Conference on Pacific Grove*, CA, Oct. 31-Nov. 2, 1994, Los Alamitos, CA, pp. 1262-1266.
Douglas et al., *The Ergonomics of Computer Pointing Devices* (1997).
European examination report for European Patent Application No. 06016830.9, mailed Aug. 6, 2008.
European examination report for European Patent Application No. 06016856.4, mailed Sep. 16, 2008.
European examination report for European patent Application No. 99904228.6, mailed Apr. 20, 2006.
European examination report for European Patent Application No. 99904228.6, mailed Mar. 23, 2007.
European search report for European Patent Application No. 06016830.9, mailed Dec. 3, 2007.
European Search Report mailed Dec. 12, 2008, for EP Application No. 06016855.6 filed Jan. 25, 1999, six pages.
European Search Report mailed Dec. 13, 2007, for EP Application No. 05772892.5, filed Jul. 19, 2005, three pages.

(56) References Cited

OTHER PUBLICATIONS

European Search Report mailed Dec. 15, 2008, for EP Application No. 08016449.4, filed Jul. 19, 2005, six pages.
European Search Report mailed Dec. 15, 2008, for EP Application No. 08016450.2, filed Jul. 19, 2005, six pages.
European Search Report mailed Dec. 23, 2008, for EP Application No. 06016831.7 filed Jan. 25, 1999, seven pages.
European Search Report mailed Jan. 9, 2009, for EP Application No. 06016832.5 filed Jan. 25, 1999, four pages.
European Search Report mailed Jun. 8, 2012, for EP Application No. 12166818.0, filed Jan. 30, 2007, seven pages.
European Search Report mailed Jun. 14, 2012, for EP Application No. 12166820.6, filed Jan. 30, 2007, six pages.
European Search Report received in EP 1 621 989 (@ Beyer Weaver & Thomas, LLP) dated Mar. 27, 2006.
European supplementary search report for European Patent Application No. 99904228.6, mailed Feb. 16, 2005.
EVB Elektronik "TSOP6238 IR Receiver Modules for Infrared Remote Control Systems" dated Jan. 2004 1-pg.
Extended European search report for European Patent Application No. 06016858.0, mailed Dec. 21, 2007.
Extended European search report for European Patent Application No. 06016856.4, mailed Mar. 14, 2008.
Final Office Action mailed Dec. 20, 2007, for U.S. Appl. No. 10/927,925, filed Aug. 26, 2004, 25 pages.
Final Office Action mailed May 21, 2008, for U.S. Appl. No. 11/048,264, filed Jan. 31, 2005, 11 pages.
Final Office Action mailed Oct. 16, 2008, for U.S. Appl. No. 11/038,590, filed Jan. 18, 2005, 35 pages.
Final Office Action mailed Nov. 10, 2008, for U.S. Appl. No. 10/927,925, filed Aug. 26, 2004, 22 pages.
Final Office Action mailed Dec. 23, 2008, for U.S. Appl. No. 10/903,964, filed Jul. 30, 2004, 12 pages.
Final Office Action mailed Dec. 24, 2008, for U.S. Appl. No. 11/240,788, filed Sep. 30, 2005, 12 pages.
Final Office Action mailed Mar. 5, 2009, for U.S. Appl. No. 11/228,758, filed Sep. 16, 2005, 15 pages.
Final Office Action mailed Mar. 17, 2009, for U.S. Appl. No. 11/241,839, filed Sep. 30, 2005, 16 pages.
Final Office Action mailed Mar. 19, 2009, for U.S. Appl. No. 11/428,506, filed Jul. 3, 2006, seven pages.
Final Office Action mailed Jul. 7, 2009, for U.S. Appl. No. 11/048,264, filed Jan. 31, 2005, 14 pages.
Final Office Action mailed Nov. 12, 2009, for U.S. Appl. No. 11/349,350, filed Feb. 8, 2006, nine pages.
Final Office Action mailed Nov. 19, 2009, for U.S. Appl. No. 11/428,515, filed Jul. 3, 2006, 14 pages.
Final Office Action mailed Dec. 31, 2009, for U.S. Appl. No. 11/038,590, filed Jan. 18, 2005, 36 pages.
Final Office Action mailed Apr. 14, 2010, for U.S. Appl. No. 11/559,736, filed Nov. 14, 2006, 11 pages.
Final Office Action mailed May 12, 2010, for U.S. Appl. No. 11/428,503, filed Jul. 3, 2006, 12 pages.
Final Office Action mailed Jun. 4, 2010, for U.S. Appl. No. 10/903,964, filed Jul. 30, 2004, 22 pages.
Final Office Action mailed Jun. 11, 2010, for U.S. Appl. No. 11/559,833, filed Nov. 14, 2006, eight pages.
Final Office Action mailed Jul. 6, 2010, for U.S. Appl. No. 11/048,264, filed Jan. 31, 2005, 12 pages.
Final Office Action mailed Jul. 19, 2010, for U.S. Appl. No. 11/428,522, filed Jul. 3, 2006, six pages.
Final Office Action mailed Jul. 20, 2010, for U.S. Appl. No. 11/228,758, filed Sep. 16, 2005, 19 pages.
Final Office Action mailed Aug. 17, 2010, for U.S. Appl. No. 11/240,788, filed Sep. 30, 2005, nine pages.
Final Office Action mailed Sep. 2, 2010, for U.S. Appl. No. 11/272,868, filed Nov. 15, 2005, nine pages.
Final Office Action mailed Oct. 19, 2010, for U.S. Appl. No. 11/559,799, filed Nov. 14, 2006, eight pages.
Final Office Action mailed Oct. 29, 2010, for U.S. Appl. No. 11/559,763, filed Nov. 14, 2006, 15 pages.
Final Office Action mailed Nov. 23, 2010, for U.S. Appl. No. 11/696,693, filed Apr. 4, 2007, 24 pages.
Final Office Action mailed Nov. 23, 2010, for U.S. Appl. No. 11/830,801, filed Jul. 30, 2007, 13 pages.
Final Office Action mailed Nov. 26, 2010, for U.S. Appl. No. 11/830,793, filed Jul. 30, 2007, nine pages.
Final Office Action mailed Dec. 2, 2010, for U.S. Appl. No. 11/830,815, filed Jul. 30, 2007, nine pages.
Final Office Action mailed Dec. 3, 2010, for U.S. Appl. No. 11/830,788, filed Jul. 30, 2007, 15 pages.
Final Office Action mailed Jan. 19, 2011, for U.S. Appl. No. 11/980,721, filed Oct. 31, 2007, nine pages.
Final Office Action mailed Mar. 9, 2011, for U.S. Appl. No. 11/980,722, filed Oct. 31, 2007, 11 pages.
Final Office Action mailed Mar. 21, 2011, for U.S. Appl. No. 11/832,134, filed Aug. 1, 2007, 33 pages.
Final Office Action mailed Apr. 21, 2011, for U.S. Appl. No. 11/830,808, filed Jul. 30, 2007, 10 pages.
Final Office Action mailed May 11, 2011, for U.S. Appl. No. 11/048,264, filed Jan. 31, 2005, 12 pages.
Final Office Action mailed May 27, 2011, for U.S. Appl. No. 11/700,636, filed Jan. 30, 2007, nine pages.
Final Office Action mailed Aug. 10, 2011, for U.S. Appl. No. 11/240,788, filed Sep. 30, 2005, seven pages.
Final Office Action mailed Sep. 27, 2011, for U.S. Appl. No. 11/830,774, filed Jul. 30, 2007, 15 pages.
Final Office Action mailed Sep. 28, 2011, for U.S. Appl. No. 12/479,678, filed Jun. 5, 2009, 13 pages.
Final Office Action mailed Oct. 14, 2011, for U.S. Appl. No. 11/830,801, filed Jul. 30, 2007, 16 pages.
Final Office Action mailed Oct. 19, 2011, for U.S. Appl. No. 12/479,573, filed Jun. 5, 2009, 13 pages.
Final Office Action mailed Nov. 10, 2011, for U.S. Appl. No. 11/272,868, filed Nov. 15, 2005, nine pages.
Final Office Action mailed Nov. 17, 2011, for U.S. Appl. No. 11/830,781, filed Jul. 30, 2007, 16 pages.
Final Office Action mailed Nov. 17, 2011, for U.S. Appl. No. 12/479,617, filed Jun. 5, 2009, 18 pages.
Final Office Action mailed Nov. 18, 2011, for U.S. Appl. No. 11/878,024, filed Jul. 20, 2007, 18 pages.
Final Office Action mailed Nov. 28, 2011, for U.S. Appl. No. 11/038,590, filed Jan. 18, 2005, 43 pages.
Final Office Action mailed Dec. 16, 2011, for U.S. Appl. No. 12/422,212, filed Apr. 10, 2009, 20 pages.
Final Office Action mailed Feb. 3, 2012, for U.S. Appl. No. 12/422,205, filed Apr. 10, 2009, 16 pages.
Final Office Action mailed Feb. 17, 2012, for U.S. Appl. No. 11/830,801, filed Jul. 30, 2007, 14 pages.
Final Office Action mailed Mar. 1, 2012, for U.S. Appl. No. 11/048,264, filed Jan. 31, 2005, 13 pages.
Final Office Action mailed Mar. 1, 2012, for U.S. Appl. No. 11/830,793, filed Jul. 30, 2007, 14 pages.
Final Office Action mailed Mar. 9, 2012, for U.S. Appl. No. 11/700,636, filed Jan. 30, 2007, nine pages.
Final Office Action mailed on Mar. 22, 2012, for U.S. Appl. No. 10/903,964, filed Jul. 30, 2004, 17 pages.
Final Office Action mailed Mar. 26, 2012, for U.S. Appl. No. 12/118,639, filed May 9, 2008, seven pages.
Final Office Action mailed Apr. 13, 2012, for U.S. Appl. No. 12/468,401, filed May 19, 2009, 21 pages.
Final Office Action mailed Apr. 16, 2012, for U.S. Appl. No. 12/422,222, filed Apr. 10, 2009, 14 pages.
Final Office Action mailed Apr. 25, 2012, for U.S. Appl. No. 12/422,197, filed Apr. 10, 2009, 12 pages.
Final Office Action mailed Apr. 27, 2012, for U.S. Appl. No. 11/830,788, filed Jul. 30, 2007, 13 pages.
Final Office Action mailed May 1, 2012, for U.S. Appl. No. 12/434,439, filed May 1, 2009, 14 pages.
Final Office Action mailed May 8, 2012, for U.S. Appl. No. 12/139,411, filed Jun. 13, 2008, seven pages.

(56) References Cited

OTHER PUBLICATIONS

Final Office Action mailed May 9, 2012, for U.S. Appl. No. 11/980,722, filed Oct. 31, 2007, 14 pages.
Final Office Action mailed May 24, 2012, for U.S. Appl. No. 11/830,757, filed Jul. 30, 2007, 19 pages.
Final Office Action mailed May 29, 2012, for U.S. Appl. No. 12/500,978, filed Jul. 10, 2009, 10 pages.
Final Office Action mailed Jun. 7, 2012, for U.S. Appl. No. 11/228,758, filed Sep. 16, 2005, 16 pages.
Final Office Action mailed Jun. 8, 2012, for U.S. Appl. No. 12/422,225, filed Apr. 10, 2009, 12 pages.
Fisher et al., "Repetitive Motion Disorders: The Design of Optimal Rate-Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," in CHI 2001 Summary, pp. 121-122, 2001.
Hardy, "Fingerworks" Mar. 7, 2002; BBC World On Line.
Hardy, I. (Mar. 7, 2002). "Fingerworks."
Heap, T. et al. (Oct. 14, 1996). "Towards 3D Hand Tracking Using a Deformable Model," *Proceedings of the $2^{nd}$ International Conference*, Killington, VT, USA, Oct. 14-16, 1996, *Automatic Face and Gesture Recognition, IEEE Comput. Soc.*, pp. 140-145.
Hillier and Gerald J. Lieberman, *Introduction to Operations Research* (1986).
International Search Report dated Mar. 3, 2006 (PCT/US 05/03325).
International search report for PCT/US99/01454, mailed May 14, 1999.
International Search Report received in corresponding PCT application No. PCT/US2006/008349 dated Oct. 6, 2006.
International Search Report mailed Apr. 24, 2007, for PCT Application No. PCT/US2005/025641 filed Jul. 19, 2005, five pages.
International Search Report mailed Aug. 28, 2007, for PCT Application No. PCT/US2004/009701, filed Mar. 31, 2004, one page.
International Search Report mailed Aug. 11, 2008, for PCT Application No. PCT/US2007/002512 filed Jan. 30, 2007, three pages.
International Search Report mailed Oct. 8, 2008, for PCT Application No. PCT/US2008/051727, filed Jan. 22, 2008, six pages.
Jacob et al., "Integrality and Separability of Input Devices," *ACM Transactions on Computer-Human Interaction*, 1:3-26 (Mar. 1994).
Japanese Office Action mailed Oct. 27, 2008, for JP Patent Application No. 2007-523644, one page.
Jones, R. (2001). "MTC Express Multi-Touch Controller," *Computer Music Journal* 25(1):97-99.
Kahney, L. (Mar. 8, 2004). "Pocket PCs Masquerade as IPods," available at: http://www.wired.com/gadgets/mac/news/2004/03/62543, last visited on Apr. 28, 2008, two pages.
Kinkley et al., "Touch-Sensing Input Devices," in CHI '99 Proceedings, pp. 223-230, 1999.
Kionx "KXP84 Series Summary Data Sheet" copyright 2005, dated Oct. 21, 2005, 4-pgs.
Korean Office Action mailed May 17, 2008, for KR Application No. 10-2007-7005010, with English Translation, 15 pages.
Lee, "A Fast Multiple-Touch-Sensitive Input Device," Master's Thesis, University of Toronto (1984).
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.].
Malik, S. et al. (2004). "Visual Touchpad: A Two-Handed Gestural Input Device," *Proceedings of the $6^{th}$ International Conference on Multimodal Interfaces*, State College, PA, Oct. 13-15, 2004, *ICMI '04, ACM* pp. 289-296.
Matsushita et al., "HoloWall: Designing a Finger, Hand, Body and Object Sensitive Wall," in Proceedings of UIST '97, Oct. 1997.

Mohri, K. (Nov. 25, 2000). "Wearable Human Interface Based on Hand/Finger Gesture Recognition," *Human Interface Association Magazine* 2(4):9-18. (Only Abstract in English.).
Nirei, K. et al. (Aug. 5, 1996). "Human Hand Tracking from Binocular Image Sequences," *Proceedings of the 1996 IEEE IECON $22^{nd}$ International Conference*, Taipei, Taiwan, Aug. 5-10, 1996, *Industrial Electronics, Control, and Instrumentation* 1(5):297-302.
Non-Final Office Action mailed Jul. 24, 2007, for U.S. Appl. No. 10/927,925, filed Aug. 26, 2004, 20 pages.
Non-Final Office Action mailed Sep. 21, 2007, for U.S. Appl. No. 11/428,515, filed Jul. 3, 2006, seven pages.
Non-Final Office Action mailed Sep. 24, 2007, for U.S. Appl. No. 11/428,506, filed Jul. 3, 2006, six pages.
Non-Final Office Action mailed Sep. 24, 2007, for U.S. Appl. No. 11/428,521, filed Jul. 3, 2006, six pages.
Non-Final Office Action mailed Sep. 28, 2007, for U.S. Appl. No. 11/048,264, filed Jan. 31, 2005, 11 pages.
Non-Final Office Action mailed Nov. 1, 2007, for U.S. Appl. No. 11/240,788, filed Sep. 30, 2005, 20 pages.
Non-Final Office Action mailed Dec. 31, 2007, for U.S. Appl. No. 11/038,590, filed Jan. 18, 2005, 32 pages.
Non-Final Office Action mailed Jan. 28, 2008, for U.S. Appl. No. 11/428,522, filed Jul. 3, 2006, seven pages.
Non-Final Office Action mailed Feb. 4, 2008, for U.S. Appl. No. 11/428,515, filed Jul. 3, 2006, six pages.
Non-Final Office Action mailed Mar. 17, 2008, for U.S. Appl. No. 10/903,964, filed Jul. 30, 2004, 34 pages.
Non-Final Office Action mailed Apr. 30, 2008, for U.S. Appl. No. 11/240,788, filed Sep. 30, 2005, 12 pages.
Non-Final Office Action mailed May 5, 2008, for U.S. Appl. No. 10/927,925, filed Aug. 26, 2004, 22 pages.
Non-Final Office Action mailed Jul. 9, 2008, for U.S. Appl. No. 11/428,521, filed Jul. 3, 2006, 11 pages.
Non-Final Office Action mailed Sep. 2, 2008, for U.S. Appl. No. 11/428,522, filed Jul. 3, 2006, six pages.
Non-Final Office Action mailed Sep. 15, 2008, for U.S. Appl. No. 11/428,506, filed Jul. 3, 2006, eight pages.
Non-Final Office Action mailed Sep. 17, 2008, for U.S. Appl. No. 11/214,839, filed Sep. 30, 2005, 18 pages.
Non-Final Office Action mailed Oct. 3, 2008, for U.S. Appl. No. 11/228,758, filed Sep. 16, 2005, 16 pages.
Non-Final Office Action mailed Oct. 31, 2008, for U.S. Appl. No. 11/428,515, filed Jul. 3, 2006, seven pages.
Non-Final Office Action mailed Dec. 11, 2008, for U.S. Appl. No. 11/048,264, filed Jan. 31, 2005, 11 pages.
Non-Final Office Action mailed Jan. 6, 2009, for U.S. Appl. No. 11/349,350, filed Feb. 8, 2006, 10 pages.
Non-Final Office Action mailed Feb. 17, 2009, for U.S. Appl. No. 11/428,522, filed Jul. 3, 2006, six pages.
Non-Final Office Action mailed Mar. 5, 2009, for U.S. Appl. No. 11/272,868, filed Nov. 15, 2005, 15 pages.
Non-Final Office Action mailed Mar. 18, 2009, for U.S. Appl. No. 11/428,515, filed Jul. 3, 2006, 12 pages.
Non-Final Office Action mailed Apr. 2, 2009, for U.S. Appl. No. 11/428,501, filed Jul. 3, 2006, 11 pages.
Non-Final Office Action mailed Apr. 2, 2009, for U.S. Appl. No. 11/428,503, filed Jul. 3, 2006, 12 pages.
Non-Final Office Action mailed Apr. 2, 2009, for U.S. Appl. No. 11/038,590, filed Jan. 18, 2005, 41 pages.
Non-Final Office Action mailed Jun. 10, 2009, for U.S. Appl. No. 10/903,964, filed Jul. 30, 2004, 15 pages.
Non-Final Office Action mailed Jun. 10, 2009, for U.S. Appl. No. 11/240,788, filed Sep. 30, 2005, 13 pages.
Non-Final Office Action mailed Aug. 18, 2009, for U.S. Appl. No. 11/228,758, filed Sep. 16, 2005, 15 pages.
Non-Final Office Action mailed Aug. 25, 2009, for U.S. Appl. No. 11/428,522, filed Jul. 3, 2006, six pages.
Non-Final Office Action mailed Sep. 2, 2009, for U.S. Appl. No. 11/559,736, filed Nov. 14, 2006, 12 pages.
Non-Final Office Action mailed Oct. 5, 2009, for U.S. Appl. No. 11/559,799, filed Nov. 14, 2006, 14 pages.
Non-Final Office Action mailed Oct. 6, 2009, for U.S. Appl. No. 11/559,763, filed Nov. 14, 2006, 24 pages.

(56) References Cited

OTHER PUBLICATIONS

Non-Final Office Action mailed Oct. 14, 2009, for U.S. Appl. No. 11/428,501, filed Jul. 3, 2006, six pages.
Non-Final Office Action mailed Oct. 29, 2009, for U.S. Appl. No. 11/559,822, filed Nov. 14, 2006, 11 pages.
Non-Final Office Action mailed Oct. 30, 2009, for U.S. Appl. No. 11/428,503, filed Jul. 3, 2006, nine pages.
Non-Final Office Action mailed Dec. 7, 2009, for U.S. Appl. No. 11/272,868, filed Nov. 15, 2005, seven pages.
Non-Final Office Action mailed Dec. 18, 2009, for U.S. Appl. No. 11/048,264, filed Jan. 31, 2005, 11 pages.
Non-Final Office Action mailed Dec. 22, 2009, for U.S. Appl. No. 11/559,833, filed Nov. 14, 2006, six pages.
Non-Final Office Action mailed Dec. 24, 2009, for U.S. Appl. No. 11/677,958, filed Feb. 22, 2007, six pages.
Non-Final Office Action mailed Jan. 27, 2010, for U.S. Appl. No. 11/428,522, filed Jul. 3, 2006, five pages.
Non-Final Office Action mailed Feb. 3, 2010, for U.S. Appl. No. 11/228,758, filed Sep. 16, 2005, 20 pages.
Non-Final Office Action mailed Mar. 2, 2010, for U.S. Appl. No. 11/240,788, filed Sep. 30, 2005, 13 pages.
Non-Final Office Action mailed May 11, 2010, for U.S. Appl. No. 11/830,788, filed Jul. 30, 2007, eight pages.
Non-Final Office Action mailed Jun. 8, 2010, for U.S. Appl. No. 11/696,693, filed Apr. 4, 2007, 27 pages.
Non-Final Office Action mailed Jun. 8, 2010, for U.S. Appl. No. 11/830,808, filed Jul. 30, 2007, 13 pages.
Non-Final Office Action mailed Jun. 9, 2010, for U.S. Appl. No. 11/830,793, filed Jul. 30, 2007, eight pages.
Non-Final Office Action mailed Jun. 10, 2010, for U.S. Appl. No. 11/830,801, filed Jul. 30, 2007, 10 pages.
Non-Final Office Action mailed Jun. 22, 2010, for U.S. Appl. No. 11/830,815, filed Jul. 30, 2007, 12 pages.
Non-Final Office Action mailed Jul. 29, 2010, for U.S. Appl. No. 11/980,721, filed Oct. 31, 2007, nine pages.
Non-Final Office Action mailed Aug. 2, 2010, for U.S. Appl. No. 11/980,722, filed Oct. 31, 2007, five pages.
Non-Final Office Action mailed Sep. 17, 2010, for U.S. Appl. No. 11/832,134, filed Aug. 1, 2007, 26 pages.
Non-Final Office Action mailed Oct. 29, 2010, for U.S. Appl. No. 11/048,264, filed Jan. 31, 2005, 12 pages.
Non-Final Office Action mailed Nov. 18, 2010, for U.S. Appl. No. 11/700,636, filed Jan. 30, 2007, eight pages.
Non-Final Office Action mailed Nov. 23, 2010, for U.S. Appl. No. 11/830,808, filed Jul. 30, 2007, 11 pages.
Non-Final Office Action mailed Jan. 20, 2011, for U.S. Appl. No. 11/830,757, filed Jul. 30, 2007, 21 pages.
Non-Final Office Action mailed Feb. 9, 2011, for U.S. Appl. No. 11/240,788, filed Sep. 30, 2005, nine pages.
Non-Final Office Action mailed Feb. 17, 2011, for U.S. Appl. No. 11/852,690, filed Sep. 10, 2007, 10 pages.
Non-Final Office Action mailed Feb. 17, 2011, for U.S. Appl. No. 11/830,766, filed Jul. 30, 2007, 20 pages.
Non-Final Office Action mailed Mar. 18, 2011, for U.S. Appl. No. 11/830,774, filed Jul. 30, 2007, 18 pages.
Non-Final Office Action mailed Mar. 21, 2011, for U.S. Appl. No. 11/830,801, filed Jul. 30, 2007, 11 pages.
Non-Final Office Action mailed Mar. 31, 2011, for U.S. Appl. No. 12/479,573, filed Jun. 5, 2009, 17 pages.
Non-Final Office Action mailed Mar. 31, 2011, for U.S. Appl. No. 12/479,617, filed Jun. 5, 2009, 20 pages.
Non-Final Office Action mailed Mar. 31, 2011, for U.S. Appl. No. 12/479,678, filed Jun. 5, 2009, 18 pages.
Non-Final Office Action mailed Apr. 4, 2011, for U.S. Appl. No. 11/272,868, filed Nov. 15, 2005, nine pages.
Non-Final Office Action mailed Apr. 21, 2011, for U.S. Appl. No. 11/559,763, filed Nov. 14, 2006, seven pages.
Non-Final Office Action mailed Apr. 28, 2011, for U.S. Appl. No. 11/830,781, filed Jul. 30, 2007, 16 pages.
Non-Final Office Action mailed Apr. 29, 2011, for U.S. Appl. No. 11/980,721, filed Oct. 31, 2007, 10 pages.
Non-Final Office Action mailed May 4, 2011, for U.S. Appl. No. 11/038,590, filed Jan. 18, 2005, 40 pages.
Non-Final Office Action mailed May 4, 2011, for U.S. Appl. No. 12/118,639, filed May 9, 2008, seven pages.
Non-Final Office Action mailed Jun. 7, 2011, for U.S. Appl. No. 11/878,024, Jul. 20, 2007, 10 pages.
Non-Final Office Action mailed Jun. 28, 2011, for U.S. Appl. No. 12/422,197, filed Apr. 10, 2009, 18 pages.
Non-Final Office Action mailed Jun. 28, 2011, for U.S. Appl. No. 12/422,205, filed Apr. 10, 2009, 13 pages.
Non-Final Office Action mailed Jun. 28, 2011, for U.S. Appl. No. 12/422,212, filed Apr. 10, 2009, 16 pages.
Non-Final Office Action mailed Jun. 29, 2011, for U.S. Appl. No. 12/342,027, filed Dec. 22, 2008, 32 pages.
Non-Final Office Action mailed Jul. 19, 2011, for U.S. Appl. No. 11/980,722, filed Oct. 31, 2007, 12 pages.
Non-Final Office Action mailed Jul. 20, 2011, for U.S. Appl. No. 11/830,788, filed Jul. 30, 2007, 12 pages.
Non-Final Office Action mailed Aug. 4, 2011, for U.S. Appl. No. 11/830,793, filed Jul. 30, 2007, 13 pages.
Non-Final Office Action mailed Aug. 5, 2011, for U.S. Appl. No. 12/422,222, filed Apr. 10, 2009, 15 pages.
Non-Final Office Action mailed Aug. 5, 2011, for U.S. Appl. No. 12/422,225, filed Apr. 10, 2009, 17 pages.
Non-Final Office Action mailed Sep. 1, 2011, for U.S. Appl. No. 11/830,766, filed Jul. 30, 2007, 29 pages.
Non-Final Office Action mailed Sep. 16, 2011, for U.S. Appl. No. 11/830,757, filed Jul. 30, 2007, 26 pages.
Non-Final Office Action mailed Sep. 23, 2011, for U.S. Appl. No. 12/500,973, filed Jul. 10, 2009, 5 pages.
Non-Final Office Action mailed Sep. 27, 2011, for U.S. Appl. No. 11/700,636, filed Jan. 30, 2007, eight pages.
Non-Final Office Action mailed Sep. 29, 2011, for U.S. Appl. No. 10/903,964, filed Jul. 30, 2004, 17 pages.
Non-Final Office Action mailed Sep. 29, 2011, for U.S. Appl. No. 11/048,264, filed Jan. 31, 2005, 11 pages.
Non-Final Office Action mailed Sep. 30, 2011, for U.S. Appl. No. 12/468,401, filed May 19, 2009, 19 pages.
Non-Final Office Action mailed Oct. 14, 2011, for U.S. Appl. No. 12/434,439, filed May 1, 2009, nine pages.
Non-Final Office Action mailed Oct. 27, 2011, for U.S. Appl. No. 12/139,411, filed Jun. 13, 2008, six pages.
Non-Final Office Action mailed Nov. 8, 2011, for U.S. Appl. No. 12/118,639, filed May 9, 2008, five pages.
Non-Final Office Action mailed Nov. 10, 2011, for U.S. Appl. No. 11/830,815, filed Jul. 30, 2007, 15 pages.
Non-Final Office Action mailed Nov. 23, 2011, for U.S. Appl. No. 11/428,515, filed Jul. 3, 2006, eight pages.
Non-Final Office Action mailed Dec. 8, 2011, for U.S. Appl. No. 11/228,758, filed Sep. 16, 2005, 16 pages.
Non-Final Office Action mailed Dec. 8, 2011, for U.S. Appl. No. 12/500,925, filed Jul. 10, 2009, nine pages.
Non-Final Office Action mailed Dec. 9, 2011, for U.S. Appl. No. 12/500,984, filed Jul. 10, 2009, nine pages.
Non-Final Office Action mailed Dec. 12, 2011, for U.S. Appl. No. 12/500,951, filed Jul. 10, 2009, eight pages.
Non-Final Office Action mailed Dec. 16, 2011, for U.S. Appl. No. 12/500,978, filed Jul. 10, 2009, nine pages.
Non-Final Office Action mailed Dec. 22, 2011, for U.S. Appl. No. 11/696,693, filed Apr. 4, 2007, 29 pages.
Non-Final Office Action mailed Jan. 19, 2012, for U.S. Appl. No. 11/830,808, filed Jul. 30, 2007, eight pages.
Non-Final Office Action mailed Jan. 30, 2012, for U.S. Appl. No. 11/428,503, filed Jul. 3, 2006, 15 pages.
Non-Final Office Action mailed Mar. 2, 2012, for U.S. Appl. No. 11/852,690, filed Sep. 10, 2007, 12 pages.
Non-Final Office Action mailed Apr. 5, 2012, for U.S. Appl. No. 12/479,678, filed Jun. 5, 2009, 13 pages.
Non-Final Office Action mailed Apr. 16, 2012, 2011, for U.S. Appl. No. 12/422,212, filed Apr. 10, 2009, 20 pages.

(56) References Cited

OTHER PUBLICATIONS

Non-Final Office Action mailed May 2, 2012, for U.S. Appl. No. 11/832,134, filed Oct. 31, 2007, 25 pages.
Non-Final Office Action mailed May 7, 2012, for U.S. Appl. No. 12/118,645, filed May 9, 2008, five pages.
Non-Final Office Action mailed May 9, 2012, for U.S. Appl. No. 12/118,641, filed May 9, 2008, four pages.
Non-Final Office Action mailed May 17, 2012, for U.S. Appl. No. 12/118,648, filed May 9, 2008, four pages.
Non-Final Office Action mailed May 23, 2012, for U.S. Appl. No. 11/428,515, filed Jul. 3, 2006, 15 pages.
Non-Final Office Action mailed Jun. 7, 2012, for U.S. Appl. No. 11/830,766, filed Jul. 30, 2007, 14 pages.
Non-Final Office Action mailed Jun. 13, 2012, for U.S. Appl. No. 12/500,984, filed Jul. 10, 2009, eight pages.
Non-Final Office Action mailed Jun. 22, 2012, for U.S. Appl. No. 11/830,774, filed Jul. 30, 2007, 17 pages.
Non-Final Office Action mailed Jun. 25, 2012, for U.S. Appl. No. 11/830,781, filed Jul. 30, 2007, 19 pages.
Non-Final Office Action mailed Jun. 25, 2012, for U.S. Appl. No. 12/479,573, filed Jun. 5, 2009, 11 pages.
Notice of Allowability mailed Feb. 11, 2009, for U.S. Appl. No. 11/428,521, filed Jul. 3, 2006, five pages.
Notice of Allowability mailed Jul. 10, 2009, for U.S. Appl. No. 11/428,521, filed Jul. 3, 2006, five pages.
Notice of Allowability mailed Sep. 2, 2009, for U.S. Appl. No. 11/428,506, filed Jul. 3, 2006, five pages.
Notice of Allowability mailed Sep. 3, 2009, for U.S. Appl. No. 11/241,839, filed Sep. 30, 2005, 10 pages.
Notice of Allowability (Supplemental) mailed May 12, 2010, for U.S. Appl. No. 11/559,822, filed Nov. 14, 2006, two pages.
Notice of Allowance mailed Mar. 23, 2010, for U.S. Appl. No. 11/428,501, filed Jul. 3, 2006, eight pages.
Notice of Allowance mailed Apr. 26, 2010, for U.S. Appl. No. 11/559,822, filed Nov. 14, 2006, nine pages.
Notice of Allowance mailed Jun. 21, 2010, for U.S. Appl. No. 11/677,958, filed Feb. 22, 2007, eight pages.
Notice of Allowance mailed Aug. 16, 2011, for U.S. Appl. No. 11/559,763, filed Nov. 14, 2006, nine pages.
Notice of Allowance mailed Oct. 26, 2011, for U.S. Appl. No. 11/559,763, filed Nov. 14, 2006, nine pages.
Notice of Allowance mailed Mar. 9, 2012, for U.S. Appl. No. 11/240,788, filed Sep. 30, 2005, five pages.
Notice of Allowance mailed Mar. 26, 2012, for U.S. Appl. No. 12/500,973, filed Jul. 10, 2009, 12 pages.
Notice of Allowance mailed Apr. 2, 2012, for U.S. Appl. No. 11/038,590, filed Jan. 18, 2005, 11 pages.
Notice of Allowance mailed Apr. 13, 2012, for U.S. Appl. No. 12/342,027, filed Dec. 22, 2008, 10 pages.
Notice of Allowance mailed Jun. 27, 2012, for U.S. Appl. No. 11/559,736, filed Nov. 14, 2006, 11 pages.
Notification of Reason(s) for Refusal mailed Apr. 25, 2011, for JP Patent Application No. 2008-531106, with English Translation, five pages.
Pavlovic, V.I. et al. (Jul. 1997). "Visual Interpretation of Hand Gestures for Human-Computer Interaction: A Review," *IEEE Transactions on Pattern Analysis and Machine Intelligence* 19(7):677-695.
PCT International Search Report received in Corresponding PCT Application No. PCT/US2006/031526 dated Feb. 14, 2007.
PCT International Search Report received in Corresponding PCT Application No. PCT/US2005/025657 dated Feb. 26, 2007.
PCT International Search Report received in Corresponding PCT Application No. PCT/US2006/031523 dated Feb. 27, 2007.
PCT International Search Report received in Corresponding PCT Application No. PCT/US2006/031527 dated Feb. 27, 2007.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," in Proc. of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rubine et al., "Programmable Finger-Tracking Instrument Controllers," *Computer Music Journal*, vol. 14, No. 1 (Spring 1990).
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages. (core citation).
Rubine, D. (May 1992). "Combining Gestures and Direct Manipulation," CHI '92, pp. 659-660. (core citation).
Rutledge et al., "Force-To-Motion Functions for Pointing," Human-Computer Interaction—Interact (1990).
Schiphorst, T. et al. "Using a Gestural Interface Toolkit for Tactile Input to a Dynamic Virtual Space," *Conference on Human Factors in Computing Systems, Proceedings*, Apr. 25, 2002, pp. 754-755.
Smith, R. et al. (1996). "Relating Distortion to Performance in Distortion-Oriented Displays," *Proceedings of the 6th Australian Conference on Computer-Human Interaction* (OZCHI '96), pp. 6-11.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Sun Microsystems. (1992). "The Star7 PDA Prototype," located at <http://www.youtube.com/watch?v=Ahg8OBYixL0, last visited Jan. 15, 2010, seven pages.
Texas Instruments "TSC2003 / 12C Touch Screen Controller" Data Sheet SBAS 162, dated Oct. 2001, 20-pgs.
The Gadgeteer. (Jun. 6, 2003). "Apple iPod (30GB)," available at http://the-gadgeteer.com/review/apple_ipod_30gb_review, last visited Apr. 28, 2008, 19 pages.
U.S. Appl. No. 10/789,676, filed Feb. 27, 2004 entitled "Shape Detecting Input Device".
U.S. Appl. No. 11/272,868, filed Nov. 15, 2005, by Pryor.
U.S. Appl. No. 11/332,861, filed Jan. 13, 2006 which is a Reissue of 6,677,932.
U.S. Appl. No. 11/349,350, filed Feb. 8, 2006, by Pryor.
U.S. Appl. No. 11/878,024, filed Jul. 20, 2007, by Pryor.
U.S. Appl. No. 90/010,571, filed Jun. 10, 2009, by Pryor.
Wellner, "The Digital Desk Calculators: Tangible Manipulation on a Desk Top Display" in ACM UIST '91 Proceedings, pp. 27-34, Nov. 1991.
Westerman, W. (Jan. 1, 1999). "Hand Tracking, Finger Identification, and Chordic Manipulation on a Multi-Touch Surface," Dissertation, University of Delaware, pp. 1-333.
Westerman, Wayne, et al. (2001). "Multi-Touch: A New Tactile 2-D Gesture Interface for Human-Computer Interaction," *Proceedings of the Human Factors and Ergonomics Society* 45th Annual Meeting.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," in CHI '85 Proceedings, pp. 280-287, 1995.
Anonymous. (Sep. 2003). "P900 User Guide," Second Edition, *Sony Ericsson Mobile Communications AB*: located at http://www.sonyericsson.com/downloads/P900_UG_R1b_EN.pdf, pp. 8, 16, 17, 20, 24-26, 42-45, 137 (98 pages total).
Anonymous. (2004). "Devices," *Technology Loan Catalog*, located at http://www.tsbvi.edu/outreach/techloan/catalog.html last visited Jun. 6, 2008, nine pages.

(56) References Cited

OTHER PUBLICATIONS

Anonymous. (2004). "Fastap™ Keypads Redefine Mobile Phones," *DIGITWireless*, located at http://www/digitwireless.com, last visited Nov. 18, 2005, nine pages.
Anonymous. (Jan. 21, 2004). "Compare Keyboards with the Keyboard Compatibility Chart, Learn More About Alternative Keyboards," *Solutions for Humans*, located at http://www.keyalt.com/kkeybrdp.html, last visited Dec. 8, 2005, five pages.
Anonymous. (2005). "Fastap™," *DIGITWireless*, located at http://www.digitwireless.com/about/faq.html, last visited Dec. 6, 2005, five pages.
Anonymous. (2005). "Four-Button Keyboard," *WikiPodLinux* located at http://ipodlinux.org/Four-Button_Keyboard, last visited Dec. 5, 2005, two pages.
Anonymous. (2005). "Introducing the Ultimate Smartphone Keypad," Delta II™ Keypads, *Chicago Logic, Inc.*, located at http://www.chicagologic.com, last visited Nov. 18, 2005, two pages.
Anonymous. (2005). "T9® Text Input for Keypad Devices," *Tegic Communications*™ located at http://www.tegic.com, last visited Nov. 18, 2005, one page.
Anonymous. (2005). "Text Input (Legacy)," *WikiPodLinux* located at http://ipodlinux.org/Text_Input_%28legacy%29, last visited Dec. 5, 2005, eight pages.
Anonymous. (2005). "Text Input Concepts," *WikiPodLinux* located at http://web.archive.org/web/20051211165254/http://ipodlinux.org/Text_Input_Concepts last visited Dec. 5, 2005, three pages.
Anonymous. (2005). "Text Input Methods," *WikiPodLinux* located at http://ipodlinux.org/Text_Input_Methods, last visited Dec. 5, 2005, five pages.
Anonymous. (2005). "You Heard of Touch Screens Now Check Out Touch Keys," *Phoneyworld*, located at http://www.phoneyworld.com/newspage.aspx?n=1413, last visited Nov. 18, 2005, two pages.
Anonymous. (Apr. 6, 2005). "Microsoft's New-Smart Phone Interface: Your Thumb," textually.org located at http://www.textually.org/textually/archives/2005/04/007819.html last visited Nov. 18, 2005, two pages.
Anonymous. (Jun. 22, 2005). "LG Develops New Touch Pad Cell Phones," textually.org located at http://textually.org/textually/archives/2005/06/009903.html, last visited Nov. 18, 2005, one page.
Anonymous. (Nov. 3, 2005). "Samsung Releases Keyboard Phone in US," textually.org located at http://www.textually.org/textually/archives/2005/11/010482.html last visited Nov. 18, 2005, one page.
Anonymous. (2006). Centroid, located at http://faculty.evansville.edu/ck6/tcenter/class/centroid.html, last visited Apr. 28, 2006, 1 page.
Anonymous. (2006). Centroid, located at http://www.pballew.net/centroid.html, last visited Apr. 28, 2006, three pages.
Casario, M. (Oct. 5, 2005). "Hands on Macromedia World: Touch Screen Keypad for Mobile Phone by DoCoMo," located at http://casario.blogs.com/mmworl/2005/10/touch_screen_ke.html, last visited Nov. 18, 2005, 1 page.
Day, B. (Jan. 6, 2004). "Will Cell Phones Render iPods Obsolete?" Java.net, located at http://weblogs.javanet/pub/wig/883, last visited Dec. 12, 2005, three pages.
Final Office Action mailed May 12, 2009, for U.S. Appl. No. 11/228,700, filed Sep. 16, 2005, 13 pages.
Final Office Action mailed Dec. 8, 2009, for U.S. Appl. No. 11/459,615, filed Jul. 24, 2006, 11 pages.
Final Office Action mailed Nov. 18, 2010, for U.S. Appl. No. 11/961,663, filed Dec. 20, 2007, 14 pages.
Final Office Action mailed Jul. 6, 2012, for U.S. Appl. No. 11/830,815, filed Jul. 30, 2007, 15 pages.
Final Office Action mailed Jul. 6, 2012, for U.S. Appl. No. 11/696,693, filed Apr. 4, 2007, 24 pages.
Final Office Action mailed Jul. 27, 2012, for U.S. Appl. No. 11/696,701, filed Apr. 4, 2007, 13 pages.
Final Office Action mailed Aug. 3, 2012, for U.S. Appl. No. 11/830,808, filed Jul. 30, 2007, seven pages.
Final Office Action mailed Sep. 18, 2012, for U.S. Appl. No. 11/852,690, filed Sep. 10, 2007, 13 pages.
Final Office Action mailed Oct. 12, 2012, for U.S. Appl. No. 12/118,648, filed May 9, 2008, eight pages.
Final Office Action mailed Oct. 25, 2012, for U.S. Appl. No. 11/832,134, filed Aug. 1, 2007, 27 pages.
Final Office Action mailed Dec. 12, 2012, for U.S. Appl. No. 12/500,984, filed Jul. 10, 2009, 10 pages.
Final Office Action mailed Jan. 4, 2013, for U.S. Appl. No. 12/118,659, filed May 9, 2008, six pages.
Final Office Action mailed Jan. 29, 2013, for U.S. Appl. No. 11/830,774, filed Jul. 30, 2007, 19 pages.
Final Office Action mailed Jan. 29, 2013, for U.S. Appl. No. 11/830,766, filed Jul. 30, 2007, 16 pages.
Final Office Action mailed Feb. 15, 2013, for U.S. Appl. No. 12/422,205, filed Apr. 10, 2009, 16 pages.
International Search Report mailed Apr. 11, 2008, for PCT Application No. PCT/US2007/060119, nine pages.
International Search Report mailed Sep. 15, 2008, for PCT Application No. PCT/US2007/088904, nine pages.
Non-Final Office Action mailed Sep. 17, 2008, for U.S. Appl. No. 11/228,700, filed Sep. 16, 2005, 18 pages.
Non-Final Office Action mailed May 22, 2009, for U.S. Appl. No. 11/459,615, filed Jul. 24, 2006, nine pages.
Non-Final Office Action mailed May 28, 2009, for U.S. Appl. No. 11/459,606, filed Jul. 24, 2006, 17 pages.
Non-Final Office Action mailed Apr. 13, 2010, for U.S. Appl. No. 11/459,615, filed Jul. 24, 2006, nine pages.
Non-Final Office Action mailed Jul. 27, 2012, for U.S. Appl. No. 12/118,659, filed May 9, 2008, five pages.
Non-Final Office Action mailed Jul. 31, 2012, for U.S. Appl. No. 11/228,758, filed Sep. 16, 2005, 14 pages.
Non-Final Office Action mailed Aug. 21, 2012, for U.S. Appl. No. 12/434,439, filed May 1, 2009, 12 pages.
Non-Final Office Action mailed Aug. 30, 2012, for U.S. Appl. No. 11/830,801, filed Jul. 30, 2007, 15 pages.
Non-Final Office Action mailed Sep. 4, 2012, for U.S. Appl. No. 11/830,788, filed Jul. 30, 2007, 13 pages.
Non-Final Office Action mailed Sep. 6, 2012, for U.S. Appl. No. 11/830,793, filed Jul. 30, 2007, 14 pages.
Non-Final Office Action mailed Sep. 13, 2012, for U.S. Appl. No. 12/422,205, filed Apr. 10, 2009, 16 pages.
Non-Final Office Action mailed Sep. 25, 2012, for U.S. Appl. No. 11/428,515, filed Jul. 3, 2006, 15 pages.
Non-Final Office Action mailed Oct. 12, 2012, for U.S. Appl. No. 12/422,212, filed Apr. 10, 2009, five pages.
Non-Final Office Action mailed Oct. 26, 2012, for U.S. Appl. No. 12/468,401, filed May 19, 2009, 22 pages.
Non-Final Office Action mailed Nov. 8, 2012, for U.S. Appl. No. 12/479,678, filed Jun. 5, 2009, five pages.
Non-Final Office Action mailed Nov. 16, 2012, for U.S. Appl. No. 13/569,065, filed Aug. 7, 2012, eight pages.
Non-Final Office Action mailed Nov. 29, 2012, for U.S. Appl. No. 11/559,833, filed Nov. 14, 2006, 10 pages.
Non-Final Office Action mailed Dec. 18, 2012, for U.S. Appl. No. 11/878,024, filed Jul. 20, 2007, eight pages.
Non-Final Office Action mailed Dec. 19, 2012, for U.S. Appl. No. 11/048,264, filed Jan. 31, 2005, nine pages.
Non-Final Office Action mailed Jan. 4, 2013, for U.S. Appl. No. 12/139,411, filed Jun. 13, 2008, six pages.
Non-Final Office Action mailed Feb. 14, 2013, for U.S. Appl. No. 11/228,758, filed Sep. 16, 2005, 14 pages.
Non-Final Office Action mailed Feb. 21, 2013, for U.S. Appl. No. 12/422,197, filed Apr. 10, 2009, 12 pages.
Notice of Allowance mailed Jul. 26, 2012, for U.S. Appl. No. 11/428,503, filed Jul. 3, 2006, nine pages.
Notice of Allowance mailed Aug. 22, 2012, for U.S. Appl. No. 11/559,763, filed Nov. 14, 2006, 10 pages.
Notice of Allowance mailed Sep. 6, 2012, for U.S. Appl. No. 13/556,019, filed Jul. 23, 2012, seven pages.
Notice of Allowance mailed Dec. 6, 2012, for U.S. Appl. No. 10/903,964, filed Jul. 30, 2004, six pages.
Notice of Allowance mailed Dec. 24, 2012, for U.S. Appl. No. 13/556,019, filed Jul. 23, 2012, five pages.

(56) References Cited

OTHER PUBLICATIONS

Notice of Allowance mailed Jan. 15, 2013, for U.S. Appl. No. 12/479,617, filed Jun. 5, 2009, 10 pages.
Notice of Allowance mailed Feb. 8, 2013, for U.S. Appl. No. 11/830,801, filed Jul. 30, 2007, seven pages.
Notice of Allowance mailed Feb. 15, 2013, for U.S. Appl. No. 11/559,799, filed Nov. 14, 2006, 13 pages.
Notice of Allowance mailed Feb. 19, 2013, for U.S. Appl. No. 12/422,212, filed Apr. 10, 2009, nine pages.
Notice of Allowance mailed Feb. 21, 2013, for U.S. Appl. No. 12/342,027, filed Dec. 22, 2008, 10 pages.
Notice of Allowance mailed Feb. 22, 2013, for U.S. Appl. No. 12/500,978, filed Jul. 10, 2009, five pages.
Notice of Allowance mailed Mar. 5, 2013, for U.S. Appl. No. 12/434,439, filed May 1, 2009, nine pages.
O'Neal, W. (2005). "Smart Phones with Hidden Keyboards," located at http://msn.com.com/4250-6452_16-6229969-1.html, last visited Nov. 18, 2005, three pages.
Sears, A. et al. (2005). "Data Entry for Mobile Devices using Soft Keyboards: Understanding the Effects of Keyboard Size and User Tasks," Abstract, *Int'l Journal of Human-Computer Interaction*, vol. 16, No. 2, one page.
European Search Report mailed Feb. 25, 2013, for EP Application No. 13150499.5, five pages.
Final Office Action mailed Mar. 21, 2013, for U.S. Appl. No. 11/830,788, filed Jul. 30, 2007, 12 pages.
Final Office Action mailed Apr. 12, 2013, for U.S. Appl. No. 11/830,793, filed Jul. 30, 2007, 15 pages.
Final Office Action mailed Apr. 30, 2013, for U.S. Appl. No. 11/559,833, filed Nov. 14, 2006, 10 pages.
Final Office Action mailed May 9, 2013, for U.S. Appl. No. 11/832,134, filed Aug. 1, 2007, 29 pages.
Final Office Action mailed May 9, 2013, for U.S. Appl. No. 13/569,065, filed Aug. 7, 2012, nine pages.
Non-Final Office Action mailed Mar. 18, 2013, for U.S. Appl. No. 12/422,222, filed Apr. 10, 2009, 15 pages.
Non-Final Office Action mailed Mar. 19, 2013, for U.S. Appl. No. 12/468,401, filed May 19, 2009, 21 pages.
Non-Final Office Action mailed Mar. 26, 2013, for U.S. Appl. No. 13/757,726, filed Feb. 1, 2013, eight pages.
Non-Final Office Action mailed May 9, 2013, for U.S. Appl. No. 11/980,721, filed Oct. 31, 2007, 14 pages.
Non-Final Office Action mailed May 15, 2013, for U.S. Appl. No. 11/980,722, filed Oct. 31, 2007, 11 pages.
Notice of Allowance mailed Mar. 6, 2013, for U.S. Appl. No. 10/903,964, filed Jul. 30, 2004, seven pages.
Notice of Allowance mailed Apr. 2, 2013, for U.S. Appl. No. 12/479,678, filed Jun. 5, 2009, 11 pages.
Holt, J. (Jul. 2003, e-pub. Sep. 4, 2003). "Windows XP: A User Guide," The Robert Gordon University, IT Services Department, retrieved from the internet on Aug. 26, 2013, 27 pages.
Sears, A. et al. (Jun., 1990). "A New Era for Touchscreen Applications: High Precision, Dragging Icons, and Refined Feedback," University of Maryland, Human-Computer Interaction Laboratory, retrieved from the internet on Aug. 26, 2013, 39 pages.

\* cited by examiner

PROXIMITY DETECTOR IN HANDHELD DEVICE

CROSS REFERENCE TO RELATED APPLICATIONS

This application is a continuation of U.S. application Ser. No. 11/240,788, entitled "PROXIMITY DETECTOR IN HANDHELD DEVICE," filed Sep. 30, 2005, which will issue Feb. 19, 2013 as U.S. Pat. No. 8,381,135, which is a Continuation-in-Part of U.S. patent application Ser. No. 10/903,964, titled "GESTURES FOR TOUCH SENSITIVE INPUT DEVICES," filed Jul. 30, 2004; U.S. patent application Ser. No. 11/038,590, titled "MODE-BASED GRAPHICAL USER INTERFACES FOR TOUCH SENSITIVE INPUT DEVICES," filed Jan. 18, 2005, which issued on Aug. 7, 2012 as U.S. Pat. No. 8,239,784; U.S. patent application Ser. No. 10/927,925, titled "VISUAL EXPANDER," filed Aug. 26, 2004, which issued on Jul. 20, 2010 as U.S. Pat. No. 7,760,187; and U.S. patent application Ser. No. 11/165,958, titled "METHODS AND APPARATUS FOR REMOTELY DETECTING PRESENCE," filed Jun. 23, 2005, which issued on Oct. 6, 2009, as U.S. Pat. No. 7,599,044, all of which are herein incorporated by reference.

This application is also related to U.S. Pat. No. 6,583,676, titled "PROXIMITY/TOUCH DETECTOR AND CALIBRATION CIRCUIT," issued Jun. 24, 2003; U.S. Pat. No. 7,663,607, titled "MULTIPOINT TOUCHSCREEN," issued Feb. 16, 2010; and U.S. Pat. No. 7,653,883, titled "PROXIMITY DETECTOR IN HANDHELD DEVICE," issued Jan. 26, 2010, all of which are herein incorporated by reference.

BACKGROUND OF THE INVENTION

1. Field of the Invention

The present invention relates generally to I/O platforms including proximity detection as a means for providing inputs. More particularly, the invention relates to improved methods and devices for operating a portable electronic device that utilizes proximity detection.

2. Description of the Related Art

There exist today many styles of input devices for performing operations in an electronic system. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the electronic system.

Although devices such as these work well, there are continuing efforts to improve their form, feel and functionality. An improved input means and operational methods associated therewith is therefore desired.

SUMMARY OF THE INVENTION

The invention relates, in another embodiment, to a method for initiating floating controls on an electronic device. The method includes detecting the presence of an object above and spaced away from a surface of the electronic device. The method also includes displaying a particular graphical user interface element on a display of the electronic device when the object is detected above the surface of the electronic device.

The invention relates, in another embodiment, to a user interface method. The method includes detecting an object in space. The method also includes determining a user interface mode when an object is detected in space. The method further includes displaying and enabling one or more GUI elements based on the user interface mode.

The invention relates, in another embodiment, to a method for scrolling through media items. The method includes displaying a plurality of media items at a surface. The method also includes detecting an object spaced away from the surface and over at least one of the media items that are displayed. The method further includes activating a virtual scroll wheel when the object is detected over the displayed media items. The method additionally includes detecting a touch on the surface and over the virtual scroll wheel. The method also includes determining if a touch event is performed on the surface and over the virtual scroll wheel. Moreover, the method includes scrolling through the group of media items when a scrolling touch event is performed.

The invention relates, in another embodiment, to a computer implemented method. The method includes presenting graphical information on a display having a display surface. The method also includes detecting an object in space above display surface and over the display. The method further includes expanding an area of the graphical information proximate the location of the object when the object is detected in space above display surface and over the display.

BRIEF DESCRIPTION OF THE DRAWINGS

The invention may best be understood by reference to the following description taken in conjunction with the accompanying drawings in which.

DETAILED DESCRIPTION OF THE INVENTION

Embodiments of this aspect of the invention are discussed below with reference to FIGS. 1-23. However, those skilled in the art will readily appreciate that the detailed description given herein with respect to these figures is for explanatory purposes as the invention extends beyond these limited embodiments.

Figure 1:
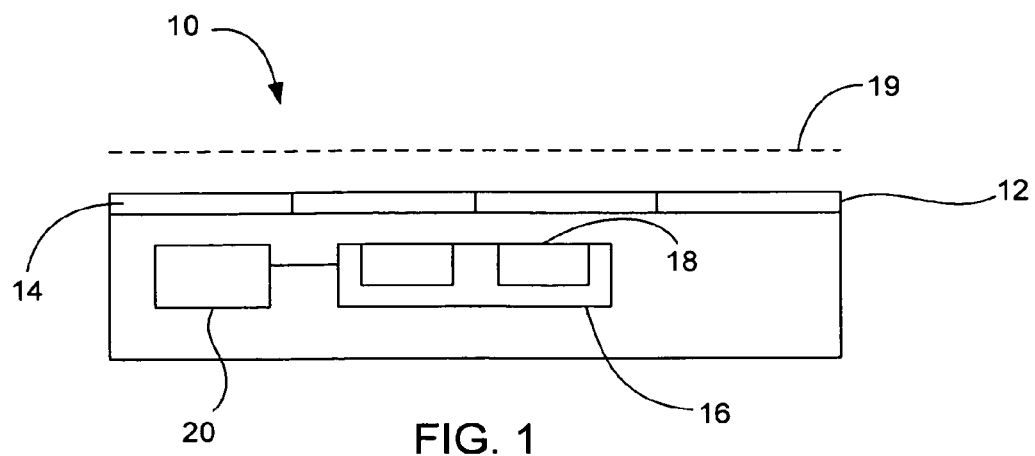
FIG. 1 is a diagram of an I/O platform, in accordance with one embodiment of the present invention.

FIG. 1 is a simplified block diagram of an I/O platform 10, in accordance with one embodiment of the present invention. The I/O platform 10 may be embodied as a peripheral stand alone device or it may be integrated into an electronic system or device. In either case, the I/O platform 10 is configured to control inputs and/or outputs associated with the host system or device. Examples of peripheral stand alone devices include mice, keyboards, joysticks, remote controls, etc. Examples of electronic devices include any consumer related electronic device such as computers, media players, telephones, etc.

The I/O platform 10 includes an I/O surface 12 having one or more input and/or output devices 14. The input devices 14A may for example be selected from buttons, switches, dials, sliders, keys or keypads, navigation pads, touch pads, touch screens, and the like. The output devices 14B may for example be selected from displays (e.g., LCD, CRT), speakers (or speaker jacks), indicators, and the like. The I/O devices 14 can be used solely or in any combination with other I/O devices 14 to form the desired I/O platform 10.

The I/O platform 10 also includes a proximity detection system 16 configured to detect when a finger (or stylus) is in close proximity to (but not in contact with) the I/O surface 12. The proximity detection system 16 may also detect location (e.g., x, y, z), direction, speed, orientation (e.g., roll, pitch, yaw), etc. of the finger relative to the I/O surface 12. Generally speaking, the proximity detection system 16 provides additional inputs to the I/O platform 10 when the a finger is placed above the I/O surface 12 as for example when a finger is moving directly towards the I/O surface 12, hovering just over the I/O surface 12 or possibly moving about but above the I/O surface 12. The input signals can be used to initiate commands, make selections, and even control motion in a display (e.g., tracking). In some cases, the inputs provided by the proximity detection system 16 may even be used in conjunction with other inputs (provided by other input devices) to create new inputs, which have different meaning than when the two inputs are used by themselves. For example, when using a touch sensing device along with a proximity detection system, advanced gestures may be performed that combine proximity gestures along with touch gestures.

The proximity detection system 16 may be widely varied. For example, it may be based on sensing technologies including capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like. A few of these technologies will now be briefly described.

Capacitive proximity systems use capacitive sensing nodes to detect changes in capacitance above the I/O surface. Objects such as a finger affect the capacitance in a non trivial manner and therefore the changes can be used to determine whether the finger is present above the I/O surface.

Infrared proximity systems send out pulses of infrared light, and detect reflections of that light from nearby objects. The light may for example be reflected off of a finger located in front of the pulsed light. If the system detects reflected light, then an object is assumed to be present. If the system does not detect reflected light, then it is assumed that there is no object present. The light may be focused to a particular distance above the I/O surface.

Optical Shadow proximity systems use photodetectors or similar device to detect changes in light intensity. If the intensity is reduced, it can be assumed that this was caused by the presence of an object forming a shadow over the photodetector.

Ultrasonic proximity systems provide ultrasonic pulses of sound, and measures the length of time it takes for those pulses to hit nearby objects and return as echos. The greater the time, the further the object.

In most cases, the proximity detection system 16 includes one or more proximity sensors 18 that generate one or more sensing fields 19 above the I/O surface 12 and that in conjunction with a controller 20 produce signals when an object disturbs or intercepts the sensing field(s). Each sensing field typically generates its own signals when disturbed. In one embodiment, a single sensing field is used to cover the entire I/O surface. In another embodiment, a single sensing field only covers a portion of the I/O surface. For example, it can be configured to cover or surround a particular I/O device or a group of I/O devices. In another embodiment, multiple sensing fields are used to cover the entire I/O surface. For example a first sensing field may be configured to cover a first I/O device or a first group of I/O devices and a second sensing field may be configured to cover a second I/O device or a second group of I/O devices. Any number of sensing fields may be used. In some cases, in order to perform tracking, the sensing fields may even be distributed as a pixilated array of nodes. In yet another embodiment, multiple sensing fields are used to only cover a portion of the I/O surface. Alternatively or additionally, the sensing fields may be configured to cover areas that do not include I/O devices as for example housing components that support the I/O platform 10.

Although the I/O surface 12 can be widely varied, several embodiments will now be discussed. It should be appreciated that these embodiments are not limitations and that they serve as examples to the infinite number of combinations that can be created when designing an I/O surface 12.

In one embodiment, the I/O surface 12 includes an output device in the form of a display and input devices in the form of a touchpad and one or more buttons. By way of example, the display may be situated in an upper region of the I/O surface, and the touch pad and buttons may be situated in a lower region of the I/O surface just below the display. Any or all of these devices may include an all encompassing or regional sensing field 19 disposed around and/or above the devices. This type of I/O surface can typically be found on media players such as the iPod music players manufactured by Apple Computer of Cupertino, Calif.

In another embodiment, the I/O surface 12 includes an enlarged touch screen display, a navigation pad, and one or more buttons. By way of example, the enlarged display may be situated in an upper/middle region of the I/O surface 12, and the navigation pad and buttons may be situated in a lower region of the I/O surface 12 just below the display. Any or all of these devices may include an all encompassing or regional sensing field 19 disposed around and/or above the devices. This type of I/O surface can typically be found on personal digital assistants (PDAs).

In another embodiment, the I/O surface 12 includes a small display, navigation pad and a keypad. By way of example, the small display may be situated in an upper region of the I/O surface 12, and the navigation pad and keypad may be situated in a lower/middle region of the I/O surface 12 just below the display. Any or all of these devices may include an all encompassing or regional sensing field 19 disposed around and/or above the devices. This type of I/O surface can typically be found on cellular phones.

In another embodiment, the I/O surface 12 only includes a touch screen display. That is, the entire I/O surface 12 is covered with a display with a touch screen disposed over the display. This type of I/O surface 12 can be found in multifunctional handheld devices where the display covers an entire side of the device. Any or all of these devices may include an all encompassing or regional sensing field 19 disposed around and/or above the devices. An example of a multifunctional device can be found in U.S. Provisional Patent Application No. 60/658,777, which is herein incorporated by reference.

In another embodiment, the I/O platform 12 is a peripheral stand alone input device such as a keyboard or mouse. The I/O surface 12 of the keyboard includes a plurality of alphanumeric keys. The I/O surface 12 of the mouse includes one or more buttons and possibly a scroll wheel. Any or all of these devices may include an all encompassing or regional sensing field 19 disposed around and/or above the devices.

In another embodiment, the I/O platform 12 is a peripheral stand alone input output device such as a monitor that includes a touch screen display. Any or all of these devices may include an all encompassing or regional sensing field 19 disposed around and/or above the devices.

In another embodiment, the I/O platform 12 is a wireless peripheral stand alone input device such as a remote control. Remote controls typically include a plurality of buttons and keys and may include a display. Any or all of these devices may include an all encompassing or regional sensing field disposed around and/or above the devices.

Figure 2:
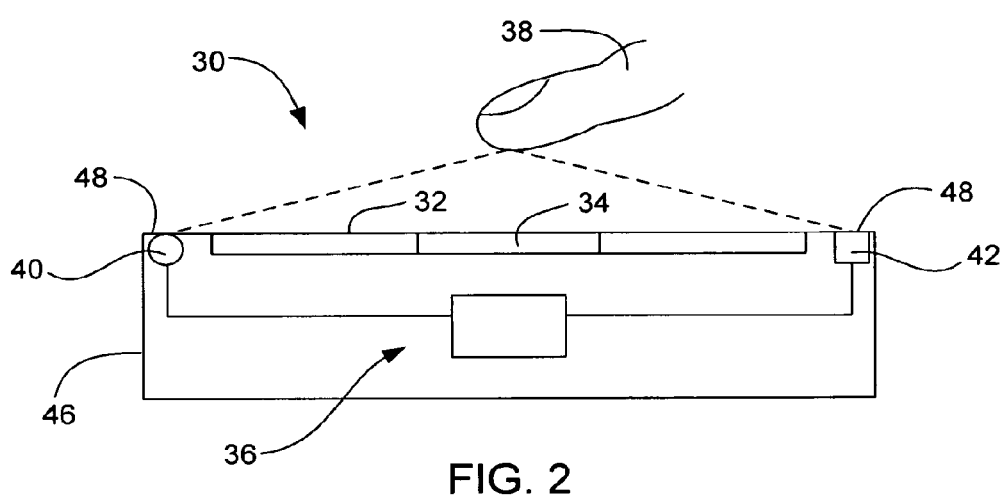
FIG. 2 is a diagram of an I/O platform, in accordance with one embodiment of the present invention.

FIG. 2 is a diagram of an I/O platform 30, in accordance with one embodiment of the present invention. The I/O platform 30 includes an I/O surface 32 including any number of I/O devices 34 in any number of combinations. The I/O platform 30 also includes an IR sensing circuit 36 for detecting the presence of an object 38 in close proximity but spaced apart from the I/O surface 32 (non contact). The IR sensing circuit 36 works by sending pulses of light, and detecting the light when it reflects off of the object 38 above the I/O surface 32. The IR sensing circuit 36 includes an emitter 40 (light source) and a detector 42. The emitter 40 generates light in the infrared bands. The emitter 40 may for example be an LED or laser diode. The detector 42, on the other hand, is configured to detect changes in light intensity. This is generally accomplished by mechanisms capable of varying electrically as a function of light intensity. The detector 42 may for example be a phototransistor.

During operation, the light from the emitter 40 hits the object 38 and scatters when a object is present above the I/O surface 32. At least a portion of the scattered light is reflected towards the detector 42. The increase in light intensity is read by the detector 42, and this is interpreted by a controller 44 to mean an object is present. If no object is present, the light is not reflected back towards the detector 42, and this is interpreted by the controller 44 to mean an object is not present.

In one embodiment, the emitter 40 and detector 42 are disposed within a housing 46 and underneath a window 48 of the housing 46. The window may be formed from a translucent or semi translucent material. The window may be the entire surface or it may only be a portion of the housing 46. The emitter 40 and detector 42 may be located at any position within the I/O surface 32. In some cases, the emitter 40 and detector 42 are located at the edge (e.g., bezel), and angled inward towards one another to improve the detection. It should be appreciated, however, that this is not a requirement. For example, they may also be positioned at more central locations and may even be positioned around a particular I/O device. Furthermore, although only one emitter 40 and detector 42 are shown, it should also be appreciated that this is not a limitation and that multiple sets may be used. This may be done to improve detection (e.g., averaging) or to create a multiple sensing fields or nodes. In some cases, an array of emitters and corresponding detector array may be used.

Figure 3:
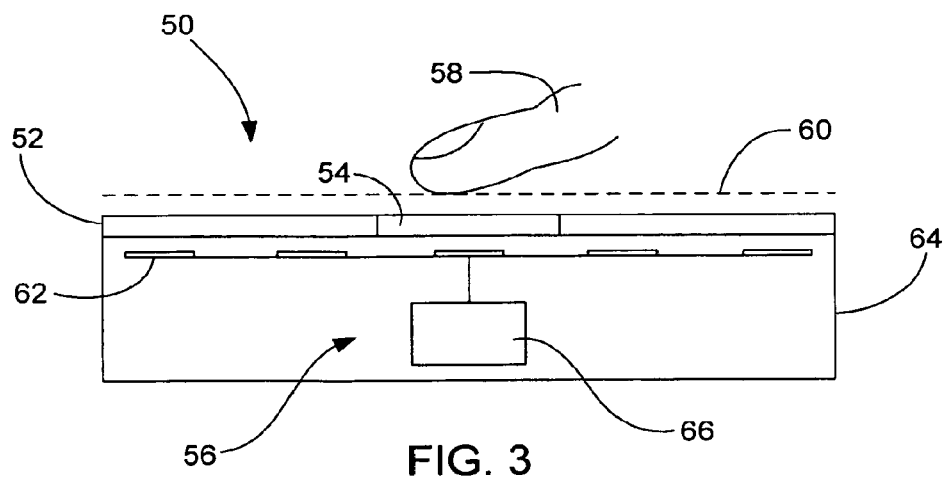
FIG. 3 is a diagram of an I/O platform, in accordance with one embodiment of the present invention.

FIG. 3 is a diagram of an I/O platform 50, in accordance with one embodiment of the present invention. The I/O platform 50 includes an I/O surface 52 including any number of I/O devices 54 in any number of combinations. The I/O platform 50 also includes a capacitive sensing circuit 56 for detecting the presence of an object 58 in close proximity but spaced apart from the I/O surface 52 (non contact). The capacitive sensing circuit 56 works by detecting changes in capacitance in an area 60 above the I/O surface 52. As should be appreciated, when an object (e.g., finger) is placed in the sensing area 60, the value of the capacitance changes due to the fact that the finger has different dielectric properties than air. Any changes can therefore be used to determine the presence of the object 58 above the I/O surface 52.

The capacitive sensing circuit 56 may include one or more capacitive sensing nodes 62. The nodes 62 may be positioned within, around and/or underneath the I/O devices 54 supported by the I/O surface 52.

The capacitive sensing nodes may be widely varied. For example, they may be based on self capacitance or mutual capacitance. In self capacitance, each of the nodes 62 typically consist of a conductive electrode. In mutual capacitance, each of the nodes 62 typically consists of conductive wires lying crosswise relative to each other (the point where the wires cross is considered the node). In either case, the conductive element may be integrally formed into the housing walls 64 of the I/O platform 50 or they may be located behind the housing walls 64 of the I/O platform 50. The housing wall 64 may for example be the housing wall that supports the I/O surface 52. Alternatively or additionally, the conductive elements may be integrated within the I/O devices themselves. Furthermore, they are typically coupled to a controller 66 that monitors the capacitance changes at each conductive element. By detecting changes in capacitance at each of the conductive elements, the microcontroller 66 can determine the presence of a object 58 or lack thereof above the I/O surface 52.

In one embodiment, a single node may be configured to cover the entire I/O surface. For example, in the case of self capacitance, a single electrode may be spread across the entire I/O surface.

In another embodiment, a single node is configured to cover some sub region of the I/O surface. In one implementation of this embodiment, for example, a single node may be configured to cover all the areas of the housing wall 64 that surround the various I/O devices 54. In another implementation, a single node is configured to cover all the areas underneath the various I/O devices 54. In another implementation, a single node may be positioned at one or more of the I/O devices 54 rather than the entire set of I/O devices. These nodes may be positioned around and/or underneath the I/O devices 54. In another implementation, a single node may be positioned around the edge of the I/O surface 52 (e.g., bezel).

In another embodiment, multiple nodes may be configured to cover the entire I/O surface 52. By way of example, the multiple nodes may be laid out in a pixilated array of sensing nodes. For example, in the case of mutual capacitance, the wires may be formed as a grid with a plurality of sensing nodes.

In another embodiment, multiple nodes may be configured to cover some sub regions of the I/O surface 52. In one implementation, for example, a multiple nodes may be configured to cover all the areas that surround the various I/O devices 54. In another implementation, multiple nodes are configured to cover all the areas underneath the various I/O devices 54. In another implementation, multiple nodes may be positioned at one or more of the I/O devices 54 rather than the entire set of I/O devices 54. These nodes may be positioned around and/or underneath the I/O devices 54. In another implementation, multiple nodes may be positioned around the edge of the I/O surface 52 (e.g., bezel).

The proximity based capacitive sensing circuit may be configured to work similarly to a touch based capacitive sensing circuit, and in some cases the circuits may be one and the same. For example, using a smart controller, a touch based device may be configured to sense objects that are not touching but in close proximity to the touch surface. Typically, the capacitance increases as a finger approaches the touch surface, and further increases as the finger presses on the touch surface.

Figure 4:
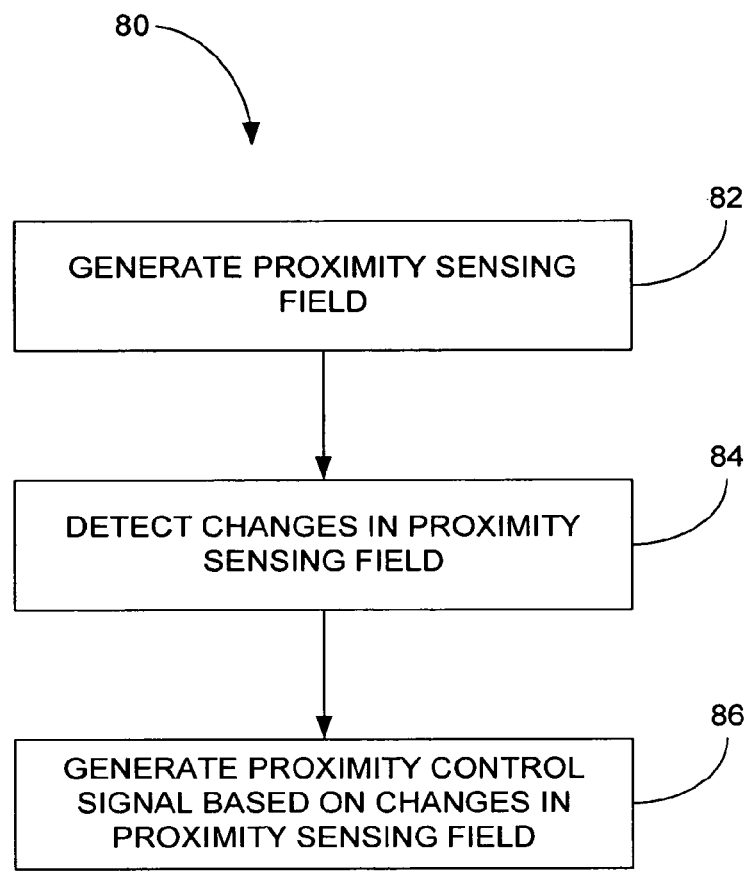
FIG. 4 is a diagram of a method of operating an I/O platform, in accordance with one embodiment of the present invention.

FIG. 4 is a diagram of a method 80 of operating an I/O platform, in accordance with one embodiment of the present invention. The method begins at block 82 where a proximity sensing field is generated above an I/O device. The sensing field may for example be generated using techniques associated with capacitance or infrared technologies (or others mentioned above). The sensing field is spaced apart (non contact) but in close proximity to the I/O devices. The distance between the I/O device and the sensing field may be as small as about 2 mm and as large as about 30 mm, and more particularly between about 2 mm and about 10 mm. Capacitance sensing fields may for example be between about 2 mm and about 3 mm while IR fields can be just about anywhere (e.g., focused to a particular distance above the surface).

In block 84, disturbances or changes in the sensing field are detected and thereafter registered as a proximity event. For example, when a finger is placed within the sensing field, the sensing field is disturbed and a controller translates this disturbance to mean that a finger is present. In the case of a capacitive proximity sensor, which may be separate component or a part of a capacitive sensing touch pad, the finger changes the capacitance at the sensing field and this change is registered as a proximity event. In the case of an IR proximity sensor, the finger scatters the light from the emitter when it is placed near the sensing field, and the scattered light is measured by a detector. Changes in light intensity is registered as a proximity event.

Thereafter, in block 86, a proximity control signal is generated based on the presence of the finger in the proximity sensing field. This is typically accomplished before any other touch based inputs are received since the finger passes through the sensing field on its way to actuating the touch based I/O devices. The proximity control signal can be used to affect the I/O platform in some non trivial manner or it can be used as a control signal in a host device.

Figure 5:
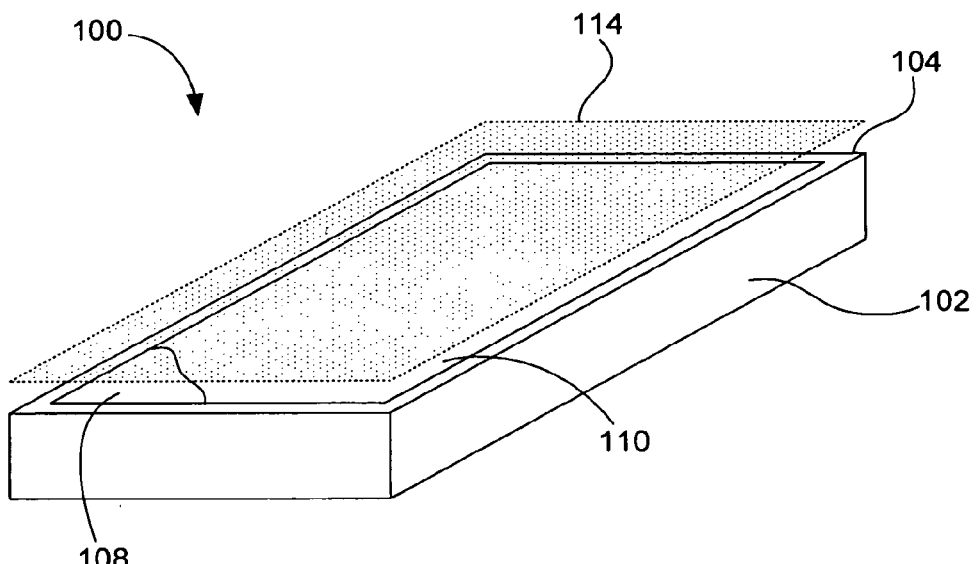
FIG. 5 is a simplified side elevation view of a portable computing device, in accordance with one embodiment of the present invention.

FIG. 5 is a simplified side elevation view of a portable computing device 100, in accordance with one embodiment of the present invention. The portable computing device 100 may for example be a portable computer, tablet PC, PDA, media player (e.g., music player, video player, game player), digital camera, GPS module, and the like.

The portable computing device 100 may be a handheld computing device. As used herein, the term "hand-held" means that the computing device has a form factor that is small enough to be comfortably held in one hand. A handheld computing device may be directed at one-handed operation or two-handed operation.

In one-handed operation, a single hand is used to both support the device as well as to perform operations with the user interface during use. Cellular phones, and media players are examples of hand-held devices that can be operated solely with one hand. In the case of a cell phone, for example, a user may grasp the phone in one hand between the fingers and the palm and use the thumb to make entries using keys, buttons or a joy pad.

In two-handed operation, one hand is used to support the device while the other hand performs operations with a user interface during use or alternatively both hands support the device as well as perform operations during use. PDA's and game players are examples of hand-held device that are typically operated with two hands. In the case of the PDA, for example, the user may grasp the device with one hand and make entries using the other hand, as for example using a stylus. In the case of the game player, the user typically grasps the device in both hands and make entries using either or both hands while holding the device.

The hand-held device may further be sized for placement into a pocket of the user (e.g., pocket sized). By being pocket-sized, the user does not have to directly carry the device and therefore the device can be taken almost anywhere the user travels (e.g., the user is not limited by carrying a large, bulky and often heavy device, as in a laptop or notebook computer).

As shown, the computing device 100 generally includes a housing 102 for enclosing internally various electronic components associated with operating the computing device 100. In general, the housing 102 serves to surround the internal electronic components at a peripheral region thereof so as to cover and protect the internal components from adverse conditions. The internal electrical components may include mechanisms for processing, generating, transmitting and receiving data associated with operating the portable computing device. By way of example, the internal electronic components may take the form of integrated circuits (e.g., processors, controllers, memory), or other electrical devices (e.g., circuit boards, cables, fans, power supplies, batteries, hard drive, disk drive, modem, connectors, etc.).

The computing device 100 also includes a user interface 104 that is the point of communication between the device 100 and the user of the device 100. The user interface may include any number of UI features, which can be located on any of the surfaces of the housing 102. In most cases, however, a predominant number of the UI features are placed on a front surface of the computing device 100. The UI features 106 may be embodied in a variety of ways and may include any number of input and/or output devices including but not limited to switches, buttons, dials, sliders, navigation pads, touch pads, touch screens, displays, speakers, and the like.

The UI features may even include advanced devices such as mechanically actuated touch pads such as those described in U.S. patent application Ser. No. 10/643,256, touch sensitive housings such as those described in U.S. patent application Ser. No. 11/115,539, multipoint sensing touch pads or touch screens such as those described in U.S. patent application Ser. No. 10/840,862, display actuators such as those described in U.S. patent application Ser. No. 11/057,050, all of which are herein incorporated by reference.

In one embodiment, the user interface 104 of the computing device 100 includes a full screen or near full screen display 108. A full screen display is a display that consumes, or at least dominates, a surface (e.g., front surface) of the computing device 100. In one example, a full screen display consumes substantially the entire front surface of the computing device 100 (in both directions). The full screen display may for example consume at least 90% of a front surface of a housing for the computing device. It may extend edge to edge or it may fit within a small bezel of the housing at the edge of the device. The full screen display may have a variety of different configurations depending on the overall footprint of the device. If the device is wide, the full screen display may have a traditional aspect ratio of about 4:3. If the device is elongated, the full screen display may have an aspect ratio that is more panoramic such as 16:9.

In this embodiment, in order to provide input functionality, the user interface 104 may additionally include a touch screen 110 disposed over the full screen display 108. The touch screen 110 may extend completely over the full screen or it may only cover a portion of the full screen. In most cases, the touch screen 110 covers at least the display portion of the full screen display 108. A multifunctional device that utilizes a full screen display among other advanced UI features may be found in U.S. Provisional Pat. App. No. 60/658,777, which is herein incorporated by reference.

Although a touch screen display is shown, it should be appreciated that the user interface may include any combination of input output devices such as any of those described above, or any of those further described in the applications incorporated by reference.

The computing device 100 also includes a proximity detection system 112. The proximity detection system is configured to detect when an object such as a finger (or stylus) comes in close proximity to the computing device 100. Proximity sensing differs from touch sensing in that there is no contact. The sensing occurs above the surface of the housing 102. For example, the proximity detection system 112 detects when an object such as a finger is placed in space above, and not in contact with, a surface of one or more regions of the computing device 100. The regions may include any side or any portion of a side of the computing device 100.

Proximity detection can be performed using a variety techniques. The techniques general depend on the object that is to be detected (e.g., finger, plastic, metal), the environmental conditions surrounding the computing device, the size of the computing device, and the costs associated with the proximity sensing technique, the resolution of the proximity sensing technique, etc. By way of example, the proximity detect system 112 may be based on techniques such as capacitive, electric field, inductive, hall effect, reed, eddy current, magneto resistive, optical shadow, optical visual light, optical IR, optical color recognition, ultrasonic, acoustic emission, radar, sonar, conductive or resistive. In each of these cases, the proximity detection system 112 may include one or more proximity sensors and/or switches. Switches are similar to sensors except that they provide a switch output when an object is detected. Furthermore, depending on the technology used, the proximity detect system may be hidden from view (e.g., internal to the housing) or it may be in plane sight to the user (e.g., external to the housing).

In one embodiment, the capacitance sensing circuit described in FIG. 3 (or similar circuit) is used. In another embodiment, the IR sensing circuit described in FIG. 2 (or similar circuit) is used.

In one embodiment, the proximity detection system 112 is configured to detect the presence of an object at the user interface 104 of the computing device 100. Using the illustrated example, the U.I. 104 is located at the front surface of the housing 102, and thus the proximity detection system 112 is configured to generate a sensing field 114 over all or some portion of the front surface of the housing 102. As mentioned previously, this may be accomplished with single or multiple sensing nodes, and regionally or over the entire surface.

In one implementation, the user interface 104 is activated from a dormant state when an object is detected. For example, the device may be woken up from a sleep mode. When it wakes up, the display 108 may be fully powered and the touch screen 110 may be readied for receiving touch inputs (e.g., unlocked).

In another implementation, the features of the user interface are altered when an object is detected. For example, buttons and switches may be illuminated and readied for input, or particular GUI elements on a display may brought into view and readied for receiving inputs. The later example may allow the display 108 to keep GUI controls and tools hidden until a user makes a motion to use the touch screen 110 or other input device. The GUI controls and tools that pop up when a finger is detected may be standard set of tools or they may be based on other factors including the location of the finger and/or the application currently running in the computing device 100. For example, in a music application, an onscreen control box that includes menu, play/pause, seek, and the like may be presented when a user hovers their finger above the user interface (especially the input portion of the user interface). Alternatively, an onscreen or virtual scroll wheel may be presented so that a user can scroll through a list of songs. Once the GUI control element is presented, the user may make selections associated therewith by using one of the input devices provide by the computing device (e.g., touch screen) or by performing a proximity gesture. A proximity gesture can be similar to a touch gesture except that it is performed without contact, and in some cases may even include a z component along with an x and y component.

Figure 6:
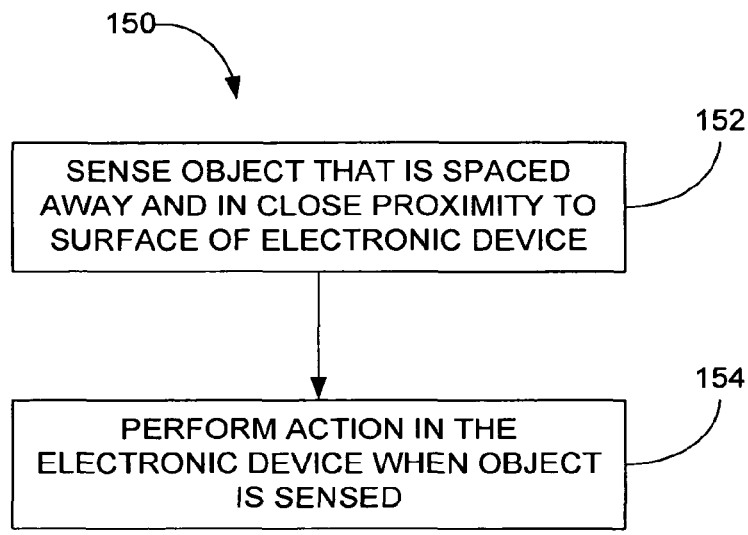
FIG. 6 is a diagram of a proximity based method, in accordance with one embodiment of the present invention.

FIG. 6 is a diagram of a proximity based method 150, in accordance with one embodiment of the present invention. The proximity based method may be performed on any electronic device as for example any of those previously described. By way of example, the method may be performed in the computing device of FIG. 5. The method 150 includes at least two blocks—blocks 152 and 154. In block 152, an object spaced away and in close proximity to an electronic device is sensed (e.g., non contact). This may for example be accomplished with any of those proximity detection systems described above. The sensing may be performed over the entire surface or regionally at particular locations of the electronic device as for example a single side, plurality of sides, all sides, a portion of single side, different portions of a single side, portions on multiple sides, and the like. The sensing may be configured to detect the presence of or lack of an object around the sensing field located above and in close proximity to the surface of the electronic device. Alternatively or additionally, the sensing may be broken up into nodes, pixels or juxtaposed sensing areas that cooperate to monitor the motion of an object as it is moved in the sensing field (this may be analogous to tracking as for example when using a touch pad or touch screen).

In block 154, an action is performed in the electronic device when an object is detected. The actions may be widely varied. The actions, may for example, include logging onto a computer or a computer network, loading a user profile associated with a user's preferred arrangement of the computer desktop, launching a particular program, opening a file or document, opening a particular GUI element, viewing a menu, making a selection, executing instructions, encrypting or decoding a message, operating an input/output device and/or the like.

Figure 7:
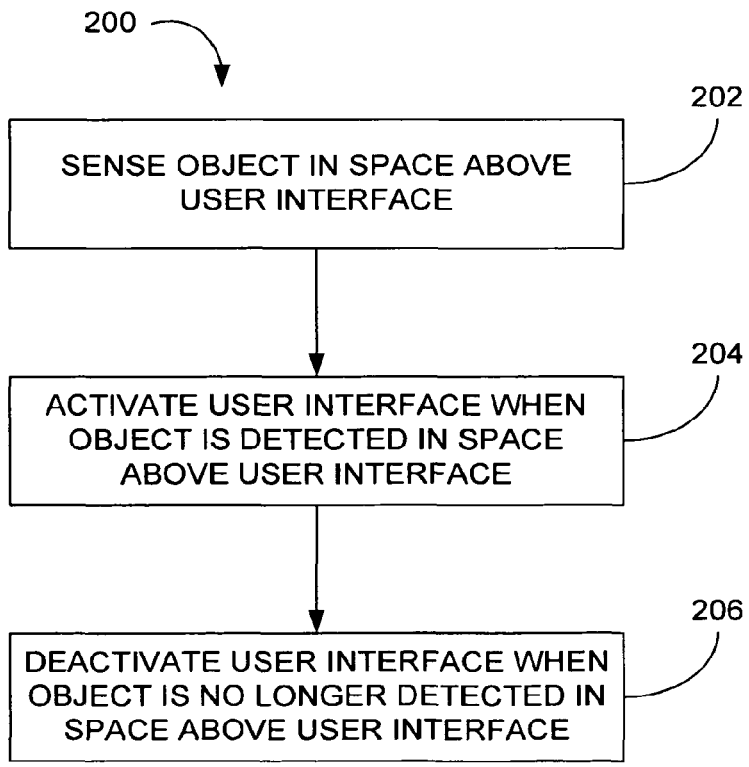
FIG. 7 is a diagram of a method of operating an electronic device, in accordance with one embodiment of the present invention.

FIG. 7 is a diagram of a method 200 of operating an electronic device, in accordance with one embodiment of the present invention. The method begins at block 202 where an object is sensed in the space above a user interface. The user interface may include for example a display, touch pad or a touch screen display (or any of those mentioned above).

Following block 304, the method proceeds to block 204 where the user interface or some portion of the user interface is activated or affected in a non trivial manner when an object is detected above the user interface. In one embodiment, the user interface is activated from a dormant state as for example when the device is in a sleep mode to save battery power or lock mode to prevent inadvertent entries at the user interface. In another embodiment, individual features of the user interface may be activated. For example, buttons, switches or navigation pads may be unlocked and illuminated. Alternatively or additionally, a display may display a GUI interface as for example one that includes tools or controls for operating some aspect of the electronic device.

The method also includes block 206 where the activated portion of the user interface is deactivated when an object is no longer detected. The deactivation may be instantaneous or it may be based on a time out. In the later case, the user interface may be deactivated when an object is not detected for a preset amount of time (e.g., 1 minute).

Figure 8:
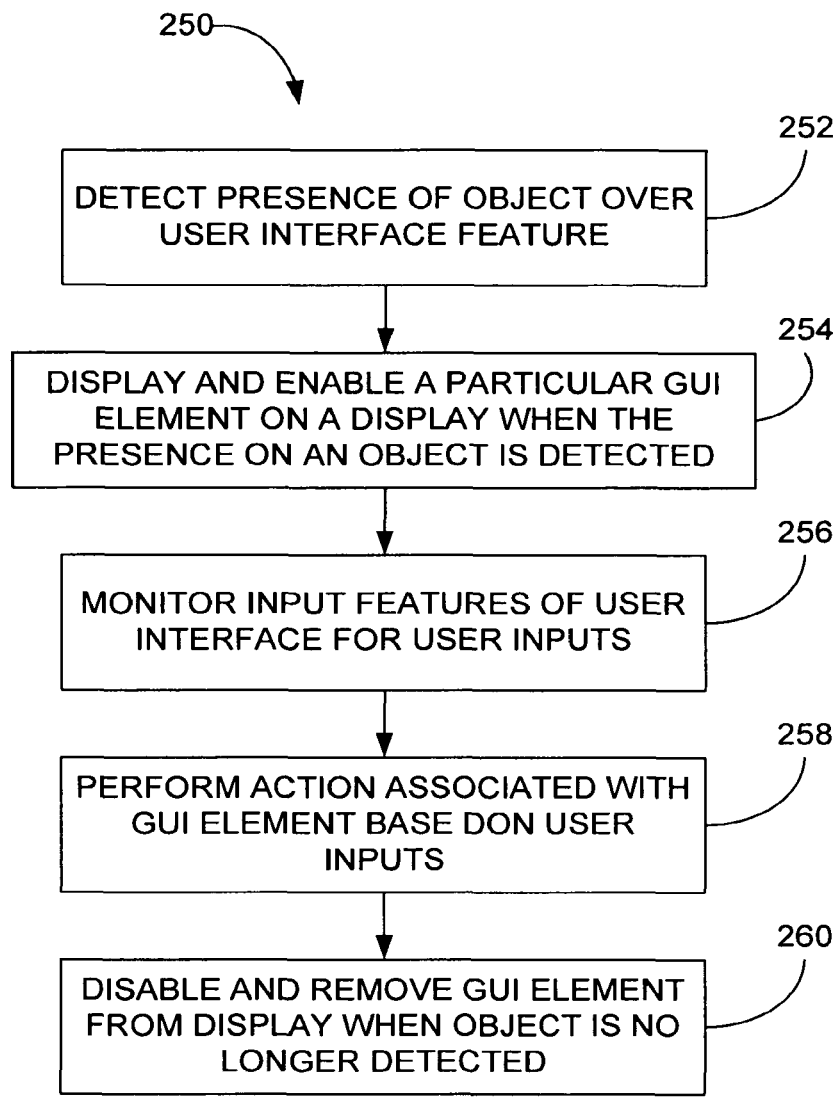
FIG. 8 is a diagram of a proximity method of operating an electronic device, in accordance with one embodiment of the present invention.

FIG. 8 is a diagram of a proximity method 250 of operating an electronic device, in accordance with one embodiment of the present invention. The method begins at block 252 where the presence of an object is detected over a user interface feature. The user interface feature may for example be a display, touch screen display, touch pad or some other navigation/selection based device.

Following block 252, the method proceeds to block 254 where a display portion of the user interface displays and enables a particular graphical user interface element when the presence of the object is detected. By way of example, the graphical user interface element may be a tool box or control panel associated with the application currently running on the electronic device.

Following block 254, the method proceeds to block 256 where input features of the user interface are monitored for user inputs. For example, a touch screen, touch pad or some other navigation/selection based device may be used to generate user inputs. Alternatively or additionally, a proximity based device may be used to generate user inputs.

Following block 256, the method proceeds to block 258 where one or more actions are performed in the particular graphical user interface element based on the user inputs.

In block 260, the graphical user interface element is disabled and removed from the display when the presence of the object is no longer detected. This may be instantaneous or based on a time out.

In one embodiment, block 256 is associated with a touch sensing device such as a touch screen or touch pad, and therefore block 256 includes monitoring touch events that occur on the touch sensitive surface of the touch sensing device. These events may include tracking and selection events, which are normal to touch sensing devices.

In one implementation, the touch sensing device is further configured to differentiate between light touch interactions and hard touch interactions that occur on the touch sensing surface. This may for example be accomplished by monitoring the forces exerted on a touch sensing surface during a touch event. The light touch interactions can be used to perform passive actions such as navigating through content, and content manipulation generally without causing a major event to occur. Examples of passive events include moving a cursor, scrolling, panning, etc. The hard touch interactions, on the other hand, can be used to select on screen buttons or initiate commands (e.g., causes a significant change to occur). In this embodiment, the inputs may include three input levels, proximity, light touch and hard touch.

Figure 9:
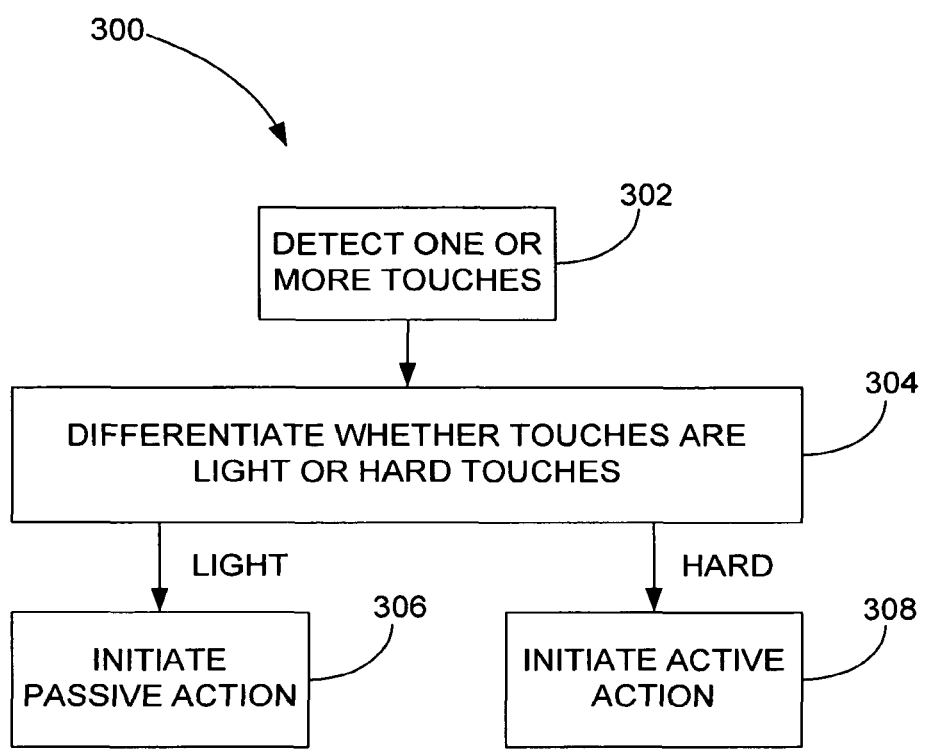
FIG. 9 is a diagram of a touch method, in accordance with one embodiment of the present invention.

FIG. 9 is a diagram of a touch method 300, in accordance with one embodiment of the present invention. The touch method 300 may for example be included in block 256 of FIG. 8. The touch method 300 begins at block 302 where one or more touches are detected. The touches include not only x any y components but also z components. The x and y components are supplied by a touch sensing device such as touch screen, touch pad or touch housing. The z component, on the other hand, is generally provided by force sensors located behind the touch surface of the touch sensing device. By way of example, the x, y and z components may be supplied by a display arrangement that includes a touch screen positioned over a display and a force sensing device disposed underneath the display. The x, y and z components may also be supplied by a touch pad or touch housing that includes a touch sensitive surface and force sensing device underneath the touch sensitive surface. Additionally or alternatively, the z component may be supplied by a physical switch located behind the touch surface (display actuator), or possibly using the touch surface itself (e.g., contact patch areas that increase in size based on increases in touch pressure).

Following block 302, the method proceeds to block 304 where a determination is made as to whether the touch is a light or hard touch (e.g., differentiating whether the detected touch is a light touch or a hard touch). The determination is generally based on the force or pressure of the touch (z component). For example, if the force of the touch is smaller than a predetermined threshold then the touch is considered a light touch and if the force of the touch is larger than the predetermined threshold then the touch is considered a hard touch.

If it is determined that the touch is a light touch, the method proceeds to block 306 where a passive action is initiated when a touch event is performed. Examples of passive actions include navigation, moving a cursor, scrolling, panning, etc. If it is determined that the touch is hard touch, an active action is initiated when a touch event is performed. Examples of active actions include making selections and implementing commands.

Although not a requirement, the touch method may additionally include a block where the one or more touches are classified as a primary touch or a secondary touch. Primary touches are touches that are intended to cause an action while secondary touches are touches that are not intended to cause an action. Gestures are examples of primary touches while a thumb positioned over the touch area in order to hold the hand-held device is an example of a secondary touch. Once the touches are classified as primary or secondary, the secondary touches are filtered out, and the determination of whether a touch is a light or hard touch is made with the primary touches.

Figure 10:
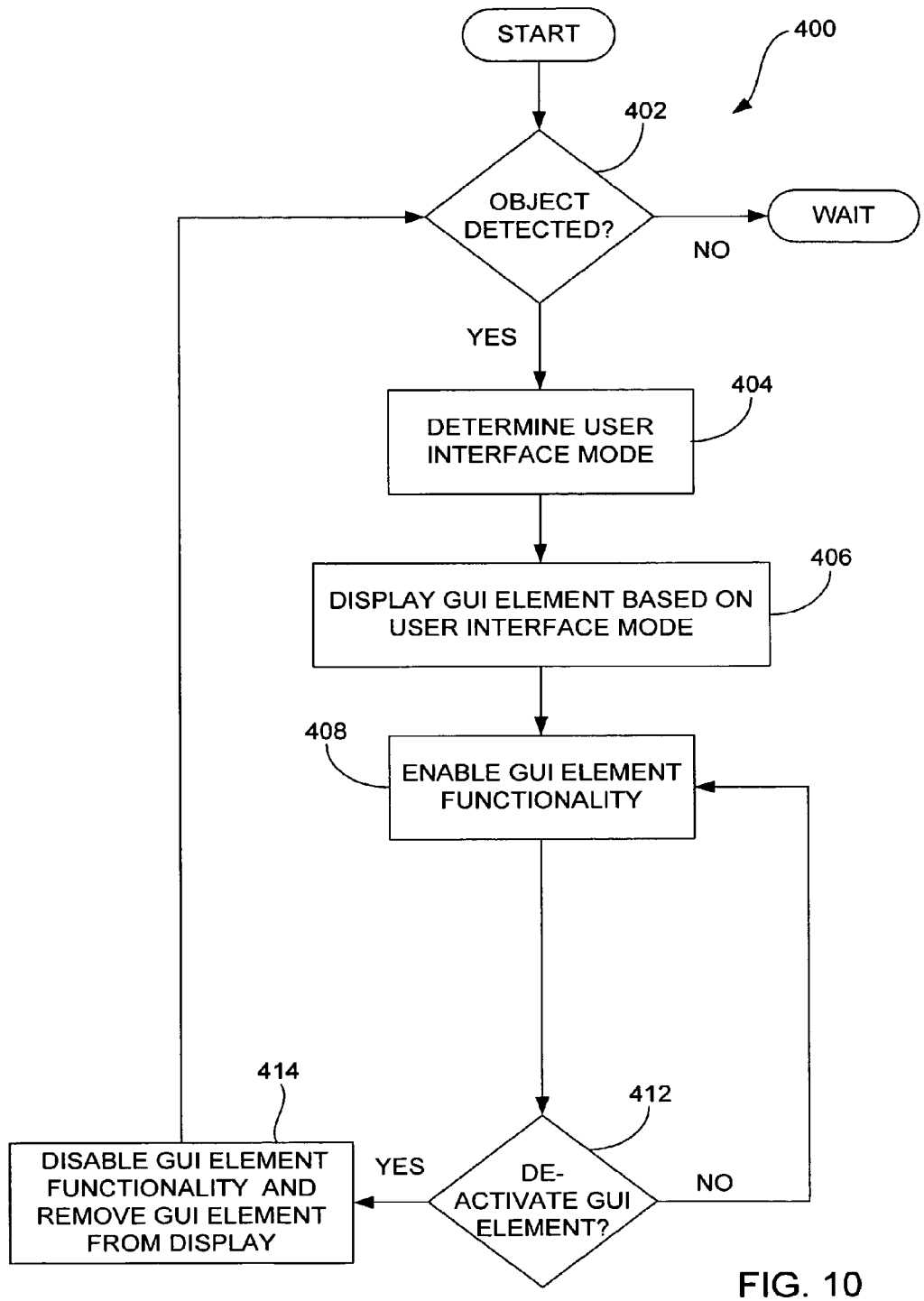
FIG. 10 is user interface method, in accordance with one embodiment of the present invention.

FIG. 10 is user interface method 400, in accordance with one embodiment of the present invention. The user interface method 400 may for example be performed on a computing device having a display, a touch sensitive input device such as a touch screen and a proximity detector. The user interface method 400 begins at block 402 where an object such as a finger or stylus is detected above and spaced away from the display. This may be accomplished with the proximity detector when the finger crosses into the sensing field of the proximity detector. In some cases, the touch screen may act as a proximity detector as for example in cases where the touch screen is based on capacitance. The controller can be configured to monitor changes in capacitance even when there is no touch. The object however typically has to be fairly close to the touch surface of the touch screen.

Once the object is detected, the user interface method 400 proceeds to block 404 where a user interface (UI) mode is determined. The user interface mode may be widely varied. The user interface mode may include scroll modes, data entry modes, edit modes, control modes, information modes, etc. Each mode typically has one or more GUI interface elements associated therewith. By way of example, a virtual scroll wheel or slider bar may be associated with a scroll mode, a keyboard or keypad may be associated with data entry mode, a tool bar such as a formatting tool bar or drawing tool bar may be associated with an edit mode, a control panel including buttons may be associated with a control mode, a window may be associated with an information mode, etc.

The user interface mode may be determined at block 404 based on one or more conditions including for example, one or more applications currently running on the computing device, the current state or mode of the one or more applications and/or the proximity characteristics (e.g., location). In fact, determining the user interface mode at block 404 may involve monitoring and analyzing one or more conditions.

The current applications may for example include operating systems (e.g., Mac OS), word processing programs, spreadsheet programs, draw editing programs, image editing programs, gaming programs, photo management programs (e.g., iPhoto), music management programs (e.g., iTunes), video editing programs (e.g., iMovie), movie management programs (e.g., QuickTime), music editing programs (e.g., GarageBand), Internet interface programs and/or the like.

The current state or mode of the applications may correspond to an active portion of the application (e.g., current window or windows within windows). For example, the active portion of a music management program may correspond to a music control mode, a playlist select mode, a menu mode, and/or the like. Further, the active portion of a photo management program may correspond to photo browsing mode or photo editing mode. Further still, the active portion of an internet interface program may correspond to a web mode or an email mode.

The proximity characteristics on the other hand may, for example, correspond to location, number of detected objects, etc.

With regards to applications, different applications may indicate different UI modes. For example, a word processing or spreadsheet application may indicate a data entry mode, while a music management program may indicate a control or scrolling mode. With regards to the current state of an application, different modes of the application may indicate different UI modes. For example, in a music management program, a menu window may indicate one UI mode, while a play list window may indicate another UI mode.

With regards to proximity, the number of fingers may indicate different UI modes. For example, one finger may indicate a first mode while two fingers may indicate a second mode. In addition, the location of the finger(s) may indicate different UI modes. For example, a first location may indicate a first UI mode, while a second location may indicate a second UI mode (if the object is located over a border of a music program a first UI mode may be implemented, and if the object is located over a play list or list of songs in the music program a second UI mode may be implemented.

In one embodiment, the user interface mode is based on only one of the conditions. For example, the user interface mode is only based on the application, the current state of the application or one of the various proximity characteristics as described above. In another embodiment, the user interface mode is based on multiple conditions. For example, the user interface mode may be based on a combination of at least two selected from the application, the current state of the application and the various proximity characteristics. By way of example, the application combined with a first proximity characteristic may indicate a first UI mode and the same application combined with a second proximity characteristic may indicate a second UI mode.

To cite a few examples, if the application is a word processing or spreadsheet program then the mode may be determined to be a data entry mode so that data can be entered into the spreadsheet (e.g., keyboard). If the application is a music management program and a playlist is currently showing (active portion), the mode may be determined to be a scroll mode so that the items in the list may be scrolled through in order to find a desired item (e.g., scroll wheel). Alternatively, if a song is playing (active portion), the mode may be determined to be a control mode so that the manner in which songs are played can be controlled (e.g., play, stop, seek and volume control options). Further, if the application is a photo management program and a particular photo is displayed (active portion), the mode may be determined to be a control mode so that the photo can be modified (e.g., converting to black and white, removing red eye, and rotate options).

After determining the user interface mode 404, the user interface method 400 proceeds to block 406 where one or more GUI elements are displayed based on the user interface mode. This may be accomplished with the display device. In some cases, only one GUI element is displayed and in other cases multiple GUI elements are displayed. The GUI element is typically associated with a particular mode. For example, a slider bar or scroll wheel may be displayed in a scroll mode, a keyboard or keypad may be displayed in a data entry mode, a tool bar may be displayed in an edit mode, various buttons or a control panel may be displayed in a control mode, and information windows may be displayed in an information mode.

The GUI element may be displayed in a variety of ways. For example, it can be positioned over the currently displayed graphical images, or it can displace the currently displayed graphical images (e.g., minimize, shift, etc.). In some cases, the GUI element is made semi transparent so that the current graphical image disposed below the GUI element can be seen (thereby eliminating minimizing and shifting). This may be helpful when using a scroll wheel to traverse through a list disposed below the scroll wheel. Furthermore, the GUI element can be placed in the vicinity of the touch or it can be placed in some predetermined location. The predetermined location may be based on ergonomics, i.e., what is the best location for the user.

In addition to the above, the GUI element may be displayed using a transition effect such as growing, fading in, popping up, and in some cases may even pulsate, throb, etc. If the effect is popping up, the GUI element is immediately brought into view. If the effect is growing, a small GUI element (e.g., scroll wheel) is initially displayed, and thereafter the GUI element continuously enlarges through various sizes until it reaches its desired size. In addition, the final size of the GUI element may be based on the length of time the object is detected. For example, the GUI element stops growing when the touch is no longer detected. Alternatively, the speed and size may be user adjustable as for example through a control panel. If the effect is fading, the GUI element is slowly brought into view from nothing, through various levels of distortion or transparency, to a final complete image. The fading can be controlled similarly to growth. For example, the level of fade may be controlled by the length of time the object is detected.

The transition effect may even carry over to the currently displayed images, i.e., the images currently displayed before the object was detected. In one embodiment, the opposite effect happens to the currently displayed images. For example, the currently displayed graphical images are minimized smaller and smaller as the GUI element grows larger and larger. Alternatively, if the GUI element immediately pops in, the currently displayed graphical images can immediately pop out or be immediately minimized.

In block 408, the functionality of the GUI element is enabled. When enabled, the GUI element is readied for receiving inputs. In the case of a touch screen, for example, touch events are monitored relative to the GUI element and actions associated with the touch event are performed. The enablement may occur simultaneously with the display of the GUI element so that a user can immediately start using the GUI element once displayed. By way of example, in a scroll mode, a virtual scroll wheel may be displayed and when enabled, the touch events are monitored relative to the scroll wheel. During monitoring, control signals associated with the position of the finger on the scroll wheel are generated as the finger swirls around the virtual scroll wheel. These signals can be used to perform scrolling. For example, the number, combination and frequency of the signals may be converted into distance, direction and speed necessary for moving a selection bar through a list. Examples of virtual scroll wheels and their operations may be found in U.S. patent application Ser. Nos. 10/903,964 and 11/038,590, both of which are herein incorporated by reference.

At some point after enabling and displaying the GUI element, a determination 412 is made as to whether or not to deactivate the GUI element. The determination 412 can be made in a variety of ways including, for example: 1) the object is no longer detected, 2) an object has not been detected for a preset amount of time, 3) a time out occurs (a preset amount of time has gone by since the GUI element was first displayed/enabled), or 4) a user selection (e.g., a user selects a button that closes the GUI element).

If the determination indicates deactivation, then the method proceeds to block 414 where the GUI element is disabled and removed from display. Once disabled, actions will no longer be performed when a touch event occurs. The removal of the GUI element from display may function similar to displaying the GUI element in that it can be removed using a transition effect such as slowly fading out, shrinking or immediately disappearing (popping out). The removal transition effect may work opposite the displaying transitioning effect. For example, the GUI element fades out similarly to fading in, shrinks similarly to growth or pops out similarly to popping in. Further, the GUI element can slowly recess and disappear from view while the displaced or shrunken current graphical images can slowly grow back to their original size and shape. If the determination does not indicate deactivation, then the method maintains the display of the GUI element as well as the enablement thereof.

Figure 11:
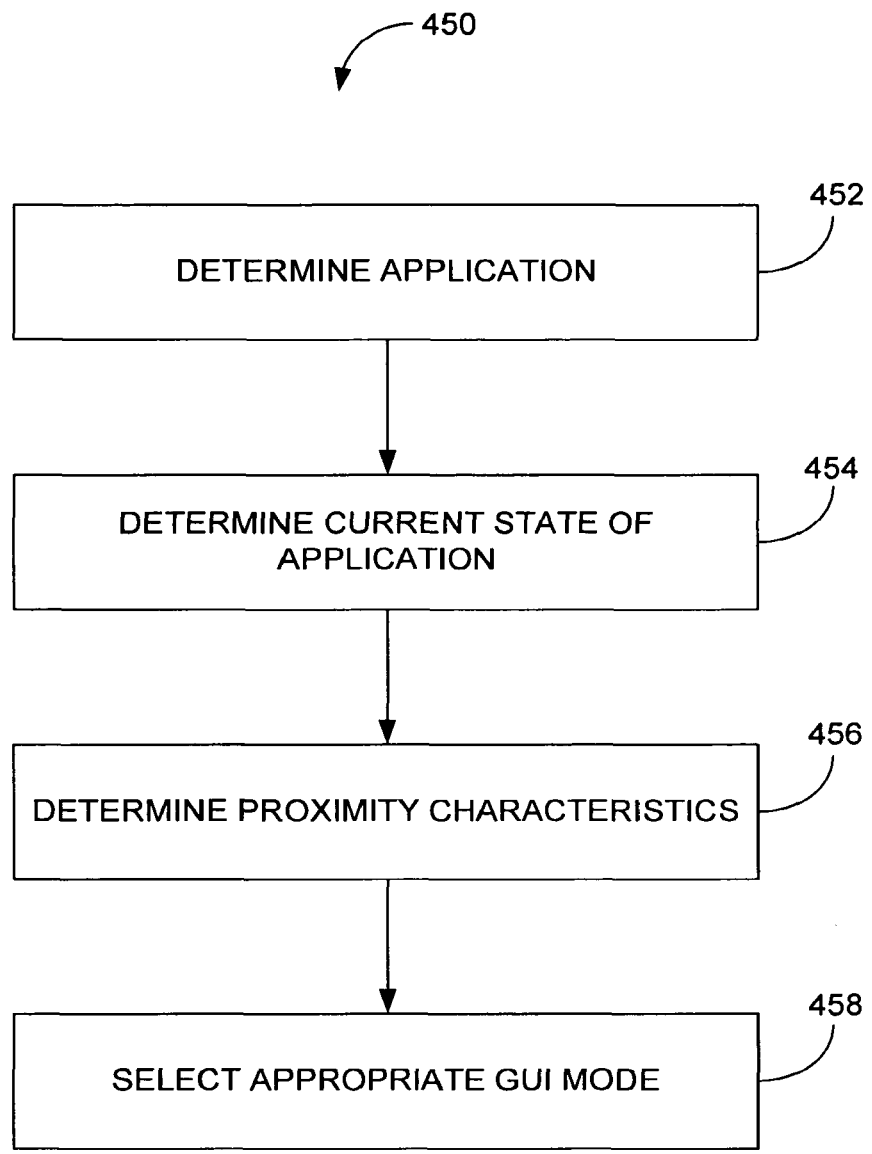
FIG. 11 is a determination method, in accordance with one embodiment of the present invention.

FIG. 11 is a determination method 450 in accordance with one embodiment of the present invention. The determination method may, for example, correspond to the block 404 in FIG. 10. The determination method begins at block 452 where the current application is determined. The determination method proceeds to block 454 where the current state of the application is determined. Following block 454, the determination method proceeds to block 456 where the proximity characteristics associated are determined. The determination method proceeds to block 460 where a UI mode is selected based on the results from blocks 452-458. By way of example, a set of rules may indicate appropriate UI modes for a particular set of conditions.

Figure 12:
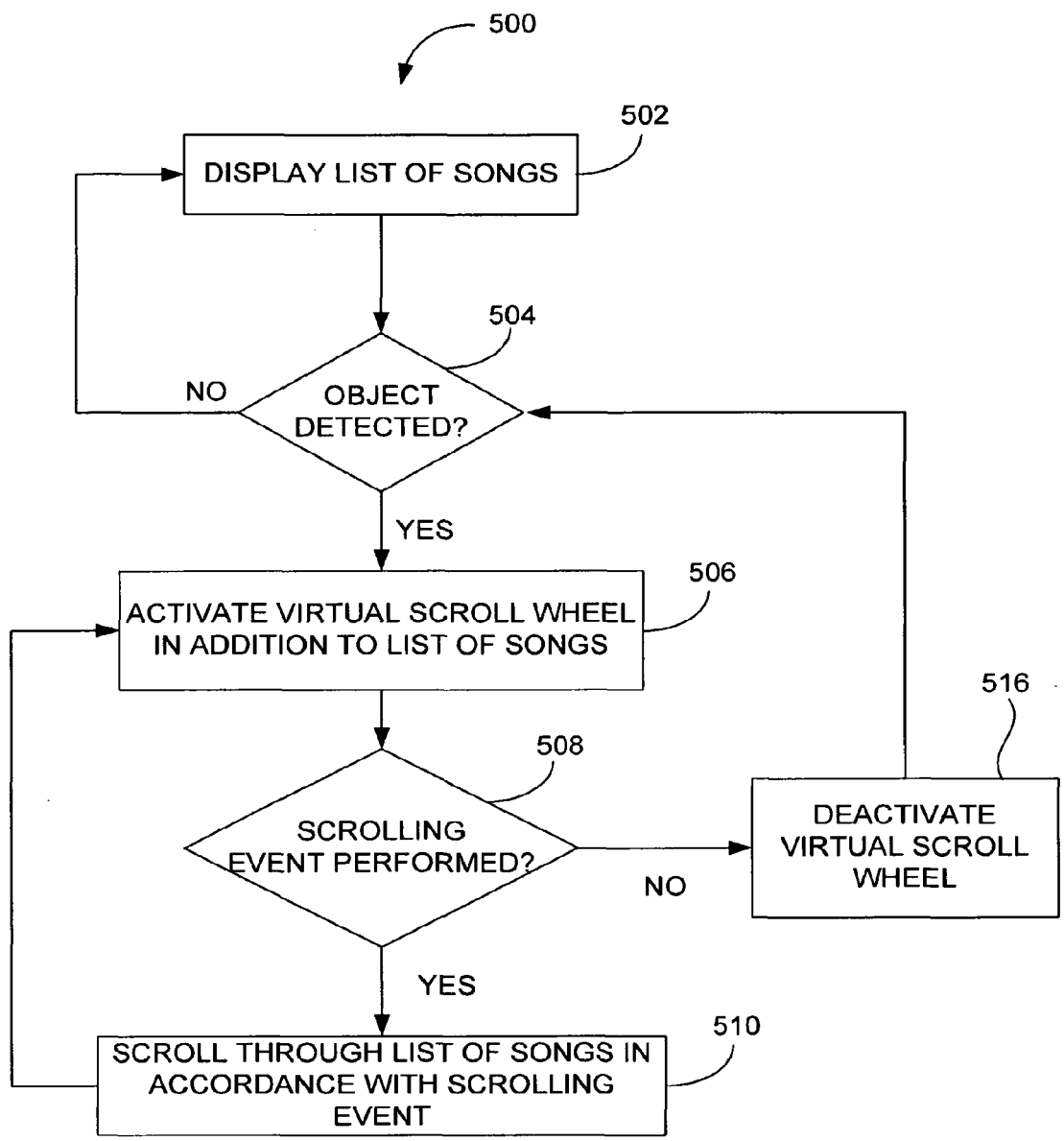
FIG. 12 is a user interface method, in accordance with one embodiment of the present invention.
Figure 13A:
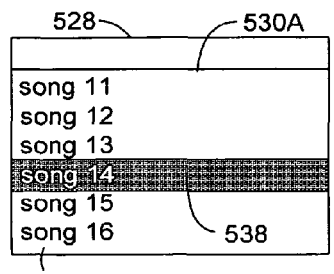
FIG. 13A-13F illustrates a sequence associated with the method shown in FIG. 12, in accordance with one embodiment of the present invention.
Figure 14A:
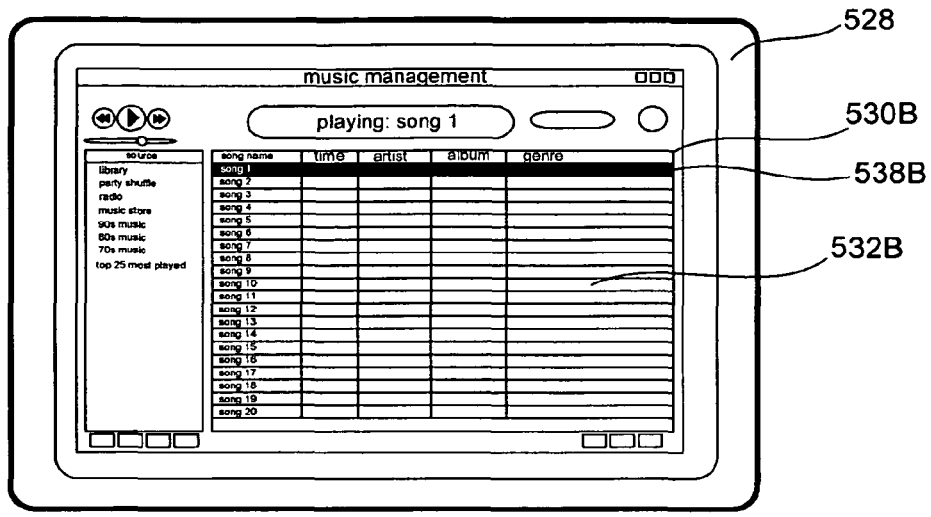
FIG. 14A-14F illustrates a sequence associated with the method shown in FIG. 12, in accordance with one embodiment of the present invention.

FIG. 12 is a user interface method 500 in accordance with one embodiment of the present invention. The method may, for example, be performed on a computing device having a display, a touch sensitive input device such as a touch screen and a proximity detector. The interface method 500 begins at block 502 where a list of songs are displayed. FIG. 13A shows one example of a window 530A including a list of songs 532A, and FIG. 14A shows another example of a window 530B including a list of songs 532B. FIG. 13A may, for example, be a graphical user interface displayed on an iPod® manufactured by Apple Computer of Cupertino, Calif., and FIG. 14A may for example be a graphical user interface associated with a music management program, such as iTunes® manufactured by Apple Computer of Cupertino, Calif.

Figure 13B:
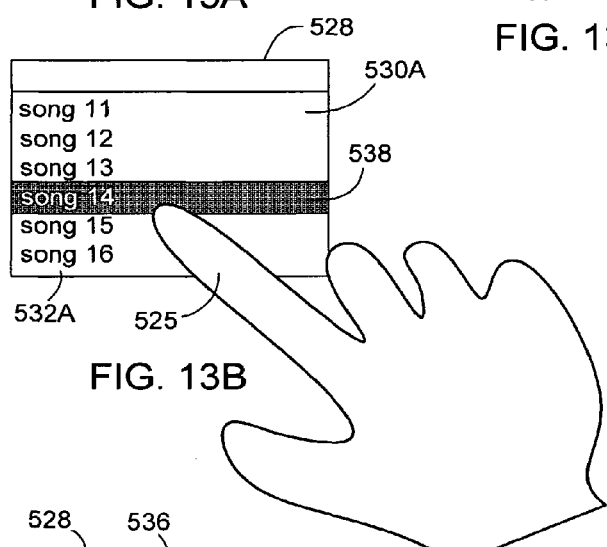
Figure 14B:
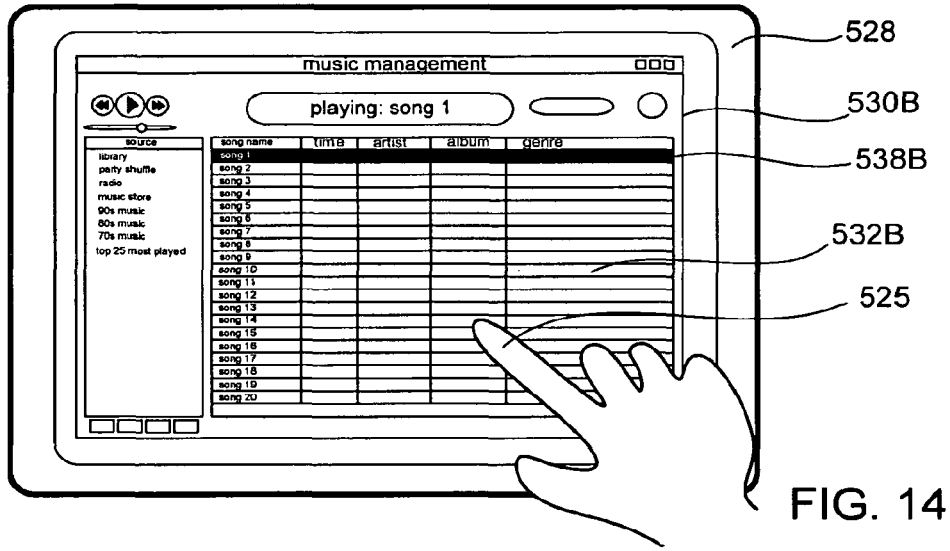

Following block 502, the user interface method 500 proceeds to block 504 where an object is detected over the displayed list of songs (or window or entire GUI). This may be accomplished with the proximity detector when an object such as a stylus or one or more fingers is placed above the touch screen display. FIGS. 13B and 14B show a finger 525 placed over the window 530 including the list of songs 532. Although shown in this figure, the finger is spaced away and not in contact with the touch surface.

Figure 13C:
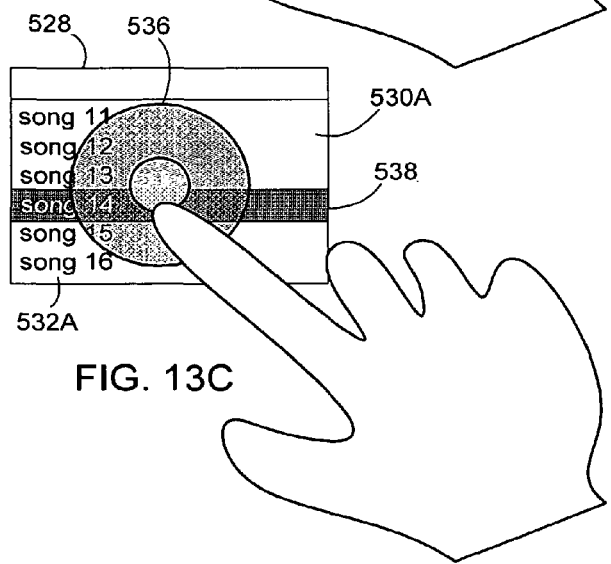
Figure 14C:
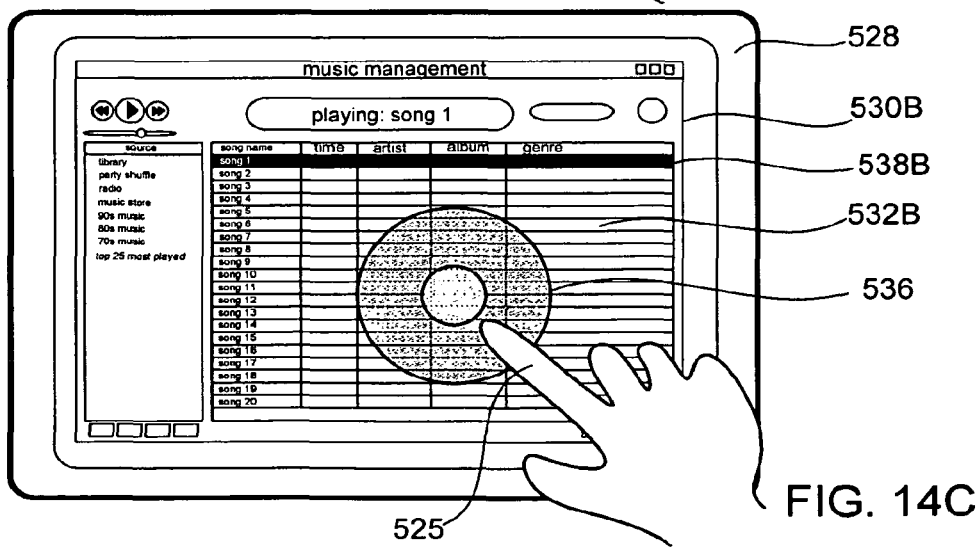

Once the presence of an object is detected, the user interface method 500 proceeds to block 506 where a virtual scroll wheel is activated. That is, a virtual scroll wheel is displayed in addition to the list of songs and its functionality is enabled. In essence, because the song list was active, a scroll wheel that allows a user to traverse through the songs in the list of songs is provided. In some cases, the virtual scroll wheel displaces the media items, i.e., the media items are minimized or shifted to make room for the virtual scroll wheel. In other cases, the virtual scroll wheel is positioned or laid over the media items (the media items keep their current size, shape and position). The virtual scroll wheel can be made semi-transparent so that the media items can be viewed through the virtual scroll wheel. FIGS. 13C and 14C show a transparent virtual scroll 936 wheel laid over the window 530 including the list of songs 532. Alternatively, a virtual slider bar may be displayed.

Once displayed, a determination 508 is made as to whether or not a scrolling event (or gesture) is performed relative to the virtual scroll wheel. For example, whether or not a finger is positioned over the scroll wheel and whether or not the finger is moved around the scroll wheel in a swirling fashion. The scroll event may be a proximity event or a touch event.

Figure 13D:
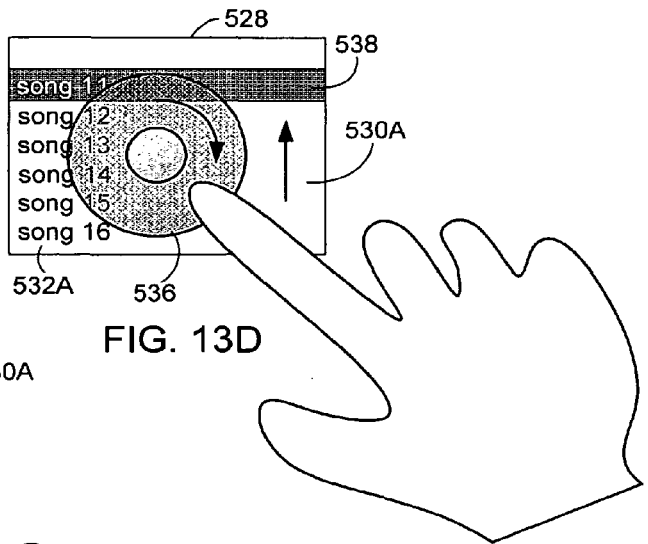
Figure 14D:
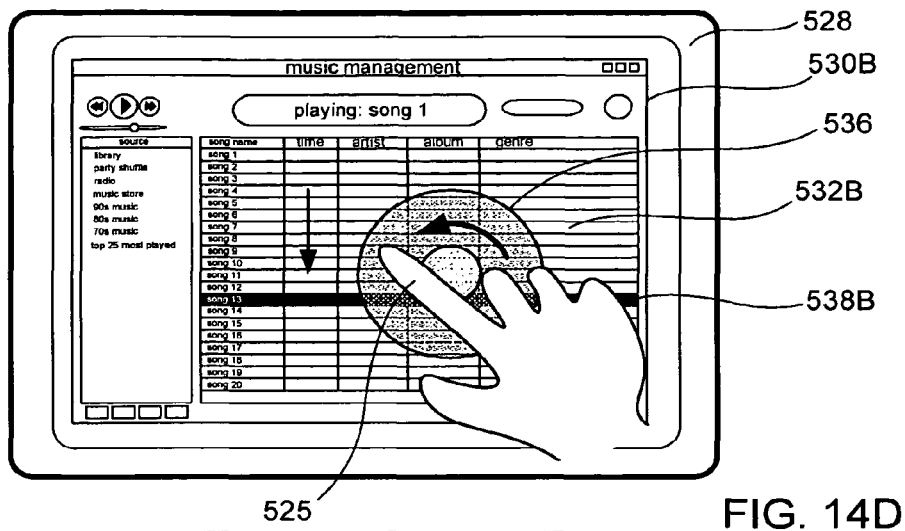
Figure 14E:
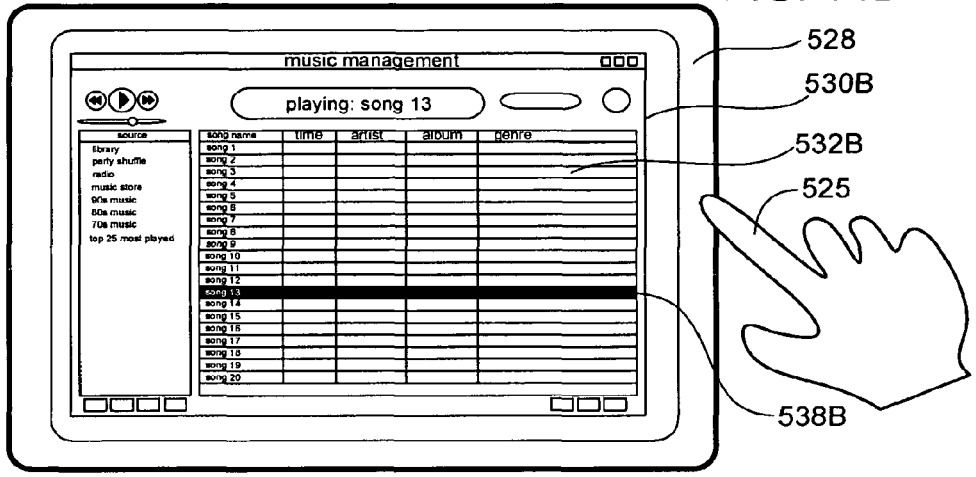
Figure 14F:
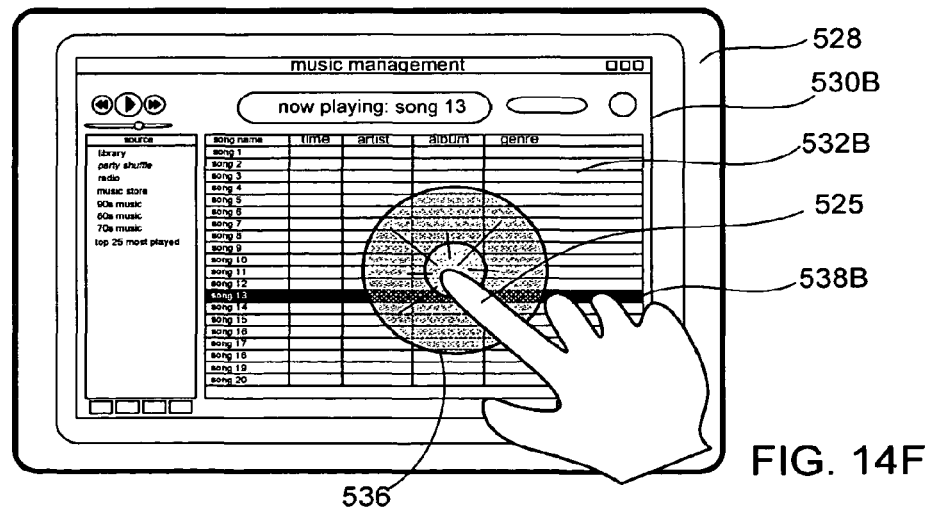

If a scrolling event is performed by the user, the user interface method 500 proceeds to block 510 where scrolling is implemented through the list of songs in accordance with the scrolling touch event. By way of example, a selector bar may be moved from one song to another as the finger is swirled around the virtual scroll wheel. FIGS. 13D and 14D show the finger 525 swirling around the virtual scroll wheel 536, and a selector bar 538 moving linearly through the list of songs 532 in accordance with the swirling finger 525. In the illustrated embodiments, the selector bar is moved linearly up when the finger is swirled in a clockwise fashion and linearly down when the finger is swirled in a counterclockwise fashion. It should be noted, however, that this is not a limitation. For example, the selector bar may moved linearly down when the finger is swirled in a clockwise fashion and linearly up when the finger is swirled in a counterclockwise fashion.

Figure 13E:
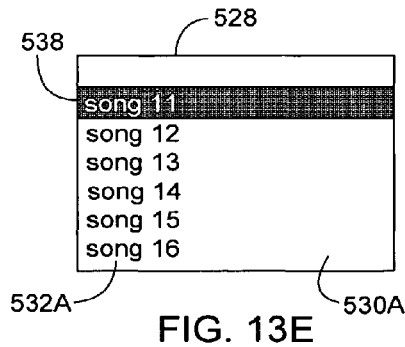
Figure 13F:
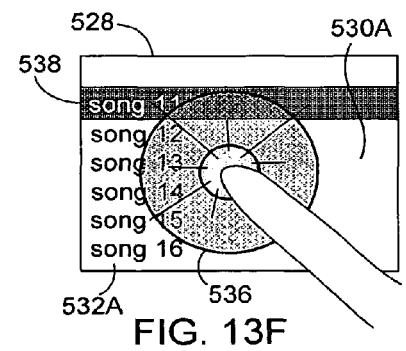

If a scrolling or select touch event is not performed, the user interface method 500 proceeds to block 516 where the virtual scroll wheel is deactivated. That is, the virtual scroll wheel is disabled and removed from the display. FIGS. 13E and 145E show the display 528 without the virtual scroll wheel 536. Although the virtual scroll wheel 536 is removed, changes made to the list of songs, i.e., the position of the selector bar 538, typically remain.

In some cases, the virtual scroll wheel may include button zones across its surface or a virtual button at its center or around its sides. The buttons and button zones may for example correspond to menu, play, seek, pause, and/or the like. In this particular embodiment, the method described above may include additional steps that occur before block 516. For example, if a scrolling touch event is not performed, the user interface method 500 may include an additional block where a determination is made as to whether or not a selection touch event (or gesture) is performed relative to the virtual scroll wheel. The selection touch event may be implemented by tapping the button or by exerting increased or decreased pressure on the button rather than swirling around the surface of the virtual scroll wheel (see FIGS. 13F and 14F). If the button is a song select or enter button, the method include another block where the song with the selector bar disposed thereover is selected. That is, when the virtual button is tapped, or otherwise selected, the song currently covered by the selector bar is played and outputted for the user's enjoyment.

Figure 15A:
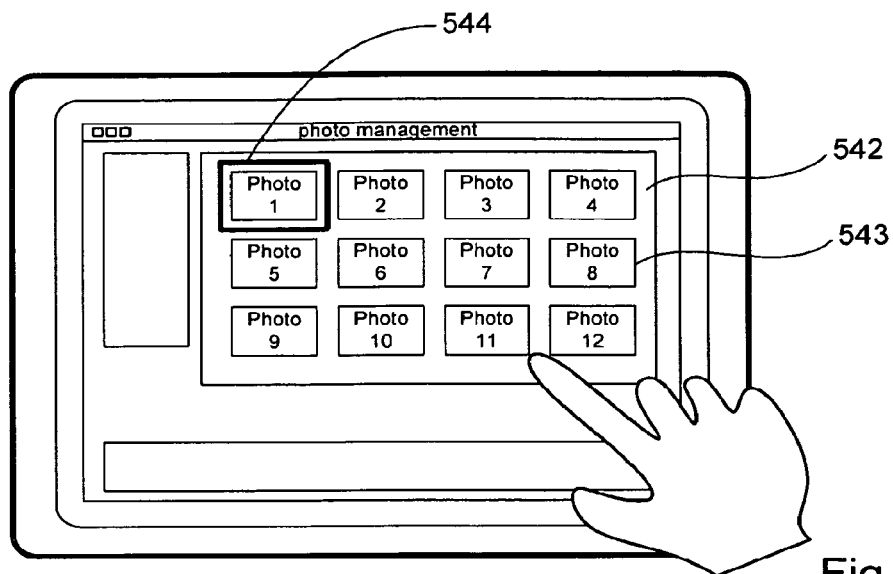
FIGS. 15A-15C illustrate a user interface sequence, in accordance with one embodiment of the present invention.
Figure 15B:
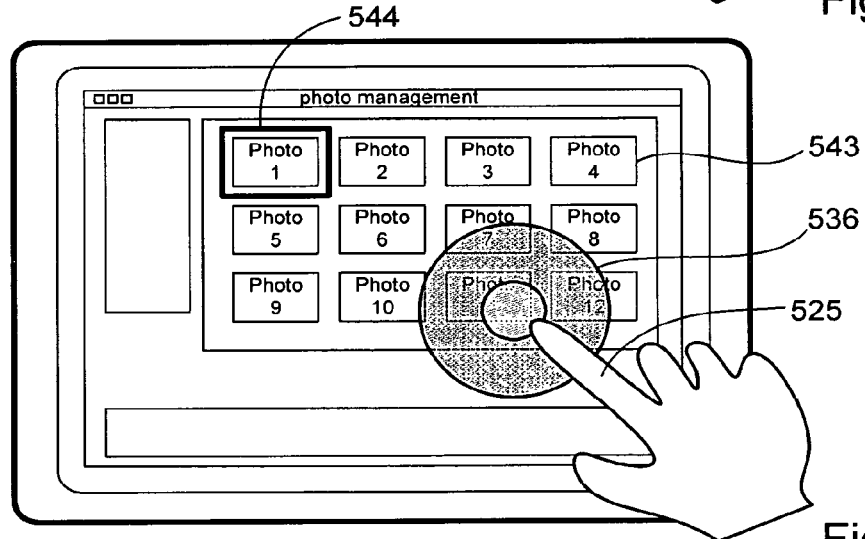
Figure 15C:
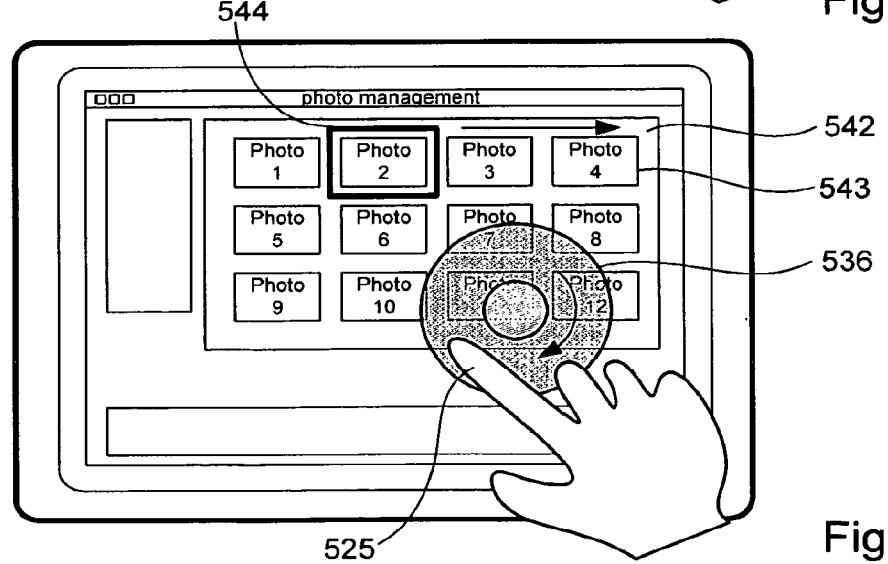

It should be noted that the methods described above are not limited to scrolling through a list of songs. Any media item as well as any group of elements can be scrolled through using the aforementioned technique. For example, in photo layout 542 as shown in FIGS. 15A-15C, the virtual scroll wheel 536 may appear when the user places their finger 525 over the photo layout 542 (or grouping), and thereafter it can be used to move a highlighter 544 through the various photos 543 in the layout 542. By way of example, the photos may be thumbnails images that make traversing through a large number of images easier.

Figure 16:
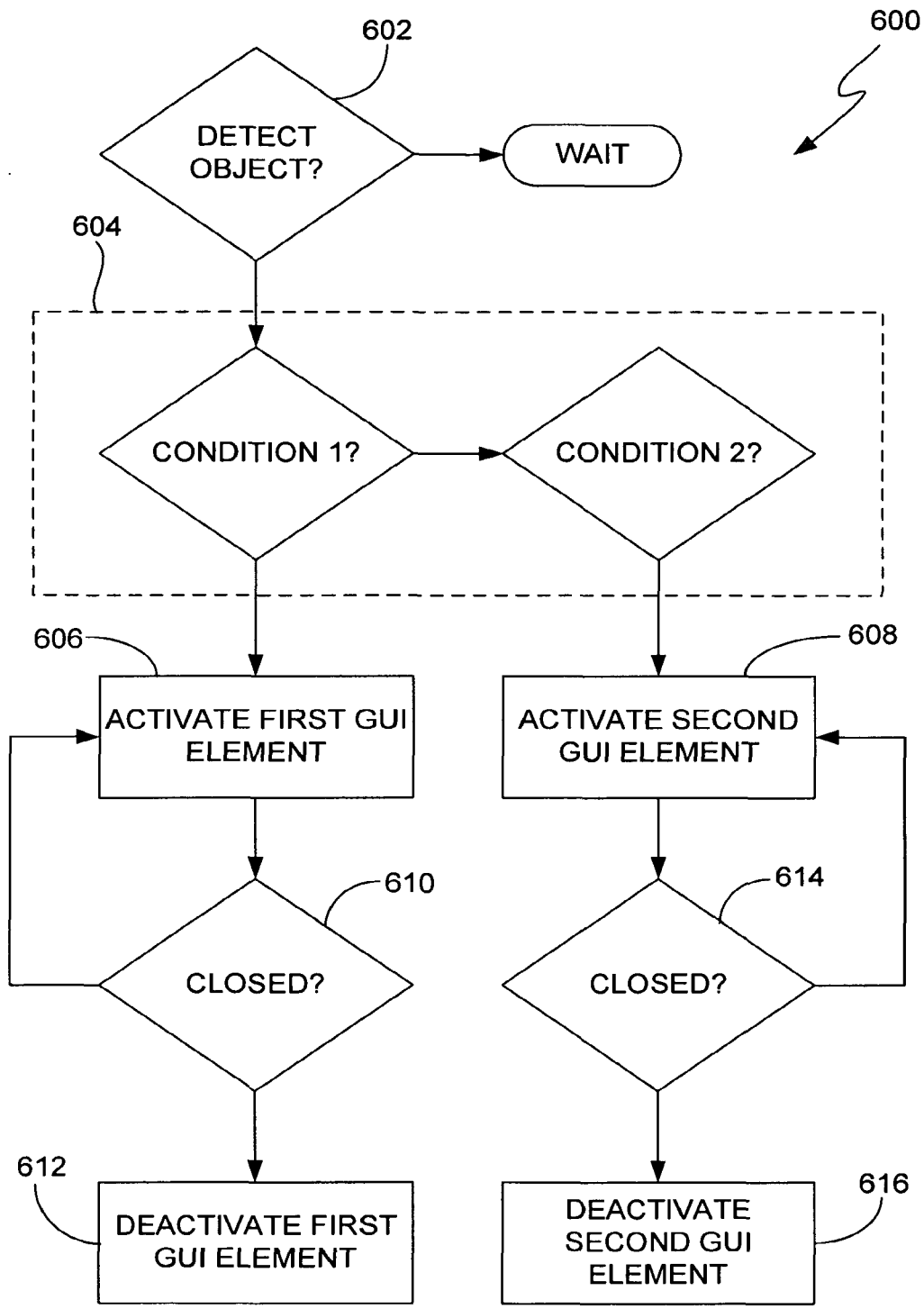
FIG. 16 is a user interface method, in accordance with one embodiment of the present invention.

FIG. 16 is a method 600, in accordance with one embodiment of the present invention. The method begins at block 602 where it is determined if an object in space is detected. If an object is detected, the method proceeds to block 604 where the current operating conditions are monitored and analyzed. The conditions may for example correspond to the current application, the state of the application and/or the proximity characteristics associated with the object.

Figure 17A:
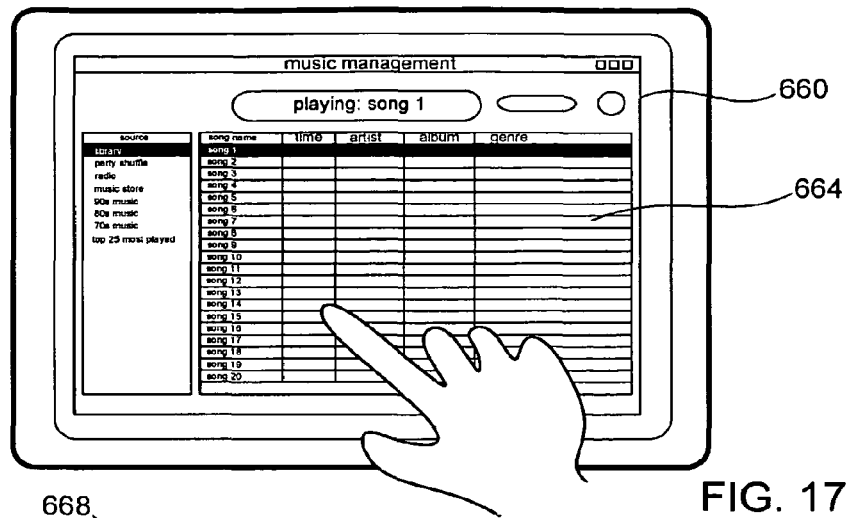
FIGS. 17A-17J illustrate a user interface sequence, in accordance with one embodiment of the present invention.
Figure 17B:
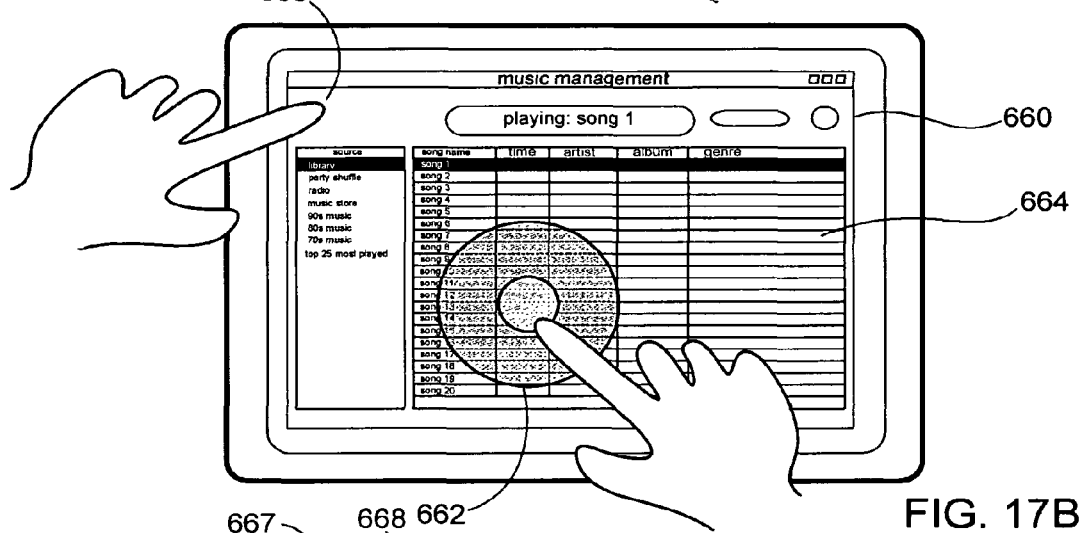

If a first set of conditions are implemented, the method proceeds to block 606 where a first GUI element is activated. For example, as shown in FIGS. 17A-B, in an active window 660 of a music management program, a scroll wheel 662 may be activated when a user places their finger above a playlist portion 664 of the active window 660 without touching the touch surface.

Figure 17C:
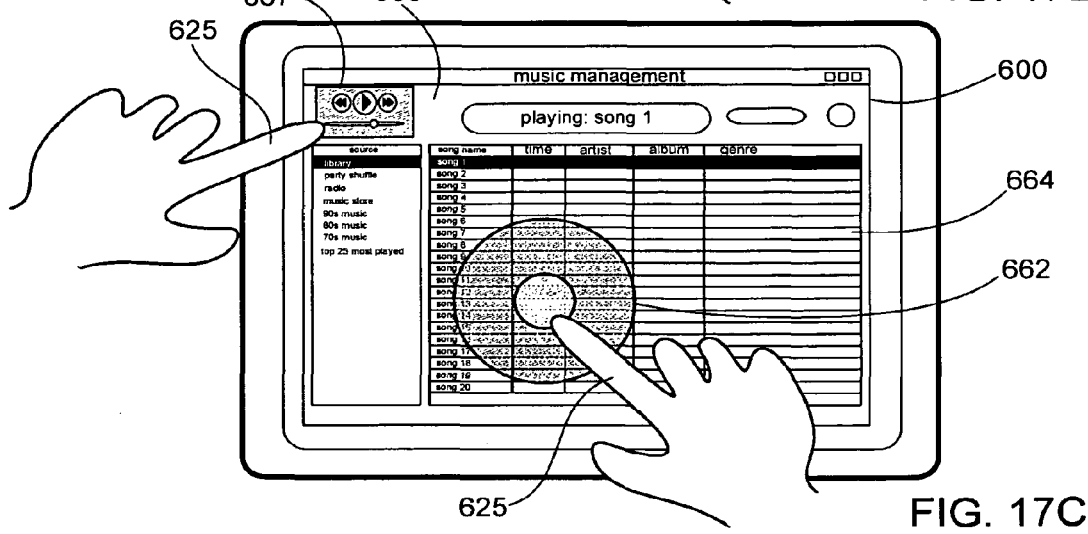

If a second set of conditions are implemented, the method proceeds to block 608 where a second GUI element is activated. For example, as shown in FIGS. 17B-C, in the active window 660 of a music management program, a music control panel 667 may be activated when a user also touches a border 668 of the active window 660. Although they work independent of one another, the first and second GUI elements may be activated at the same time if the first and second conditions occur simultaneously (FIG. 13C).

Figure 17D:
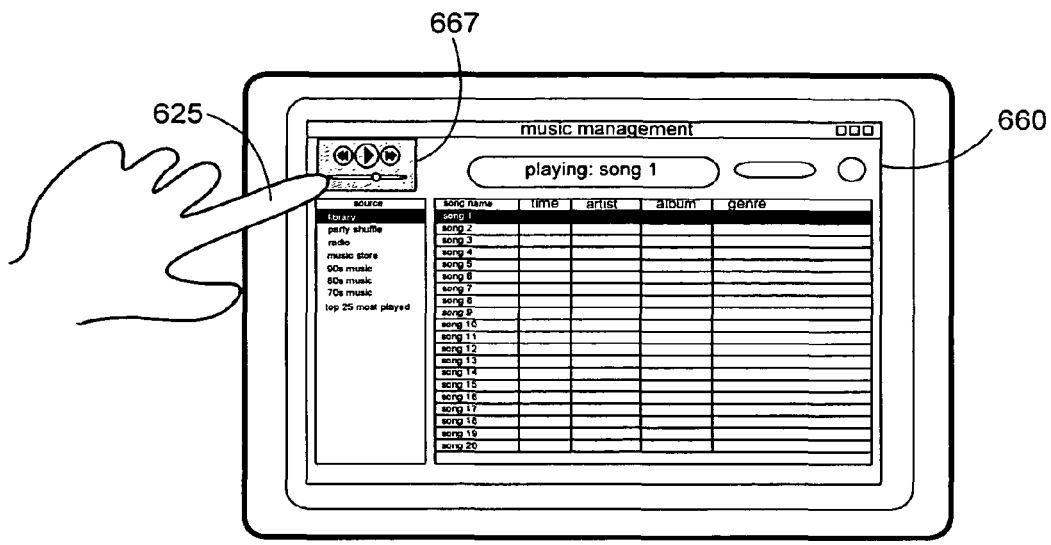

Following block 606, the method proceeds to block 610 where it is determined if the first GUI element should be deactivated. If so, the method proceeds to block 612 where the GUI element is deactivated. For example, as shown in FIG. 17D, the first GUI element (scroll wheel 662) is disabled and removed from display when the finger 625 is no longer detected over the playlist 662. If not, the method maintains block 606.

Figure 17E:
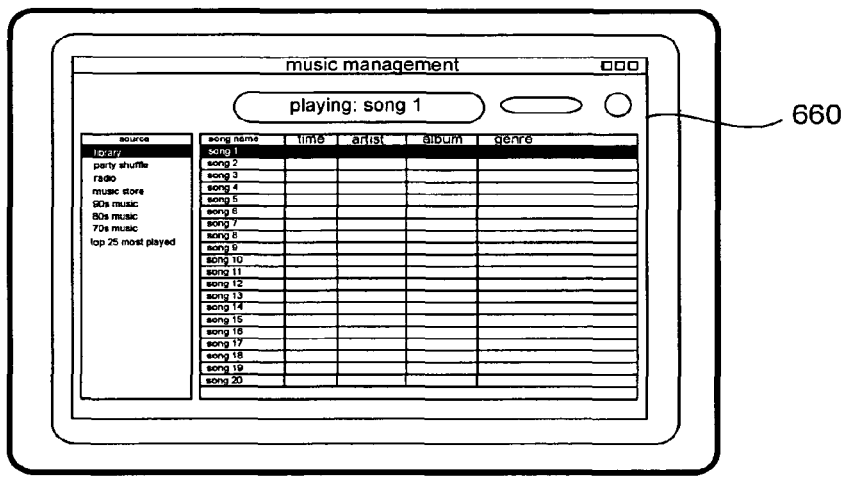

Similarly but independently, following block 608, the method proceeds to block 614 where it is determined if the second GUI element should be deactivated. If so, the method proceeds to block 616 where the GUI element is deactivated. For example, as shown in FIG. 17E, the second GUI element (control panel 667) is disabled and removed from display when the finger 625 is no longer detected over the border 668. If not, the method maintains block 608.

Figure 17F:
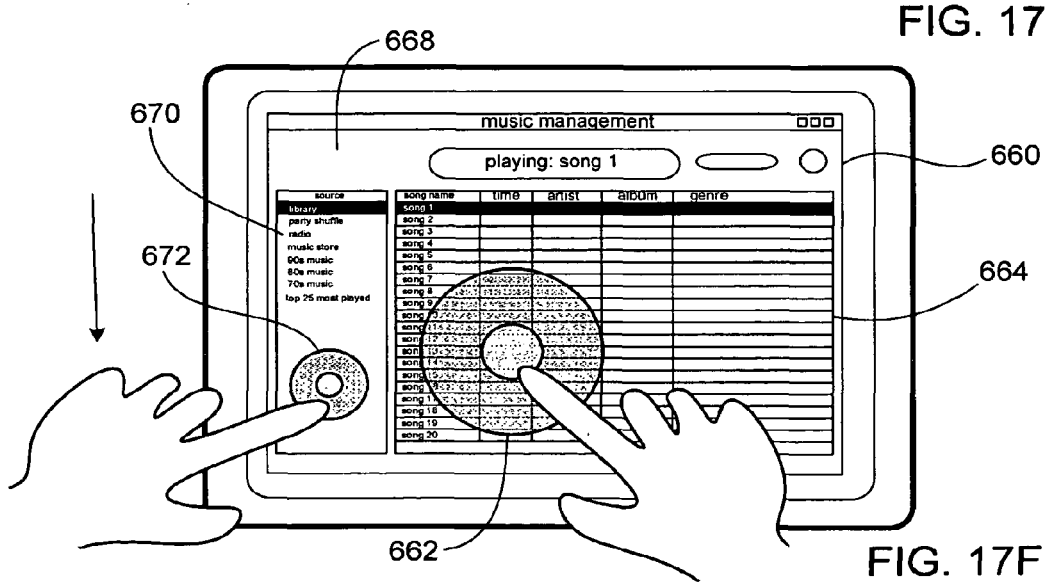

It should be noted that the method is not limited to only two GUI elements and that other GUI elements may be activated if other conditions are implemented (N+1). For example, as shown in FIG. 17F, the user may move their finger 625 from over the border 668 to over a menu portion 670 of the active window 660 thereby initiating a change from the control panel 667 to a scroll wheel 672 (e.g., while the second GUI element is being deactivated, the third GUI element is being activated).

Figure 17G:
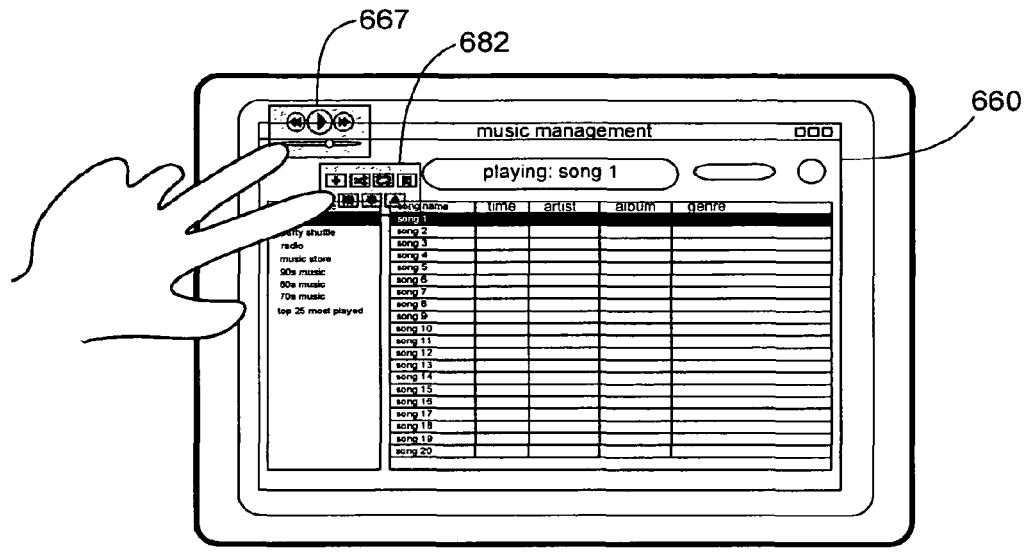

Further, as shown in FIG. 17G, the user may add another finger 625 to the mix thereby initiating a change from the first control panel 667 to a second control panel 682. The first control panel 667 may include a first set of control options such as play, stop, seek and volume options and the second control panel 682 may include a second set of control options such as song playing order, song information, light effect options.

Figure 17H:
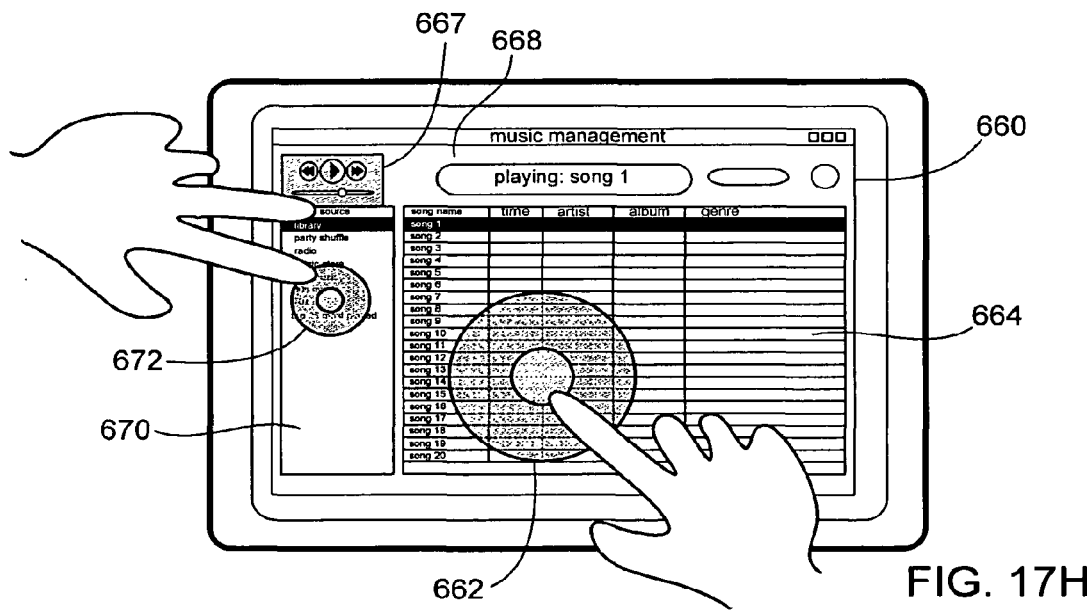

Moreover, as shown in FIG. 17H, the user may place one finger 625A over the border 668, another finger 625B over a menu portion 670, and yet another finger 625C over the playlist portion 664 thereby initiating three different GUI elements, particularly, a control panel 667, a first scroll wheel 672 for scrolling through the menu 670, and a second scroll wheel 662 for scrolling through the playlist 664.

Figure 17I:
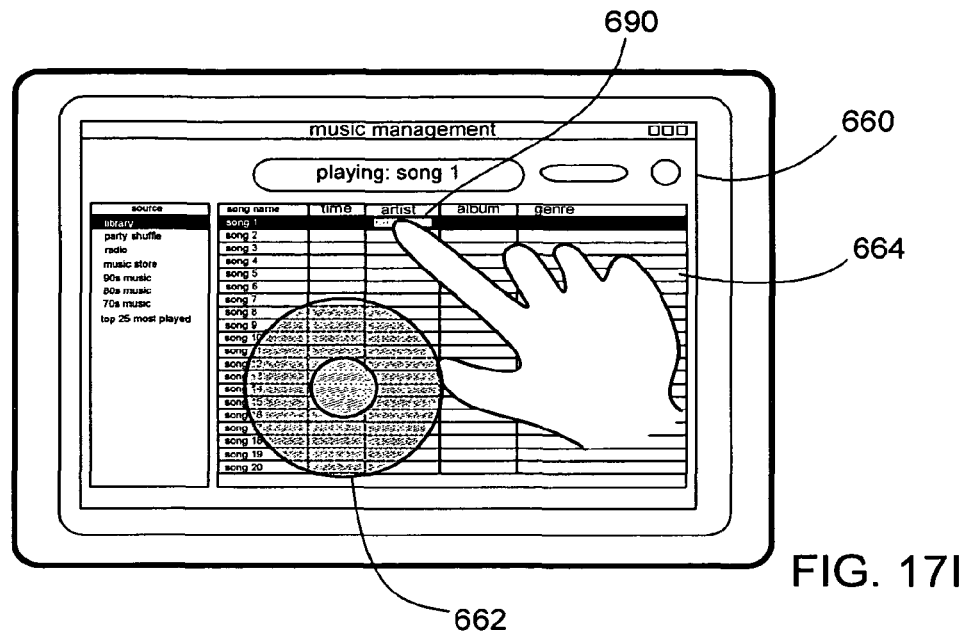
Figure 17J:
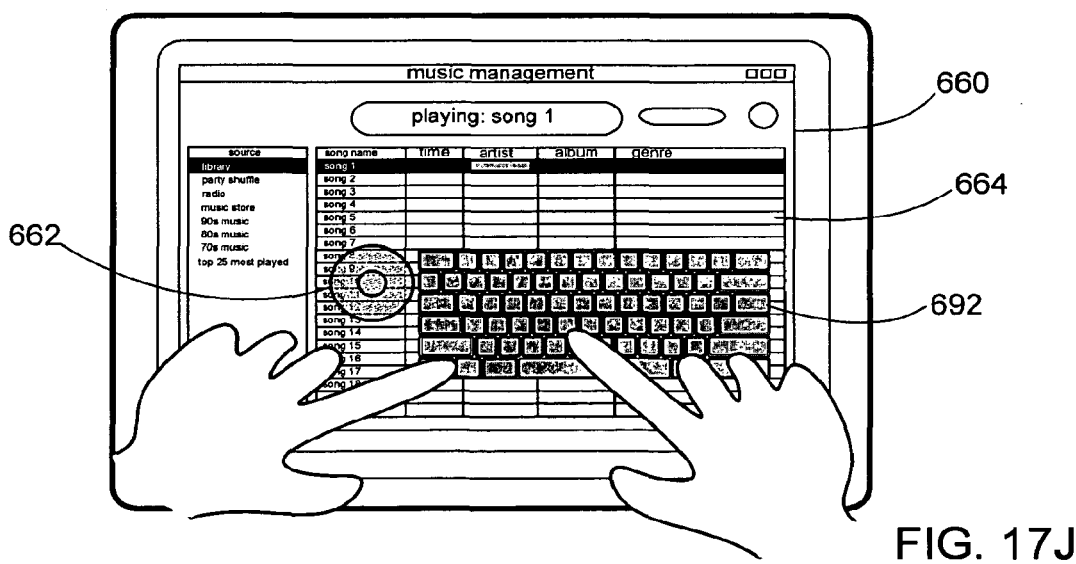

In addition, multiple GUI elements can be activated in the same portion. For example, as shown in FIGS. 17I and 17J, if the user places their finger over a particular box 690 in the playlist 664, a keyboard 692 may be activated so that the user can enter data associated with the song (e.g., title, artist, genre, etc.). If the scroll wheel 662 is active at the same time as the keyboard 692, the scroll wheel 662 may be minimized to accommodate the keyboard 692 as shown. Once the keyboard 992 is deactivated, the scroll wheel 662 reverts back to its original size.

Figure 18:
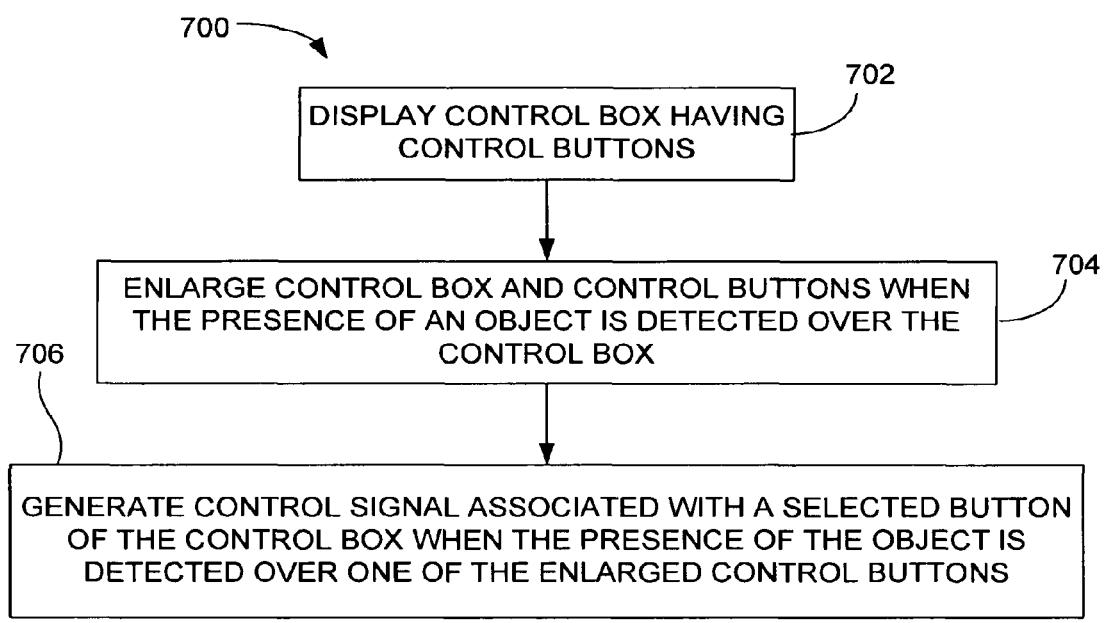
FIG. 18 is a diagram of a GUI operational method, in accordance with one embodiment of the present invention.

FIG. 18 is a diagram of a GUI operational method 700, in accordance with one embodiment of the present invention. The GUI operational method 700 is configured for initiating zooming targets. The GUI operational method 700 generally begins at block 702 where a control box GUI element is displayed. The control box contains one or more control buttons, which are somewhat close together, and which can be used to perform actions. The control box may, for example, include control buttons such as maximize, minimize, close, and the like. Following block 702, the GUI operational method 700 proceeds to block 704 where the control box is enlarged, or at least one of the control buttons is enlarged for a period of time when the presence of an object is detected above the touch screen and over the control box or one of the control buttons. In the case where the control box is enlarged each of the control buttons is enlarged thereby making selection thereof much easier. In the case where only the control button is enlarged, the user would decide whether this is the correct button and if so select the enlarged control button, or restart the process so that the appropriate control button is presented. In most cases, the size of the control buttons corresponds to the size of the finger so that they may be easily selected by the object. Following block 704, the GUI operational method 700 proceeds to block 706 where a control signal associated with the selected control button is generated when the object is placed on the touch screen and over one of the enlarged control buttons.

Figure 19A:
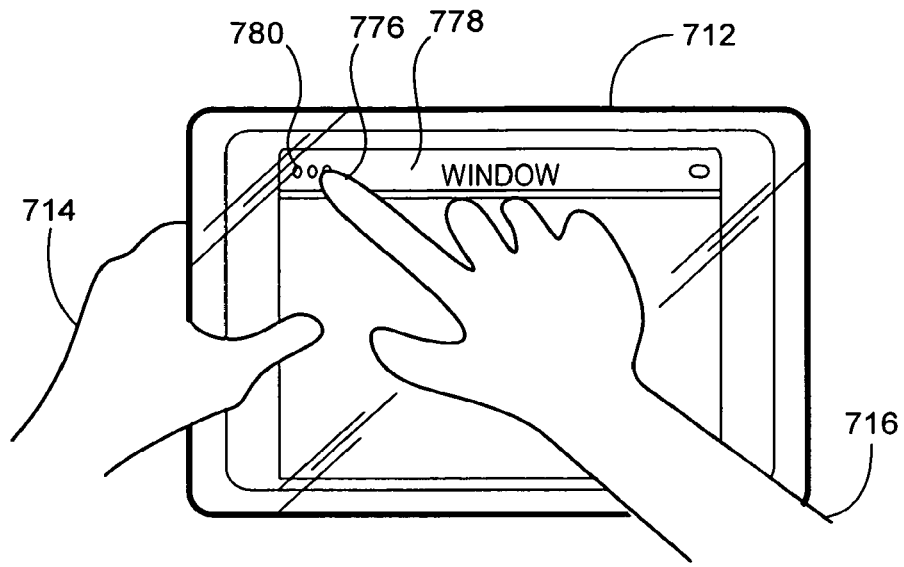
FIGS. 19A-19D illustrate a zooming target sequence using the GUI operational method, in accordance with one embodiment of the present invention.
Figure 19B:
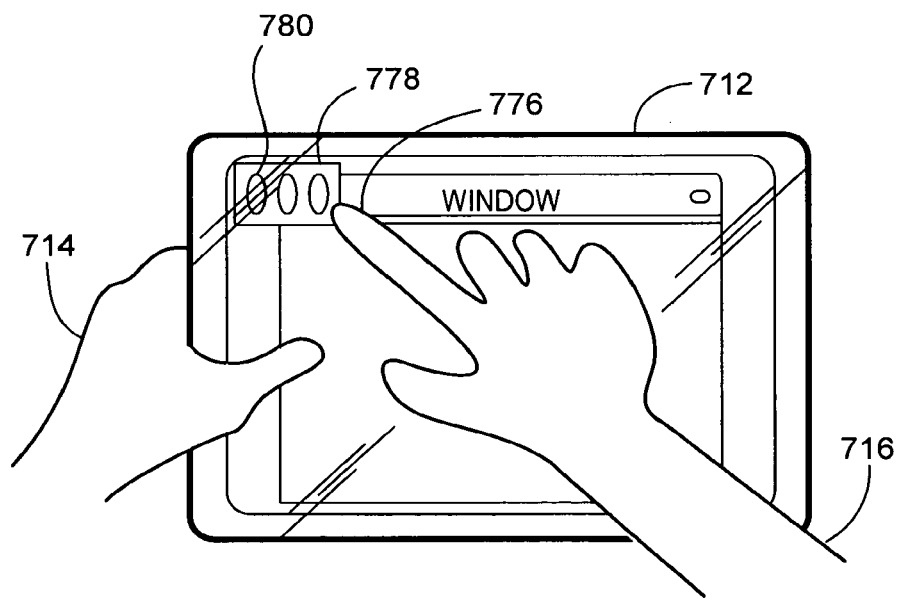
Figure 19C:
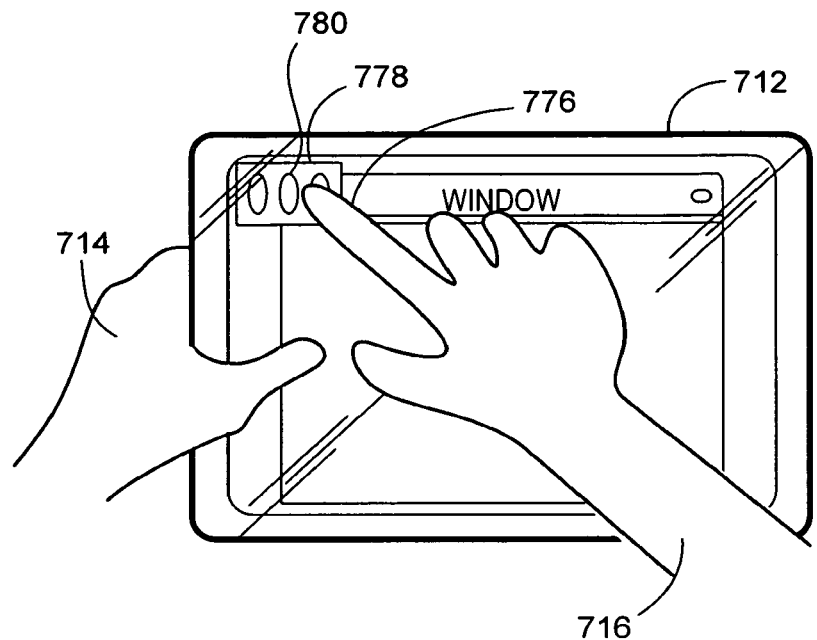
Figure 19D:
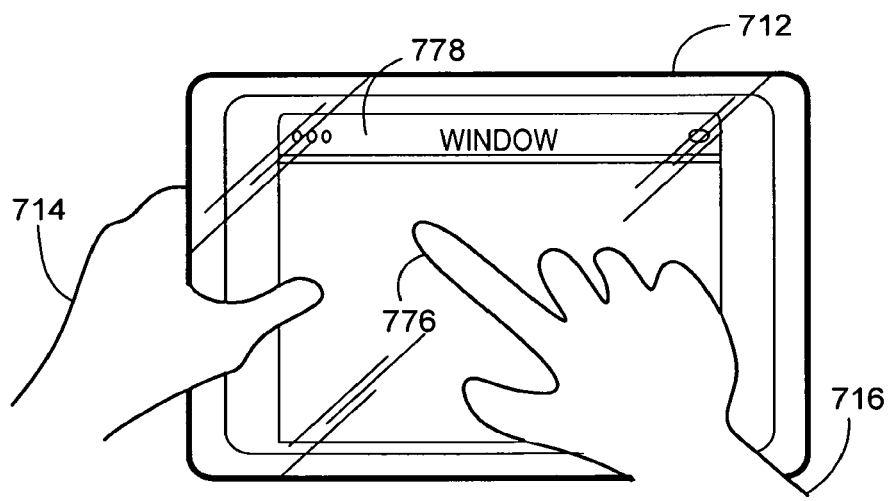

FIGS. 19A-19D illustrate a zooming target sequence using the GUI operational method 700 described above. As shown in FIG. 19A, a user 710 places their finger 776 above the touch screen and over a control box 778. Because the buttons 780 of the control box 778 included therein are smaller than the finger 776 and located close together, it is difficult for the user 710 to make a selection directly without possibly pressing an undesirable button 780, e.g., a button adjacent the desired button. By way of example, the finger 776 may cover two or more of the buttons 780. As shown in FIG. 19B, at least a portion of the control box 778 is enlarged including the buttons 780 included therein when the finger is detected. As shown in FIG. 19C, once the control box has reached its enlarged state, the user can select one of the enlarged buttons, which is now closer to the size of the finger using the touch screen. By way of example, the user may tap on the desired control button. As shown in FIG. 19D, the control box reduces to its initial size after the button is selected or after a predetermined time period in which no selection was made (e.g., times out) or when the user moves their finger substantially away from touch screen (out of the proximity sensing area) or when the user moves their finger out of the area of the control box while still in the sensing area of the proximity detector.

Figure 20:
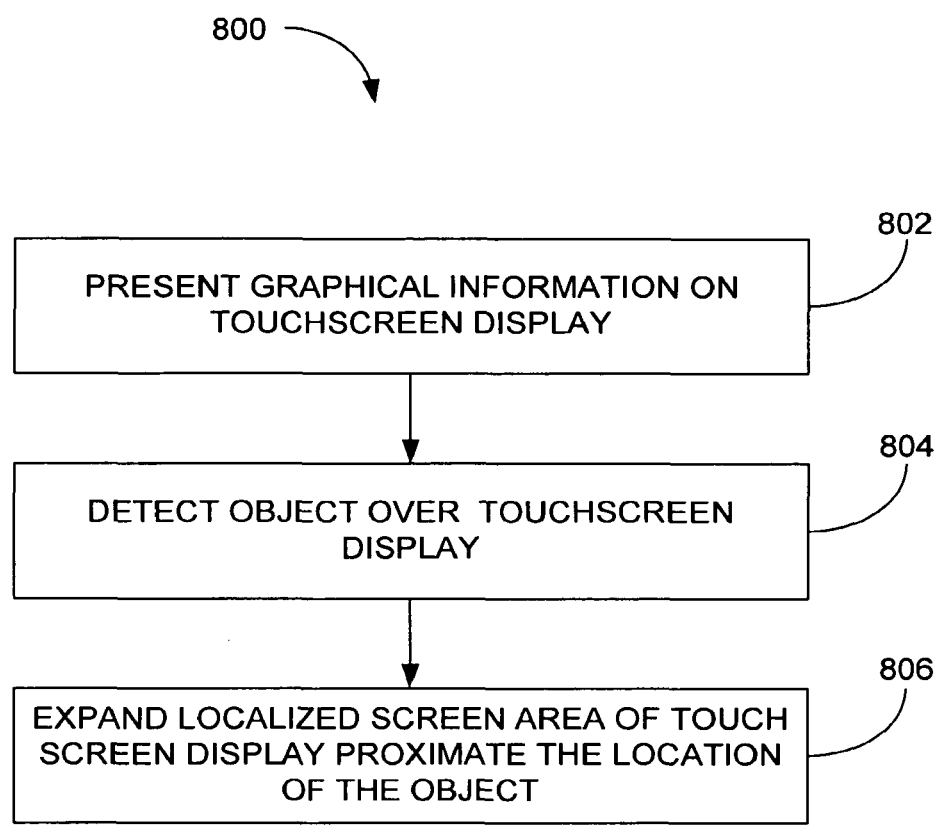
FIG. 20 is an expansion method, in accordance with one embodiment of the present invention.

FIG. 20 is an expansion method 800, in accordance with one embodiment of the present invention. The method may be implemented on computing devices having a touch screen display and a proximity detector. The method generally begins at block 802 where graphical information is presented on the touchscreen display. This is typically accomplished with the display portion of the touchscreen display. In most cases the graphical information fills the entire display screen, although in some cases it may only fill a portion of the display screen. The graphical information may for example be a graphical user interface (GUI). As is generally well known, the GUI represents, programs, files and operational options with graphical images. The graphical images may include windows, fields, dialog boxes, menus, icons, buttons, cursors, scroll bars, etc. During operation, the user can select and activate various graphical images in order to initiate functions and tasks associated therewith. By way of example, a user may select a button that opens, closes, minimizes, or maximizes a window, an icon that launches a particular program or a link that opens a particular web page. In addition, the user may actuate user interface controls such as a scroll bar to perform scrolling in the GUI. The GUI can additionally or alternatively display non interactive text and graphics Following block 802, the method proceeds to block 804 where an object is detected over the touchscreen display. This is generally accomplished with the proximity detector and/or the touchscreen display (e.g., capacitive). Depending on the configuration of the proximity detector, the proximity detector may recognizes one or more objects, as well as the position and magnitude of objects in the sensing region of the proximity detector.

Following block 804, the method proceeds to block 806 where an area or portion of the touchscreen display is expanded proximate the location of the object. Any portion of the touchscreen display can be expanded. The step of expanding may include visually expanding a portion of the presented graphical information in the region of the object relative to the remaining portions of the presented graphical information outside the region of the object. The step of expanding may also include expanding the touch sensitive portions associated with the expanded visual portion. The sensitive portion are points or regions of the touchscreen that are linked to particular points or regions of the graphical information as for example, the touch sensitive region above a graphical button. In most cases, the sensitive portions are scaled with the visually expanded portions. That is, the step of expanding includes scaling the input sensitivity with the expanded visual portions of the graphical information. The scaling may be proportional since the sensitive portions are typically a little larger than the visual portions (the visual portion and the sensitive portion aren't exactly a 1:1 relationship). By way of example, if the visual portion grows by a factor of 3 then the sensitive portion grows by a factor of 3.

During expansion, the visual and/or sensitive portions of the touchscreen display may be magnified and/or increased in size compared to the remaining visual and/or sensitive portions of the touchscreen display. By way of example, the visual portion may grow from its original size to an enlarged size (e.g., from 4 mm to 8 mm) and be magnified from its original state to a magnified state (e.g., from 1× to 2×). Although the expanded portions are enlarged and magnified, in most cases, the expanded portion maintains the same aspect ratio and shape that it has in the unexpended state. As should be appreciated, expansion may be somewhat analogous to zooming.

The area that is expanded may be the area underneath the object. Alternatively, the area that is expanded may be offset from the object such as for example above, below or to the sides of the object. This may allow the user to more clearly view the expanded area.

The size, magnification and shape of the expanded area may be widely varied. By way of example, and not by way of limitation, the expanded area may have an area of between about 100 mm$^2$ and about 400 mm$^2$, and a height and width between about 10 mm to about 20 mm. Furthermore, the expanded portions may be magnified between greater than 1 time to over a thousand times, more particularly between about 2× to about 100×, and even more particularly, the between about 2× and about 20×. Moreover, the expanded area may be formed from various shapes including but not limited to circles, ovals, squares, rectangles, triangles, and the like. Other shapes such as symbols, logos, characters may also be used.

In one embodiment, the expanded portion of the graphical information is raised relative to the non expanded portion of the graphical information. For example, the expanded portion may appear to protrude away from the non expanded portions. This is typically done graphically as both the expanded and non expanded portions are typically produced in the same plane. By way of example, shading principals may be used to make the expanded portion appear to protrude away from the non expanded portions.

In some cases, the expanded portion includes a substantially planar plateau region and a substantially sloped transition region. The planar plateau region provides a planar surface for displaying the targeted graphical information and the transition region provides a gradient of growth between the plateau region and the non expanded portion of the graphical information. The transition region, which is the edge of the plateau compacts or compresses the graphical information located between the plateau and the non expanded portion of the graphical information. For example, the graphical information contained in the transition region have compacted or compressed magnification levels (this may distort the graphical information contained therein) In alternative implementations, the plateau may be rounded rather than being planar or the expanded portion may be one large transition region without having a plateau. In either case, the expanded portion may look like a rounded pimple or bump.

The expanded portion may be a localized area, which can be any portion of the graphical information. The localized area may include any portion of the graphical information including but not limited to background (e.g., wall paper), windows, fields, text, dialog boxes, menus, icons, buttons, cursors, UI controls or any combination thereof.

The expanded portion may also be linked to a particular object of the graphical information. For example, a particular window, field, dialog box, menu, icon, button, tool bar, user interface element (e.g., scroll bar, scroll wheel, slider bar, dial), control box, footnote and the like. In some case, the entire object is expanded. For example, when the finger is placed over a window, the entire window is expanded. In other cases, only a portion of the object is expanded. For example, when the finger is placed over a tool bar, only the selectable items are expanded. As should be appreciated, these objects may need to be expanded so that they can be easily used by a human hand.

The time when expansion takes place can be widely varied. In one embodiment, expansion is activated immediately after the touch is detected. In another embodiment, expansion is activated after the object is detected for a predetermined amount of time. In cases such as this, the user may have to hover their finger over the area desired to be expanded for the predetermined amount of time in order to initiate the expansion. By way of example, the dwell time may be between about 0.5 to about 5 seconds, and more particularly about 1 second. This embodiment may be employed to prevent inadvertent expansion. That is, the time delay may be used to avoid implementing expansion with casual contact not intended for expansion.

Once expansion is activated, the speed or rate at which the expanded area expands may be widely varied. The growth can happen quickly or slowly. In one embodiment, the expanded area grows from its normal state to the expanded state almost instantaneously. In another embodiment, the expanded area grows over some predetermined amount of time, i.e., the area expands gradually over time. The rate may be preset or it may be based on some external factor. For example, the rate of growth may be based on the touch pressure, i.e., the greater the touch pressure, the greater the rate of change. Alternatively, the rate of growth may be based on multiple taps, i.e., each tap causes incremental expansion.

The manner in which expansion is implemented may also be widely varied. In one embodiment, the amount of expansion (size, magnification, etc) is preset. The preset amount may be fixed or it may be adjustable. For example, a user may adjust the characteristics of expansion via a control menu. In another embodiment, the amount of expansion is based on some external factor. In one case, the amount of expansion may be based on the location of the object relative to the graphical information (e.g., region sensitivity). For example, a first located object of the graphical information may be magnified 2× and a second located object of the graphical information may be magnified 16×. In yet another embodiment, the expanded portion may be configured to follow the object as the object is moved across and above the touchscreen display. For example, the location of the expanded portion changes in accordance with the location of the object, i.e., it mirrors the position of the object.

Although not shown in FIG. 20, the method may include additional steps such as reverting back to a non expanded state when the object is no longer detected. In one embodiment, the expansion is deactivated immediately after the object is no longer detected thereby causing the expanded portion to revert back to its normal state. In another embodiment, expansion is deactivated after a predetermined amount of time, i.e., there is a lag time. The lag time may be preset (e.g., user settable) or it may be based on external factors such as the amount of information located in the expanded area and human factors such as how long the user would take to read or grasp this particular amount of information. The lag time may allow the user to establish if the expanded area is the desired target. If its not the desired target, the user can move their finger to a new target. If it is the desired target, the user may perform additionally steps within the expanded area. By way of example, and not by way of limitation the lag time may be between about 0.5 to about 5 seconds, and more particularly 1 second.

The speed or rate at which the expanded area reverts back to its normal state may be widely varied. The atrophy can happen quickly or slowly. In one embodiment, the expanded area atrophies from its expanded state to the normal state almost instantaneously. In another embodiment, the expanded area atrophies over some predetermined amount of time, i.e., the area atrophies gradually over time.

The method may also include receiving inputs within the expanded area. The inputs may for example be touch events such as a selection input that is implemented with tapping or increased touch pressure. Alternatively, the input may be a gestural input or a data entry input. By way of example, in an expanded state, a virtual scroll wheel may be capable of being manipulated by a swirling finger gesture or text may be entered into an expanded document. In all of these cases, the expansion may be designed to expand a feature or group of features (such as buttons) so that they are adequately sized for finger manipulation.

Moreover, the method may include detecting a second object over the touchscreen display and expanding a second area of the touchscreen display proximate to the location of the second object. In one implementation, the second object is detected at the same time as the first object such that the first and second expanded areas are expanded simultaneously (as for example using a multipoint proximity detection system). In another implementation, the second object is detected after the completion of the first object. In cases such as this, if the placement of the second object occurs during the lag time of the first expansion, then the first expansion may smoothly transition to the second expansion (e.g., as the first gradually shrinks, the second gradually expands). Alternatively, a second object in the region of the expanded area may cause further expansion. For example, if the expanded portion includes a plurality of features, a second object may be used to further expand one or more of the features. Thereafter, the feature may be selected for example by performing a touch event on the touch screen.

Alternatively, expansion may not be implemented if more than one object is detected at the same time, i.e., simultaneously. This "double object" could be considered a null input for the purposes of expansion.

The methods mentioned above may be implemented with software or hardware, or a combination of hardware and software. In one embodiment, the method is implemented by an operating system. As such, the method may be implemented during any program or application running in conjunction with the operating system. That is, expansion can occur in any program or application. By way of example, the operating system may correspond to Mac OS, OS/2, DOS, Unix, Linux, Palm OS, and the like. The operating system can also be a special purpose operating system, such as may be used for limited purpose appliance-type computing devices. Operating systems are generally well known and will not be described in greater detail.

Figure 21:
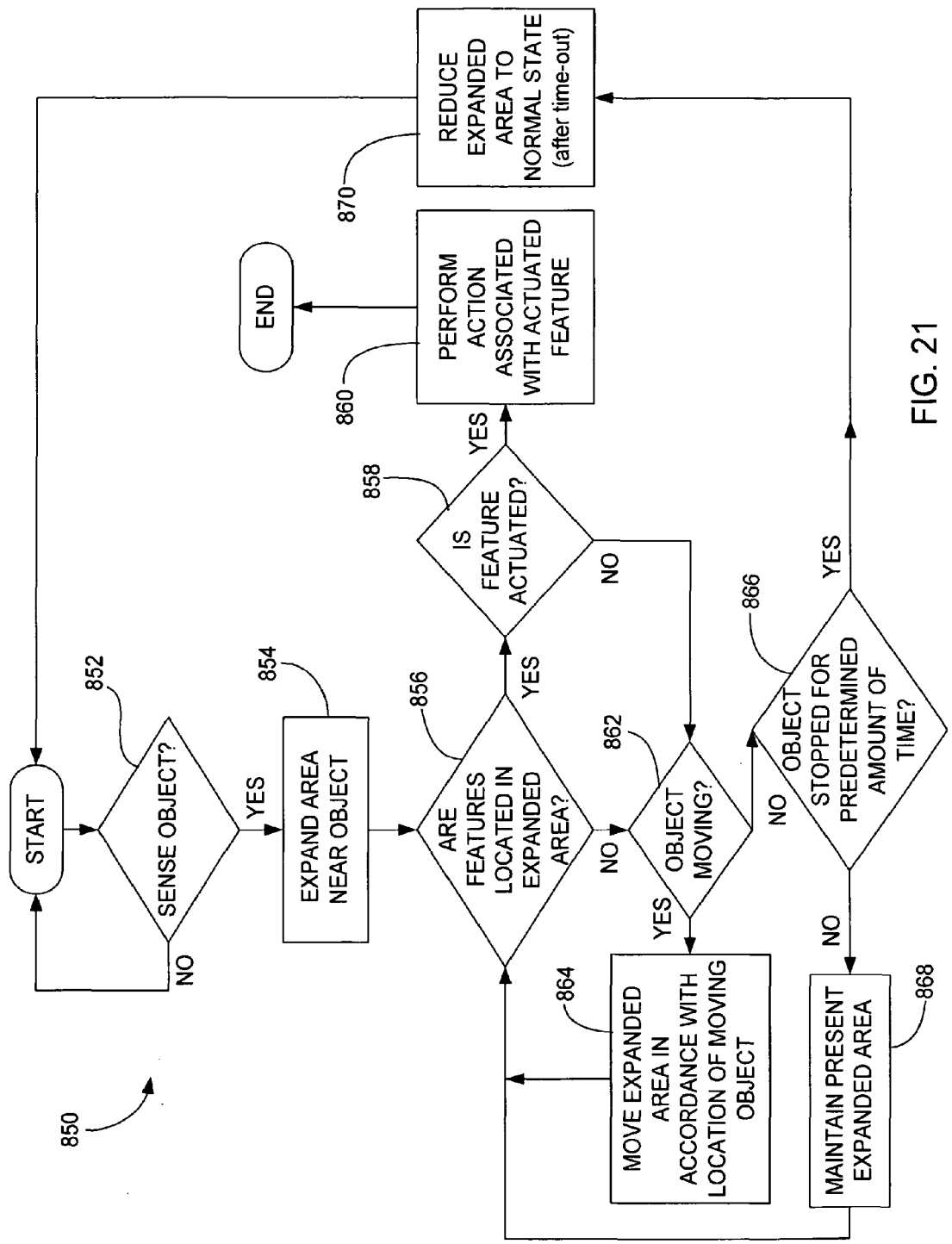
FIG. 21 is a proximity method, in accordance with one embodiment of the present invention.

FIG. 21 is a proximity method 850, in accordance with one embodiment of the present invention. The method begins at block 852 where object sensing is performed via a proximity detection system. The object may for example be a finger or stylus. The object is sensed when the object is placed over, but not in contact with a touchscreen display.

If an object is sensed, the method proceeds to block 854 where the area near the sensed object is expanded. In particular, a portion of the GUI in the vicinity of the object is visually expanded relative to the remaining portions of the GUI. The touch sensitivity associated with the GUI is also expanded. The expanded area may be expanded immediately or it may appear to gradually grow until it reaches its final shape size, elevation, etc.

In most cases, the visually expanded portion is made to appear like it is protruding out of the image plane. The protruding effect is typically accomplished through graphics such as shading or other similar means. The protruding effect may be implemented in a localized area of the GUI or it may be implemented at a particular GUI image such as a control box, tool bar, user interface element, and/or the like.

In one embodiment, the expanded portion includes a plateau region and a transition region. During expansion, the target area contained within the plateau region increases in size and magnification. At the same time, the transition region compresses the GUI between the target area contained in the plateau region and the remaining unexpanded portions of the GUI. As a result, the plateau region appears to raise above the remaining portions of the GUI.

Following block 854, the method proceeds to block 856 where a determination is made as to whether or not features are located within the expanded area. The features may be buttons, web links, icons, user interface elements, data entry regions and/or the like.

If a feature is located within the expanded area, the method proceeds to block 858 where a determination is made as to whether or not the feature is actuated via a touch event (e.g., selected, activated, etc.). For example, the object changes from hovering over the touch surface of the touchscreen to actually touching the touchscreen. The determination may include monitoring touches that occur after a hover and associating or linking a particular feature to the touching object. The association or link may be made by ranking the relevance of the touching object to the feature. The ranking may for example include producing a figure of merit, and whichever feature has the highest figure of merit, giving it sole access to the events occurring with the touching object. By way of example, the ranking may include calculating the centroid of a touch and its proximity to the feature.

If the feature is a user interface element, the feature may be actuated via a touch gesture. See for example, U.S. patent application Ser. No. 10/903,964, which is herein incorporated by reference. If the feature is a data entry feature, the feature may be actuated by entering data as for example through the use of a cursor or keyboard (e.g., word processing).

In cases where the expanded area includes a plurality of features, an intermediate block may be included between blocks 856 and 858. The intermediate block includes providing feedback as to which feature is the most likely selectable feature based on some predefined criteria (the feedback indicates where a system thinks the user is targeting). The criteria may for example be based on the location of the spaced away object relative the location of the various features. For example, the feature located closest to the object may indicate that it is the most likely candidate for selection. In essence, the feedback is a confirmation of correct targeting before selection. If the user does not get the right feedback, the user has the option of moving their finger to another location. The feedback may be visual or auditory. By way of example, visual feedback may include modifying the feature such as changing its color, position, size, shape, symbol, etc., and auditory indication may include providing sounds associated with the feature.

Once the feature is actuated, the method proceeds to block 860 where an action associated with the feature is performed. The action may for example include launching a particular program, opening a file or document, viewing a menu, making a selection, executing instructions, generating control signals, and the like.

If the feature is not actuated or if there is no feature located within the expanded area, the method proceeds to block 862 where a determination is made as to whether or not the object (finger) is moving in the sensing field of the proximity detector. For example, if the object is stationary in the sensing field or whether the object is being moved about the sending field.

If the object is moving, the method proceeds to block 864 where the expanded area is moved in accordance with the location of the moving object. That is, the expanded area follows the motion of the object.

If it is determined that the object is not moving, the method proceeds to block 866 where a determination is made as whether or not the object is still sensed. If so, the method proceeds to block 868 where the present expanded area is maintained. Thereafter, the method proceeds back to block 856. If the object is not sensed, the method proceeds to block 870 where the expanded area is reduced to its normal state. The reduction may mimic the expansion, but in a reverse direction. By way of example, in embodiments where the expanded portion includes a plateau region and a transition region, the target area contained within the plateau region may be decreased in size and magnification. At the same time, the transition region may decompress the GUI between the target area contained in the plateau region and the remaining unexpanded portions of the GUI. As a result, the plateau region appears to integrate back into the remaining portions of the GUI. Furthermore, the reduction may occur immediately after the object is not sensed or after some predetermined amount of time.

Figure 22:
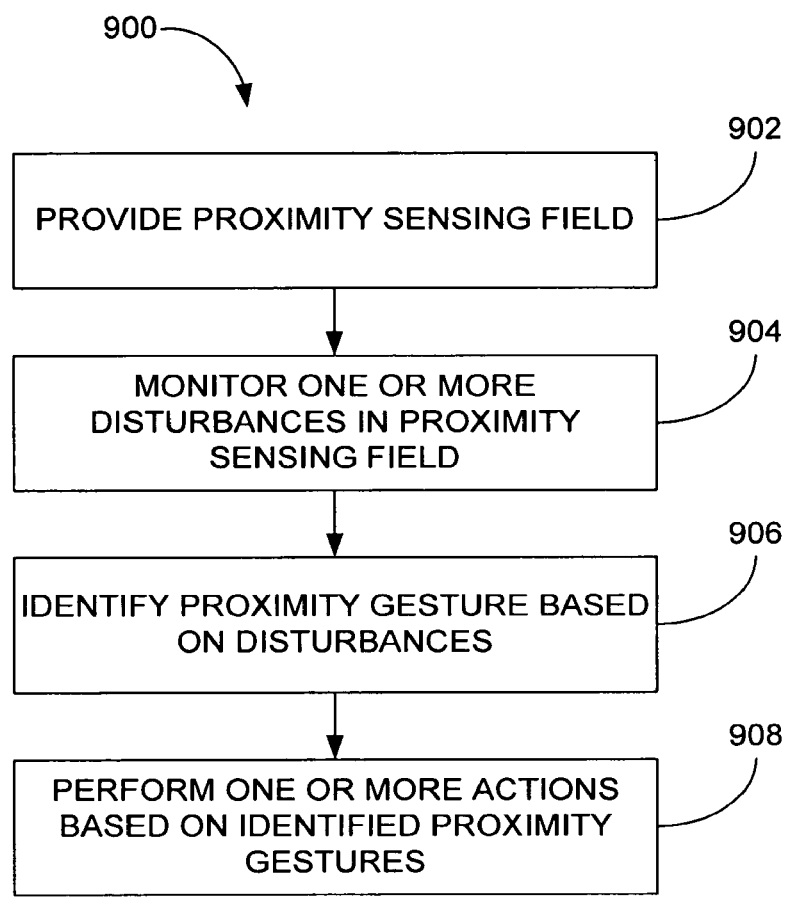
FIG. 22 is a proximity gesture method, in accordance with one embodiment of the present invention.

FIG. 22 is a proximity gesture method 900, in accordance with one embodiment of the present invention. The method generally starts at block 902 where a proximity sensing field is provided. The proximity field may be a single node proximity field or a pixilated array of sensing nodes.

The method proceeds to block 904 where disturbances or changes in the sensing field are monitored. For example, the time between disturbances (tap) and/or the time of the disturbances (lag) and/or the location of distinct disturbances (first tap, second tap), varying locations of a single disturbance (tracking), etc. are monitored. A disturbance being associated with when an object is detected.

Thereafter in block 906, one or more proximity gestures are identified based on the characteristics of the disturbances, i.e., the amount of time the finger hovers, the number of taps, the length of time between taps, etc.

Thereafter in block 908, one or more actions are performed based on the identified proximity gestures.

The proximity gestures may be similar to touch gestures except that no touch occurs. The finger or hand gesture is performed above the surface and thus there is no contact. Some examples of touch gestures that may be applied to proximity gestures can be found in U.S. patent application Ser. Nos. 10/903,964 and 11/038,590, which are herein incorporated by reference.

Figure 23:
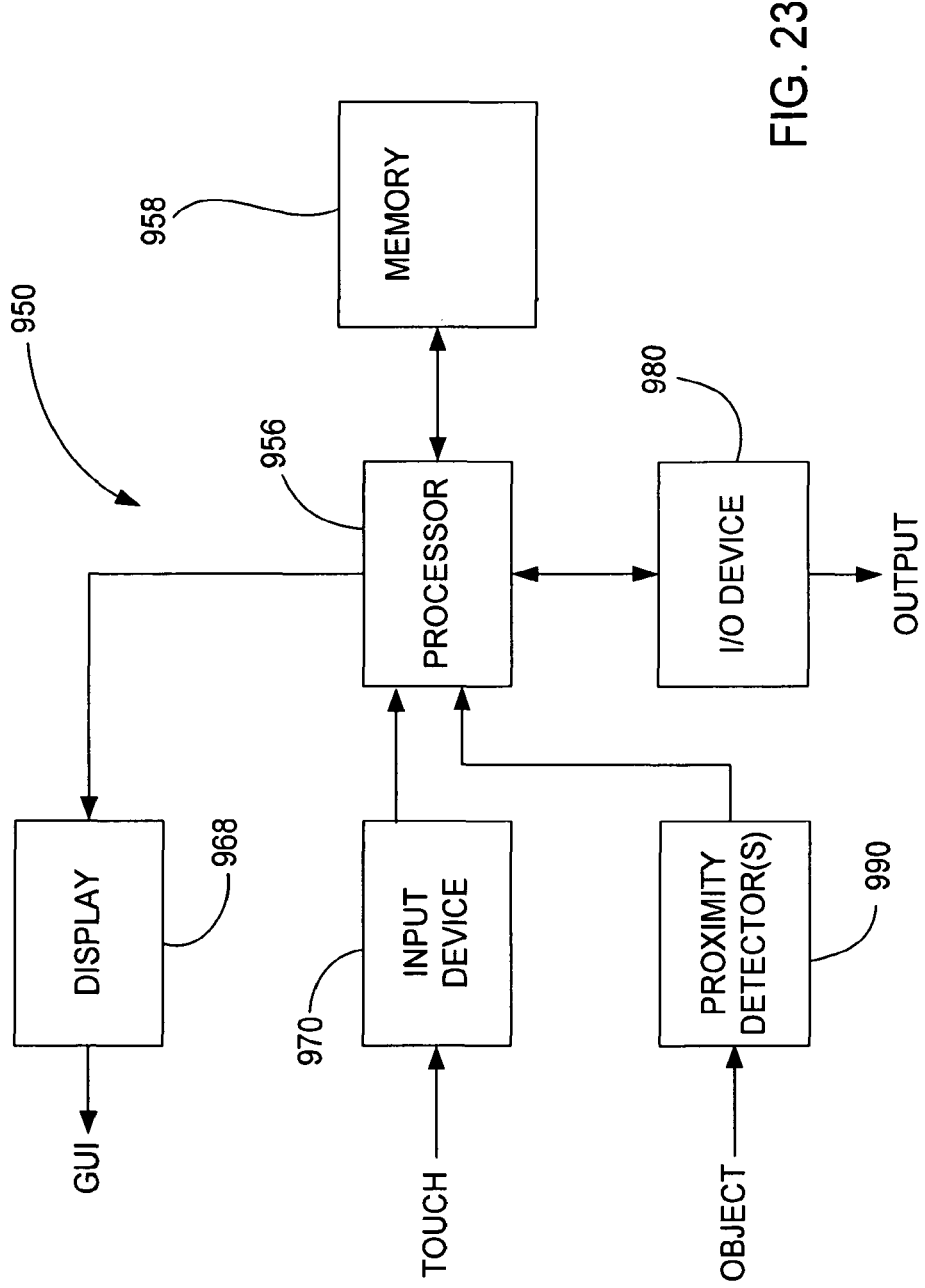
FIG. 23 is a block diagram of an exemplary computer system, in accordance with one embodiment of the present invention.

FIG. 23 is a block diagram of an exemplary computer system 950, in accordance with one embodiment of the present invention. The computer system 950 may correspond to a personal computer, such as a desktop, laptop, tablet or handheld computer. The computer system may also correspond to other types of computing devices such as a cell phones, PDAs, media players, consumer electronic devices, and/or the like.

The exemplary computer system 950 shown in FIG. 23 includes a processor 956 configured to execute instructions and to carry out operations associated with the computer system 950. For example, using instructions retrieved for example from memory, the processor 956 may control the reception and manipulation of input and output data between components of the computing system 950. The processor 956 can be implemented on a single-chip, multiple chips or multiple electrical components. For example, various architectures can be used for the processor 956, including dedicated or embedded processor, single purpose processor, controller, ASIC, and so forth.

In most cases, the processor 956 together with an operating system operates to execute computer code and produce and use data. By way of example, the operating system may correspond to Mac OS, OS/2, DOS, Unix, Linux, Palm OS, and the like. The operating system can also be a special purpose operating system, such as may be used for limited purpose appliance-type computing devices. The operating system, other computer code and data may reside within a memory block 658 that is operatively coupled to the processor 656. Memory block 658 generally provides a place to store computer code and data that are used by the computer system 950. By way of example, the memory block 658 may include Read-Only Memory (ROM), Random-Access Memory (RAM), hard disk drive and/or the like. The information could also reside on a removable storage medium and loaded or installed onto the computer system 650 when needed. Removable storage media include, for example, CD-ROM, PC-CARD, memory card, floppy disk, magnetic tape, and a network component.

The computer system 950 also includes a display device 968 that is operatively coupled to the processor 956. The display device 968 may be a liquid crystal display (LCD) (e.g., active matrix, passive matrix and the like). Alternatively, the display device 968 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks or OLEDs.

The display device 968 is generally configured to display a graphical user interface (GUI) that provides an easy to use interface between a user of the computer system and the operating system or application running thereon. Generally speaking, the GUI represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non interactive text and graphics, for the user on the display device 968.

The computer system 950 also includes an input device 970 that is operatively coupled to the processor 956. The input device 970 is configured to transfer data from the outside world into the computer system 950. The input device 970 may include a touch sensing device configured to receive input from a user's touch and to send this information to the processor 956. In many cases, the touch-sensing device recognizes touches, as well as the position and magnitude of touches on a touch sensitive surface. The touch sensing means reports the touches to the processor 956 and the processor 956 interprets the touches in accordance with its programming. For example, the processor 956 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

In the illustrated embodiment, the input device 970 is a touch screen that is positioned over or in front of the display 968. The touch screen 670 may be integrated with the display device 968 or it may be a separate component. The touch screen 970 has several advantages over other input technologies such as touchpads, mice, etc. For one, the touch screen 670 is positioned in front of the display 968 and therefore the user can manipulate the GUI directly. For example, the user can simply place their finger over an object to be selected, activated, controlled, etc. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens.

The touchscreen can be a single point or multipoint touchscreen. Multipoint input devices have advantages over conventional single point devices in that they can distinguish more than one object (finger) simultaneously. Single point devices are simply incapable of distinguishing multiple objects at the same time. By way of example, a multipoint touch screen, which can be used herein, is shown and described in greater detail in copending and commonly assigned U.S. patent application Ser. No. 10/840,862, which is hereby incorporated herein by reference.

The computer system 950 also includes a proximity detection system 990 that is operatively coupled to the processor 956. The proximity detection system 990 is configured to detect when a finger (or stylus) is in close proximity to (but not in contact with) some component of the computer system including for example housing or I/O devices such as the display and touch screen. The proximity detection system 990 may be widely varied. For example, it may be based on sensing technologies including capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like. A few of these technologies will now be briefly described.

The computer system 950 also includes capabilities for coupling to one or more I/O devices 980. By way of example, the I/O devices 980 may correspond to keyboards, printers, scanners, cameras, speakers, and/or the like. The I/O devices 980 may be integrated with the computer system 950 or they may be separate components (e.g., peripheral devices). In some cases, the I/O devices 980 may be connected to the computer system 950 through wired connections (e.g., cables/ports). In other cases, the I/O devices 980 may be connected to the computer system 950 through wireless connections. By way of example, the data link may correspond to PS/2, USB, IR, RF, Bluetooth or the like.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

The invention claimed is:

1. A proximity detection system, comprising:
   one or more proximity sensing surfaces;
   a plurality of proximity sensors configured for generating a plurality of proximity sensing fields over at least a portion of the one or more proximity sensing surfaces, each proximity sensing field having a sensing field height for sensing an object over the one or more proximity sensing surfaces; and
   a processor communicatively coupled to the plurality of proximity sensors, the processor capable of
     performing a first operation when one or more objects are detected by a first proximity sensing field having a first sensing field height, and
     performing a second operation when one or more objects are detected by a second proximity sensing field having a second sensing field height.

2. The proximity detection system of claim 1, wherein the plurality of proximity sensors are further configured for generating the first proximity sensing field along a perimeter area of the one or more proximity sensing surfaces and generating the second proximity sensing field in an interior area of the one or more proximity sensing surfaces.

3. The proximity detection system of claim 2, wherein the processor is further capable of performing the second operation when the one or more objects are detected over a user interface element in the interior area.

4. The proximity detection system of claim 2, wherein the proximity sensing surface includes a display in the interior area, and wherein the processor is further capable of performing the second operation when the one or more objects are detected over a virtual user interface element appearing on the display.

5. The proximity detection system of claim 2, wherein the first sensing field height is greater than the second sensing field height for detecting the one or more objects passing through the perimeter area.

6. The proximity detection system of claim 2, wherein the second sensing field height is less than the first sensing field height for detecting an activation of a user interface element in the interior area by the one or more objects.

7. The proximity detection system of claim 1, wherein the first operation comprises activating a display within the one or more proximity sensing surfaces.

8. The proximity detection system of claim 1, wherein the second operation comprises selecting a user interface element on the one or more proximity sensing surfaces.

9. The proximity detection system of claim 1, wherein the plurality of proximity sensors are further configured for generating the first proximity sensing field over a first user interface element and generating the second proximity sensing field over a second user interface element.

10. A method for proximity detection, comprising:
    generating a plurality of proximity sensing fields over at least a portion of one or more proximity sensing surfaces, each proximity sensing field having a sensing field height for sensing an object over the one or more proximity sensing surfaces;
    performing a first operation when one or more objects are detected by a first proximity sensing field having a first sensing field height, and
    performing a second operation when one or more objects are detected by a second proximity sensing field having a second sensing field height.

11. The method of claim 10, further comprising generating the first proximity sensing field along a perimeter area of the one or more proximity sensing surfaces and generating the second proximity sensing field in an interior area of the one or more proximity sensing surfaces.

12. The method of claim 11, further comprising performing the second operation when the one or more objects are detected over a user interface element in the interior area.

13. The method of claim 11, further comprising performing the second operation when the one or more objects are detected over a virtual user interface element appearing on a display in the interior area.

14. The method of claim 11, wherein the first sensing field height is greater than the second sensing field height for detecting the one or more objects passing through the perimeter area.

15. The method of claim 11, wherein the second sensing field height is less than the first sensing field height for detecting an activation of a user interface element in the interior area by the one or more objects.

16. The method of claim 10, wherein the first operation comprises activating a display within the one or more proximity sensing surfaces.

17. The method of claim 10, wherein the second operation comprises selecting a user interface element on the one or more proximity sensing surfaces.

18. The method of claim 10, further comprising generating the first proximity sensing field over a first user interface element and generating the second proximity sensing field over a second user interface element.

19. A proximity sensing surface, comprising:
a plurality of proximity sensors configured for generating a plurality of proximity sensing fields of different heights in different areas of the proximity sensing surface;
wherein the plurality of sensing fields create a proximity sensing topography over the proximity sensing surface for detecting one or more objects in the different areas at the different heights to trigger different functions.

20. The proximity sensing surface of claim 19, wherein the plurality of proximity sensing fields surround one or more user interface elements on the proximity sensing surface.

* * * * *